(12) United States Patent
Palumbo et al.

(10) Patent No.: US 12,433,753 B2
(45) Date of Patent: Oct. 7, 2025

(54) UNICOMPARTMENTAL KNEE ARTHROPLASTY SYSTEMS AND METHODS

(71) Applicant: Actuos, LLC, Tampa, FL (US)

(72) Inventors: Brian Thomas Palumbo, Tampa, FL (US); Sergio Gutierrez, Tampa, FL (US)

(73) Assignee: Actuos, LLC, Tampa, FL (US)

( * ) Notice: Subject to any disclaimer, the term of this patent is extended or adjusted under 35 U.S.C. 154(b) by 0 days.

(21) Appl. No.: 17/981,341

(22) Filed: Nov. 4, 2022

(65) Prior Publication Data

US 2023/0138980 A1 May 4, 2023

Related U.S. Application Data

(63) Continuation of application No. PCT/US2022/048895, filed on Nov. 3, 2022.

(60) Provisional application No. 63/275,230, filed on Nov. 3, 2021.

(51) Int. Cl.
*A61F 2/38* (2006.01)
*A61F 2/30* (2006.01)

(52) U.S. Cl.
CPC ........ *A61F 2/3877* (2013.01); *A61F 2/30734* (2013.01); *A61F 2/30771* (2013.01); *A61F 2/3859* (2013.01); *A61F 2002/30405* (2013.01); *A61F 2002/30827* (2013.01); *A61F 2002/30845* (2013.01); *A61F 2002/30891* (2013.01); *A61F 2002/30904* (2013.01); *A61F 2002/3881* (2013.01); *A61F 2002/3895* (2013.01)

(58) Field of Classification Search
CPC .............................................. A61F 2002/3895
See application file for complete search history.

(56) References Cited

U.S. PATENT DOCUMENTS

| | | | |
|---|---|---|---|
| 6,428,577 B1 | 8/2002 | Evans et al. | |
| 8,632,600 B2 | 1/2014 | Zannis et al. | |
| 9,271,772 B2* | 3/2016 | Gonzalez-Hernandez | A61F 2/4003 |
| 9,757,244 B2* | 9/2017 | Sander | A61F 2/4202 |
| 10,463,498 B2 | 11/2019 | Soffiatti et al. | |
| 10,660,761 B2 | 5/2020 | Fitzpatrick et al. | |
| 2003/0181984 A1* | 9/2003 | Abendschein | A61B 17/155 623/908 |

(Continued)

OTHER PUBLICATIONS

International Search Report and Written Opinion mailed Apr. 12, 2023, in PCT Application No. PCT/US2022/048895.

*Primary Examiner* — Megan Y Wolf
(74) *Attorney, Agent, or Firm* — Foley & Lardner LLP

(57) ABSTRACT

A surgical implant includes a tray extending from a first end to a second end along a first plane, the tray including an upper surface and a lower surface, a first post coupled to and extending from the tray away from the first plane and configured to be inserted into a bone portion, the first post including a first opening extending through the first post, a second post coupled to and extending from the tray away from the first plane and configured to be implanted into the bone portion, the second post including a second opening extending through the second post, and a fastener removably coupled to the first post and the second post, the fastener extending from a first fastener end to a second fastener end through the first opening and the second opening.

18 Claims, 60 Drawing Sheets

(56) References Cited

U.S. PATENT DOCUMENTS

| | | | |
|---|---|---|---|
| 2006/0235537 A1* | 10/2006 | Kuczynski | A61F 2/38 623/20.36 |
| 2007/0299529 A1* | 12/2007 | Rhodes | A61F 2/389 623/20.32 |
| 2008/0091203 A1* | 4/2008 | Warburton | A61B 17/8875 606/103 |
| 2008/0234753 A1* | 9/2008 | Trieu | A61B 17/7059 606/283 |
| 2008/0243263 A1* | 10/2008 | Lee | A61F 2/3868 623/20.29 |
| 2012/0330431 A1* | 12/2012 | Rolston | A61F 2/389 623/20.32 |
| 2014/0094819 A1 | 4/2014 | Clever et al. | |
| 2017/0196696 A1* | 7/2017 | Dodd | A61F 2/3868 |
| 2018/0153598 A1* | 6/2018 | Jurick | A61F 2/30771 |
| 2018/0353301 A1* | 12/2018 | Goldstein | A61B 17/8061 |
| 2019/0240037 A1* | 8/2019 | Gorelick | A61F 2/30749 |
| 2021/0137689 A1 | 5/2021 | Komistek | |
| 2021/0346164 A1* | 11/2021 | Zhang | A61F 2/30771 |

* cited by examiner

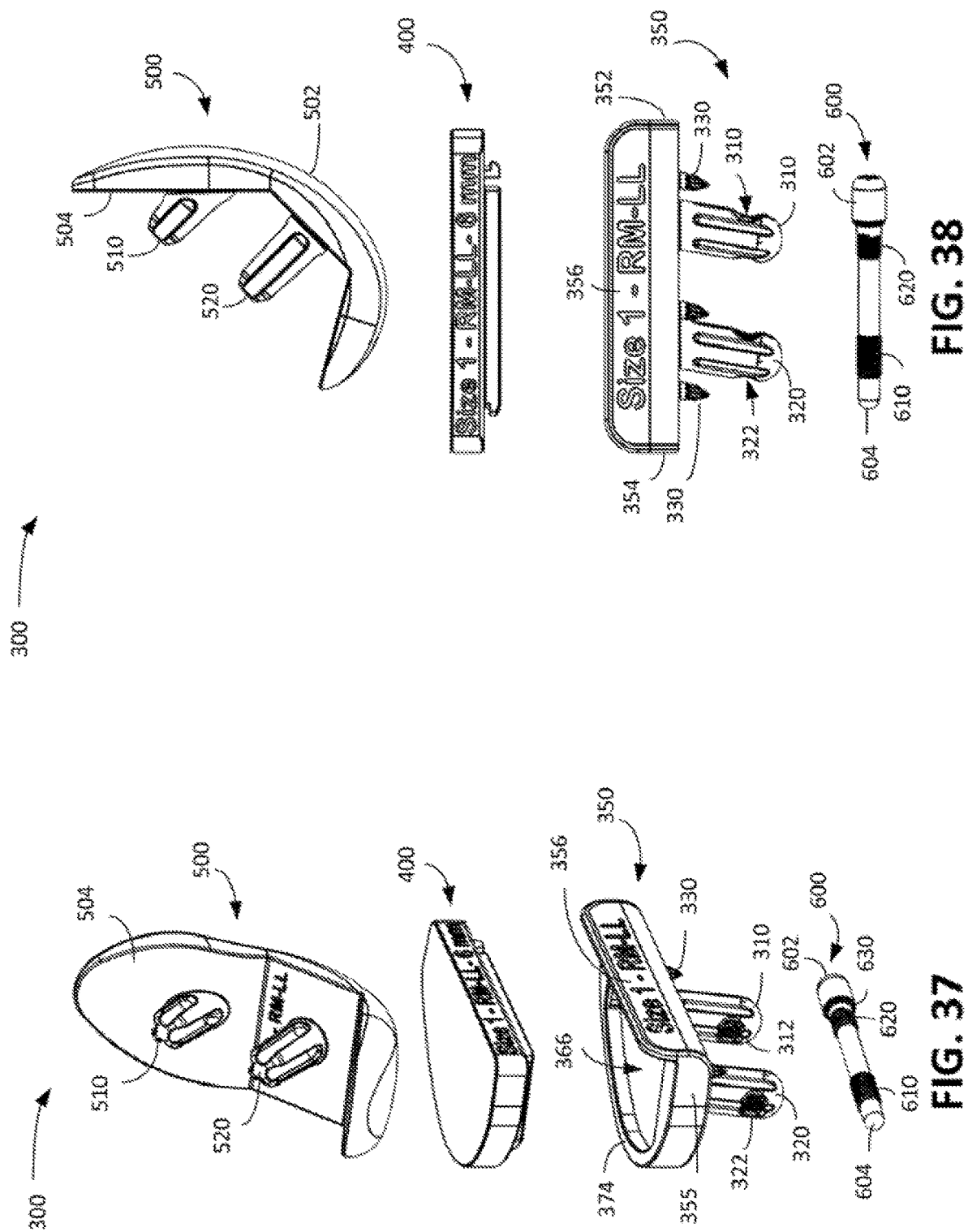

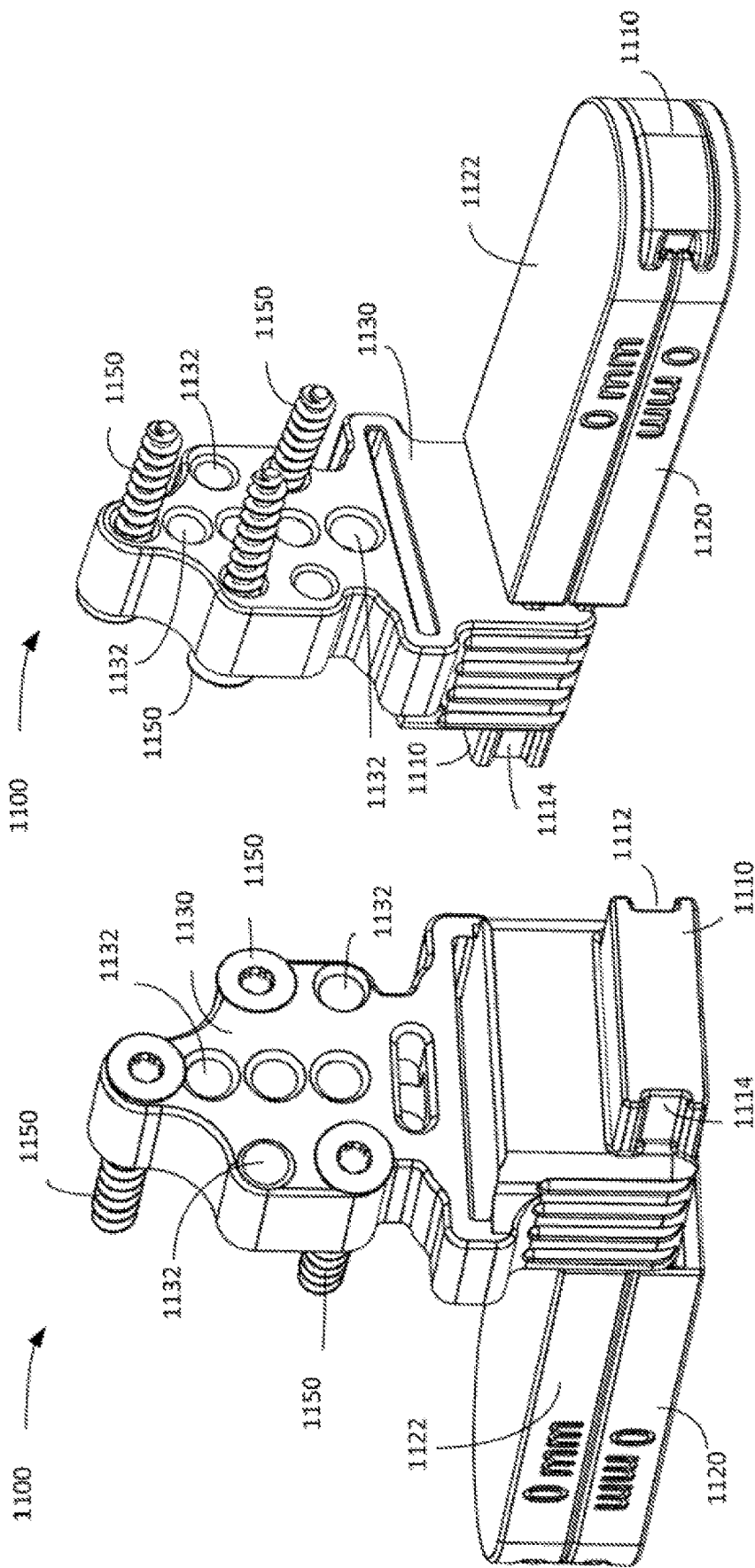

UNICOMPARTMENTAL KNEE ARTHROPLASTY SYSTEMS AND METHODS

CROSS-REFERENCE TO RELATED PATENT APPLICATIONS

This application is a continuation of International Application Number PCT/US22/48895, filed Nov. 3, 2022, which claims priority to and the benefit of U.S. Provisional Patent Application No. 63/275,230, filed on Nov. 3, 2021, which are incorporated herein by reference in their entireties.

FIELD OF DISCLOSURE

This disclosure relates generally to systems and methods of orthopedic prostheses for use in reconstruction of a human knee joint. More particularly, the disclosure relates to systems and methods for repairing or reconstructing one or more compartments (e.g., the medial, lateral and/or patellofemoral compartments) of a knee joint using one or more implant devices (e.g., prosthesis).

BACKGROUND

The human knee joint is a complex and important joint, pivotal for normal function and recreational activities in daily life. The native joint maintains 6 degrees of freedom of motion including (1) flexion and extension, (2) internal and external rotation, (3) varus and valgus angulation, (4) anterior and posterior glide, (5) medial and lateral shift, and (6) compression and distraction. Arthritis, bone disease or injury can alter the smooth functioning of the knee joint. As such, various surgical procedures may be undertaken in an attempt to restore smooth functioning of the knee joint.

Maintenance of the cruciate ligaments (anterior cruciate ligament [ACL] and posterior cruciate ligament [PCL]) during knee surgery may result in improved post-operative outcomes and patient function. For example, maintaining the cruciate ligaments may improve proprioception of the knee, which directly impacts function.

Unicompartmental knee arthroplasty (UKA) is one form of knee surgery that may be performed while keeping the cruciate ligaments intact. UKA involves resurfacing of one individual compartment of the knee affected by arthritis and preserving the unaffected contralateral and patellofemoral compartments. Beneficially, UKA may preserve more natural bone structure than total knee arthroplasty (TKA), preserve the ACL and/or PCL, and/or expedited post-operative recovery.

SUMMARY OF THE DISCLOSURE

According to an example embodiment, a surgical implant includes a tray extending from a first end to a second end along a first plane, the tray including an upper surface, a lower surface opposite the upper surface, a first edge extending between the first end and the second end and a second edge opposite the first edge and extending between the first end and the second end, a first post coupled to and extending from the tray away from the first plane and configured to be inserted into a bone portion, the first post including a first opening extending through the first post, a second post coupled to and extending from the tray away from the first plane and configured to be implanted into the bone portion, the second post including a second opening extending through the second post, and a fastener removably coupled to the first post and the second post, the fastener extending from a first fastener end to a second fastener end through the first opening and the second opening.

According to various embodiments, the first opening includes a first set of threads and the second opening includes a second set of threads, and the fastener includes a first threaded portion configured to engage the first set of threads and a second threaded portion configured to engage the second set of threads. According to various embodiments, the first opening includes a third set of threads configured to engage a component of a surgical jig to couple the first post to the surgical jig. An outer diameter of the first threaded portion may be the same as the outer diameter of the second threaded portion. The first set of threads may be configured to engage the first threaded portion such that rotation of the fastener causes translation of the first threaded portion though the first opening when the first threaded portion engages the first set of threads, and engage the second threaded portion such that such that rotation of the fastener causes translation of the second threaded portion though the first opening when the second threaded portion engages the first set of threads. The fastener may extend in direction that is parallel to the first plane and forms an angle with the first edge, the angle being between 0 and 90 degrees while inserted into the first opening and the second opening. The angle may be between 5 degrees and 25 degrees. The first post may include a plurality of ridges that extend in the same direction as the first post. The first post and the second post may be angled towards the first edge. The bone portion may include a tibia bone. A spike may extend from the lower surface, the spike including a tip configured to be inserted into the bone portion. The spike may be a first spike of a plurality of spikes extending away from the lower surface.

According to various embodiments, the surgical implant further includes a fixed articular portion configured to couple with the tray proximate the upper surface, the fixed articular portion including an upper articular surface and a femoral component configured to be coupled to a femur bone, the femoral component including a curved surface configured to engage the upper articular surface to enable relative movement between the tray and the femoral component. According to various embodiments, a first end of the femoral component is angled towards the first edge of the tray while the femoral component engages the upper articular surface. According to various embodiments, the upper articular surface is flat. According to various embodiments, the upper articular surface is parallel to the first plane. According to various embodiments, the upper articular surface is concave. According to various embodiments, the upper articular surface is convex.

According to various embodiments, the surgical implant includes an insert configured to couple to the tray proximate the upper surface, a mobile articular portion configured to engage an upper surface of the insert such that the mobile articular portion is configured to translate relative to the tray, the mobile articular portion including an upper mobile articular surface, and a femoral component configured to be coupled to a femur bone, the femoral component including a curved surface configured to engage the upper mobile articular surface to enable relative movement between the tray and the femoral component and relative movement between the mobile articular portion and the femoral component. According to various embodiments, the upper mobile articular surface is concave. According to various embodiments, the insert is parallel to the first plane while coupled to the tray. According to various embodiments, the first post includes an osteoinductive portion. According to various embodiments, the second post includes an osteoinductive portion. According to other embodiments, neither the first post nor the second post include an osteoinductive portion. According to various embodiments, the first opening extends through the tray and the first post. According to various embodiments, the fastener extends through the upper surface of the tray, into the first opening, and into the second opening. According to various embodiments, the fastener extends out of the first opening towards the second opening at an angle away from the lower surface of the tray. According to various embodiments, the fastener includes a plurality of serrations proximate the first fastener end, wherein the plurality of serrations are configured to engage the first post proximate the first opening.

According to another example embodiment, a surgical implant includes a tray extending from a first end to a second end along a first plane, the tray including an upper surface, a lower surface opposite the upper surface, a first edge extending between the first end and the second end and a second edge opposite the first edge and extending between the first end and the second end, the tray including an first opening extending into the upper surface, a post coupled to and extending from the tray away from the first plane and configured to be inserted into a bone portion, wherein the post including a second opening extending through the post, and a fastener removably coupled to the post, the fastener extending from a first fastener end to a second fastener end through the first opening and the second opening.

According to various embodiments, the first opening includes a first set of threads and the second opening includes a second set of threads, and the fastener includes a first threaded portion configured to engage the first set of threads and a second threaded portion configured to engage the second set of threads. According to various embodiments, the first opening includes a third set of threads configured to engage e a component of a surgical jig to couple the first post to the surgical jig. According to various embodiments, wherein an outer diameter of the first threaded portion is the same as the outer diameter of the second threaded portion. According to various embodiments, the first set of threads is configured to engage the first threaded portion such that rotation of the fastener causes translation of the first threaded portion though the first opening when the first threaded portion engages the first set of threads, and engage the second threaded portion such that such that rotation of the fastener causes translation of the second threaded portion though the first opening when the second threaded portion engages the first set of threads. According to various embodiments, the fastener extends in direction that is angled relative to the first plane and forms an angle with lower surface, the angle being between 0 and 90 degrees. According to various embodiments, the angle is between 25 degrees and 65 degrees. According to various embodiments, the post includes a plurality of ridges that extend in the same direction as the post. According to various embodiments, the post is angled towards the first edge. According to various embodiments, the bone portion includes a tibia bone. According to various embodiments, a spike extending from the lower surface, the spike including a tip configured to be inserted into the bone portion. According to various embodiments, the spike is a first spike of a plurality of spikes extending away from the lower surface.

According to various embodiments, the surgical implant includes a fixed articular portion configured to couple with the tray proximate the upper surface, the fixed articular portion including an upper articular surface, and a femoral component configured to be coupled to a femur bone, the femoral component including a curved surface configured to engage the upper articular surface to enable relative movement between the tray and the femoral component. According to various embodiments, a first end of the femoral component is angled towards the first edge of the tray while the femoral component engages the upper articular surface. According to various embodiments, the upper articular surface is flat. According to various embodiments, the upper articular surface is parallel to the first plane. According to various embodiments, the upper articular surface is concave. According to various embodiments, the upper articular surface is convex.

According to various embodiments, the surgical implant includes an insert configured to couple to the tray proximate the upper surface, a mobile articular portion configured to engage an upper surface of the insert such that the mobile articular portion is configured to translate relative to the tray, the mobile articular portion including an upper mobile articular surface, and a femoral component configured to be coupled to a femur bone, the femoral component including a curved surface configured to engage the upper mobile articular surface to enable relative movement between the tray and the femoral component and relative movement between the mobile articular portion and the femoral component. According to various embodiments, the upper mobile articular surface is concave. According to various embodiments, the insert is parallel to the first plane while coupled to the tray. According to various embodiments, the post includes an osteoinductive portion. According to other embodiments, the post does not include an osteoinductive portion. According to various embodiments, the post is integrally formed with the tray. According to various embodiments, the spike is integrally formed with the tray.

According to another example embodiment, a surgical kit includes a tray extending from a first end to a second end along a first plane, the tray including an upper surface, a lower surface opposite the upper surface, a first edge extending between the first end and the second end and a second edge opposite the first edge and extending between the first end and the second end, the tray being configured to couple to a tibia, a fixed articular portion configured to couple with the tray proximate the upper surface, the fixed articular portion including an upper articular surface, an insert configured to couple to the tray proximate the upper surface, and a mobile articular portion configured to engage an upper surface of the insert such that the mobile articular portion is configured to translate relative to the tray, the mobile articular portion including an upper mobile articular surface.

According to various embodiments, the surgical kit includes a first post coupled to and extending from the tray away from the first plane and configured to be inserted into a bone portion, the first post including a first opening extending through the first post, a second post coupled to and extending from the tray away from the first plane and configured to be implanted into the bone portion, the second post including a second opening extending through the second post, and a fastener removably coupled to the first post and the second post, the fastener extending from a first fastener end to a second fastener end through the first opening and the second opening. According to various embodiments, the first opening includes a first set of threads and the second opening includes a second set of threads, and the fastener includes a first threaded portion configured to engage the first set of threads and a second threaded portion configured to engage the second set of threads. According to various embodiments, an outer diameter of the first threaded portion is the same as the outer diameter of the second threaded portion. According to various embodiments, the first set of threads is configured to engage the first threaded portion such that rotation of the fastener causes translation of the first threaded portion though the first opening when the first threaded portion engages the first set of threads, and engage the second threaded portion such that such that rotation of the fastener causes translation of the second threaded portion though the first opening when the second threaded portion engages the first set of threads. According to various embodiments, the fastener extends in direction that is parallel to the first plane and forms an angle with the first edge, the angle being between 0 and 90 degrees when inserted into the first opening and the second opening. According to various embodiments, the angle is between 5 degrees and 25 degrees. According to various embodiments, the first post includes a plurality of ridges that extend in the same direction as the first post. According to various embodiments, the first post and the second post are angled towards the first edge. According to various embodiments, a spike extends from the lower surface, the spike including a tip configured to be inserted into a bone portion. According to various embodiments, the spike is a first spike of a plurality of spikes extending away from the lower surface.

According to various embodiments, a femoral component configured to be coupled to a femur bone, the femoral component including a curved surface configured to engage an upper articular surface to enable relative movement between the tray and the femoral component. According to various embodiments, a first end of the femoral component is angled towards the first edge of the tray while the femoral component engages the upper articular surface. According to various embodiments, the upper articular surface is flat. According to various embodiments, the upper articular surface is parallel to the first plane. According to various embodiments, the upper articular surface is concave. According to various embodiments, the upper articular surface is convex.

According to various embodiments, the surgical kit includes a femoral component configured to be coupled to a femur bone, the femoral component including a curved surface configured to engage an upper articular surface to enable relative movement between the tray and the femoral component. According to various embodiments, a first end of the femoral component is angled towards the first edge of the tray while the femoral component engages the upper articular surface. According to various embodiments, the upper articular surface is flat. According to various embodiments, the upper articular surface is parallel to the first plane. According to various embodiments, the upper articular surface is concave. According to various embodiments, the upper articular surface is convex.

According to various embodiments, the surgical kit includes a femoral component configured to be coupled to a femur bone, the femoral component including a curved surface configured to engage the upper mobile articular surface to enable relative movement between the tray and the femoral component and relative movement between the mobile articular portion and the femoral component. According to various embodiments, the upper mobile articular surface is concave. According to various embodiments, the insert is parallel to the first plane while coupled to the tray. According to various embodiments, the first post includes an osteoinductive portion. According to various embodiments, the second post includes an osteoinductive portion. According to other embodiments, neither the first post nor the second post include an osteoinductive portion. According to various embodiments, the first opening extends through the tray and the first post.

According to various embodiments, the fastener extends through the upper surface of the tray, into the first opening, and into the second opening. According to various embodiments, the fastener extends out of the first opening towards the second opening at an angle away from the lower surface of the tray. According to various embodiments, the fastener includes a plurality of serrations proximate the first fastener end, wherein the plurality of serrations are configured to engage the first post proximate the first opening.

According to an example embodiment, a method includes creating an first aperture in a bone portion, creating a second aperture in the bone portion, creating a third aperture in the bone portion, the third aperture extending into the second aperture, providing a surgical implant at the bone portion, the surgical implant, including a tray extending from a first end to a second end along a first plane, the tray including an upper surface, a lower surface opposite the upper surface and configured to engage the bone portion, a first edge extending between the first end and the second end and a second edge opposite the first edge and extending between the first end and the second end, a first post coupled to and extending from the tray away from the first plane and configured to be inserted into the first aperture, the first post including a first opening extending through the first post, a second post coupled to and extending from the tray away from the first plane and configured to be implanted into the second aperture, the second post including a second opening extending through the second post. The method further including inserting a fastener into the third aperture, the fastener extending from a first fastener end to a second fastener end through the first opening and the second opening.

According to various embodiments, inserting the fastener into the third aperture involves inserting the fastener until a first threaded portion engages a first set of threads on the first opening, rotating the fastener as the first threaded portion engages the first set of threads such that the fastener translates through the first opening, inserting the fastener until the first threaded portion engages a second set of threads on the second opening, and rotating the fastener as the first threaded portion engages the second set of threads such that the fastener translates into the second opening. According to various embodiments, inserting the fastener into the third aperture further involves rotating the fastener as a second threaded portion engages the first set of threads. According to various embodiments, the fastener extends in direction that is parallel to the first plane and forms an angle with the first edge, the angle being between 0 and 90 degrees when inserted into the first opening and the second opening. According to various embodiments, the angle is between 5 degrees and 25 degrees. According to various embodiments, the first post includes a plurality of ridges that extend in the same direction as the first post. According to various embodiments, the first post and the second post are angled towards the first edge. According to various embodiments, the bone portion includes a tibia bone.

According to various embodiments, the method includes inserting a spike into the bone portion, the spike extending from the lower surface. According to various embodiments, the spike is a first spike of a plurality of spikes extending away from the lower surface.

According to various embodiments, the bone portion includes a tibia bone and the method further includes coupling a fixed articular portion to the tray proximate the upper surface, the fixed articular portion including an upper articular surface, and coupling a femoral component to a femur bone, the femoral component including a curved surface configured to engage the upper articular surface to enable relative movement between the tray and the femoral component. According to various embodiments, a first end of the femoral component is angled towards the first edge of the tray while the femoral component engages the upper articular surface. According to various embodiments, the upper articular surface is flat. According to various embodiments, the upper articular surface is parallel to the first plane. According to various embodiments, the upper articular surface is concave. According to various embodiments, the upper articular surface is convex.

According to various embodiments, the bone portion includes a tibia bone and the method further includes coupling an insert to the tray proximate the upper surface, engaging a mobile articular portion with an upper surface of the insert such that the mobile articular portion is configured to translate relative to the tray, the mobile articular portion including an upper mobile articular surface, and coupling a femoral component to a femur bone, the femoral component including a curved surface configured to engage the upper mobile articular surface to enable relative movement between the tray and the femoral component and relative movement between the mobile articular portion and the femoral component. According to various embodiments, the upper mobile articular surface is concave. According to various embodiments, the insert is parallel to the first plane while coupled to the tray. According to various embodiments, the first post includes an osteoinductive portion. According to various embodiments, the second post includes an osteoinductive portion. According to other embodiments, neither the first post nor the second post include an osteoinductive portion. According to various embodiments, the first opening extends through the tray and the first post. According to various embodiments, the fastener extends through the upper surface of the tray, into the first opening, and into the second opening. According to various embodiments, the fastener extends out of the first opening towards the second opening at an angle away from the lower surface of the tray. According to various embodiments, the fastener includes a plurality of serrations proximate the first fastener end, wherein the plurality of serrations are configured to engage the first post proximate the first opening.

According to another example embodiment, a surgical jig includes a first support extending along a first axis, a second support coupled to the first support and configured to selectively translate in a first direction parallel to the first axis, an adjustment bar coupled to an end of the second support and configured to selectively translate along a second axis that is perpendicular to the first axis, a first cutting block coupled to the adjustment bar via a first angular adjustment mechanism and a second angular adjustment mechanism, the first angular adjustment mechanism configured to rotatably modify the first cutting block relative to the adjustment bar along a third axis that is parallel with the second axis and the second angular adjustment mechanism configured to rotatably modify the first cutting block relative to the adjustment bar along a fourth axis that is perpendicular to the third axis, the first cutting block including a first plurality of openings extending through a body of the first cutting block, a second cutting block adjustably coupled to the first cutting block along such that a distance along a fifth axis between an upper surface of the first cutting block and a lower surface of the second cutting block can be selectively adjusted, a third cutting block adjustably coupled to the second cutting block the along a sixth axis that is perpendicular to the fifth axis, the third cutting block including an opening extending through the third cutting block, and a bar coupled to the third cutting block and extending in a direction perpendicular to the sixth axis, the bar including an end portion configured to engage a bone portion.

According to various embodiments, the second support is configured to translate within an opening of the second support. According to various embodiments, the first plurality of openings includes a first opening that extends in a direction parallel to the fourth axis. According to various embodiments, the first plurality of openings further includes a second opening that extends in an angled direction relative to the first opening. According to various embodiments, the first plurality of openings further includes a third opening, the second opening and the third opening being angled towards one another. According to various embodiments, the second cutting block adjustably coupled to the first cutting block such that the distance between the upper surface of the first cutting block and the lower surface of the second cutting block can be selectively adjusted between a fixed number of positions. According to various embodiments, the third cutting block is adjustably coupled to a second cutting block in a fixed number of positions. According to various embodiments, the third cutting block includes a slot configured to receive a plate coupled to the bar.

According to another example embodiments, a surgical jig for preparing a portion of a femur includes a body portion including an outer surface an inner surface opposite the outer surface configured to interface with the portion of the femur, an aperture extending through the body portion and configured to receive a drill, a first slot extending into the outer surface and terminating at a ledge, and a second slot extending from the ledge through the inner surface of the body portion and a screw comprising a head configured to be received within the first slot and a threaded portion configured to be received within the second slot such that the head can translate within the first slot, wherein the second slot prevents the head from extending past the inner surface.

According to various embodiments, a third slot extending through the body portion in a direction perpendicular to the first slot. According to various embodiments, the aperture is a first aperture and the body portion further includes a second aperture extending though the body portion in a direction parallel to the first aperture. According to various embodiments, a portion of the third slot intersects the aperture.

According another example embodiment, a surgical jig for preparing a portion of a femur includes a baseplate extending in a first direction and having an upper surface and a lower surface that is parallel to the upper surface, the baseplate including a first spacer coupled to the upper surface of the baseplate and configured to translate in the first direction relative to the baseplate, a second spacer coupled to the lower surface of the baseplate and configured to translate in the first direction relative to the baseplate, and a cutting block coupled to the baseplate and configured to translate in the first direction relative to the baseplate, the baseplate extending in a second direction perpendicular to the first direction, the cutting block including a plurality of openings extending though the cutting block in the first direction.

According to various embodiments, an upper surface of the first spacer is parallel to the upper surface of the baseplate. According to various embodiments, a lower surface of the second spacer is parallel to the lower surface of the baseplate.

According to another example embodiment, a surgical jig for preparing a portion of a femur includes a baseplate extending in a first direction and having an upper surface and a lower surface that is parallel to the upper surface, the baseplate including a first spacer coupled to the upper surface of the baseplate and configured to translate in the first direction relative to the baseplate, a second spacer coupled to the lower surface of the baseplate and configured to translate in the first direction relative to the baseplate, and a cutting block coupled to the baseplate and configured to translate in the first direction relative to the baseplate, the baseplate extending in a second direction perpendicular to the first direction, the cutting block including a plurality of screw apertures configured to individually receive a plurality of screws and a first drill aperture extending though the cutting block along a first axis, and a second drill aperture extending through the cutting block along a second axis parallel to the first axis.

According to various embodiments, the first axis forms an angle with the upper surface, the angle being between 15 degrees and 60 degrees. According to various embodiments, an upper surface of the first spacer is parallel to the upper surface of the baseplate. According to various embodiments, a lower surface of the second spacer is parallel to the lower surface of the baseplate.

According to various embodiments, one or more of the surgical implants described herein are utilized during a cementless UKA. For example, one or more of the trays described herein may be implanted into a desired location in a tibia bone. As is discussed further herein, the surficial implants described herein may offer stability, reliability, and enable the patient to achieve long-term biologic osseous ingrowth.

According to various embodiments, the fixation system used to secure the surgical implant into a desired location limits motion (e.g., micro motions) of the surgical implant for a sufficient period of time such that biological ingrowth of the implant may occur. For example, one or more posts may extend from a tray and a fastener may be inserted through an opening in each of the posts. The fastener may be inserted through a portion of the tibia such that the fastener engages the posts and the tibia to secure the implant in a desired location. The fastener may include one or more sets of threads (e.g., locking threads) that coupled the fastener to the one or more posts. According to various embodiments, the locking screw trajectory is divergent from a center axis such that the locking screw compresses the tray to the tibia bone during screw implantation.

According to various embodiments, the tray (e.g., a baseplate) of the implant may be configured to accept both a fixed articular portion (e.g., a fixed bearing portion) and a mobile articular portion (e.g., a mobile bearing portion) such that the tray can be used with either type of articular portion. In this sense, a surgeon may use either a fixed articular portion (e.g., a fixed bearing portion) or a mobile articular portion (e.g., a mobile bearing portion) in conjunction with the tray. According to various embodiments, the mobile bearing UKA uses a highly polished metal insert that locks into the tray, thereby permitting the mobile articular portion to articulate and move relative to the tray. According to other embodiments, the insert may be made of ceramic, polished ceramic, polished ceramic coated metal, or polyethylene or any combination thereof. In the same tray, a fixed bearing polyethylene insert may be coupled to the tray. This permits the surgeon to have the option of treating each patient with either a mobile or fixed bearing baseplate. Further, a patient's UKA may be converted from a mobile bearing to a fixed bearing, or vice versa, without the need to change the tray.

In order to facilitate an understanding of the disclosure, the preferred embodiments of the disclosure are illustrated in the drawings, and a detailed description thereof follows. It is not intended, however, that the disclosure be limited to the particular embodiments described or to use in connection with the apparatus illustrated herein. Various modifications and alternative embodiments such as would ordinarily occur to one skilled in the art to which the disclosure relates are also contemplated and included within the scope of the disclosure described and claimed herein.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the disclosure may be combined with one or more features of a different aspect of the disclosure. Moreover, additional features may be recognized in certain embodiments and/or implementations that may not be present in all embodiments or implementations.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 37 is an exploded view of the surgical implant of FIG. 33.

FIG. 38 is another exploded view of the surgical implant of FIG. 33.

FIG. 69 is a perspective view of another surgical jig, according to an example embodiment.

FIG. 70 is another perspective view of the surgical jig of FIG. 69, according to an example embodiment.

FIG. 119 is a front view of the fixed articular component of FIG. 114, according to an example embodiment.

FIG. 120 is a perspective view of a fixed articular component, according to an example embodiment.

FIG. 121 is another perspective view of the fixed articular component of FIG. 117, according to an example embodiment.

FIG. 122 is a front view of the fixed articular component of FIG. 114, according to an example embodiment.

DETAILED DESCRIPTION OF THE PREFERRED EMBODIMENT

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The use of "e.g.," "etc.," "for instance," "in example," and "or" and grammatically related terms indicates non-exclusive alternatives without limitation, unless otherwise noted. The use of "optionally" and grammatically related terms means that the subsequently described element, event, feature, or circumstance may or may not be present/occur, and that the description includes instances where said element, event, feature, or circumstance occurs and instances where it does not. The use of "attached" and "coupled" and grammatically related terms refers to the fixed, releasable, or integrated association of two or more elements and/or devices with or without one or more other elements in between. Thus, the term "attached" or "coupled" and grammatically related terms include releasably attaching or fixedly attaching two or more elements and/or devices in the presence or absence of one or more other elements in between. As used herein, the terms "proximal" and "distal" are used to describe opposing axial ends of the particular elements or features being described in relation to anatomical placement.

While the systems, methods, and components described with reference to systems and methods for knee prostheses, the systems, methods, and components described and illustrated herein can be used to treat any suitable ailment or joint within the body of an animal, including, but not limited to, humans. Skilled artisans will be able to select a suitable ailment and/or joint within the body of an animal to utilize a system and/or method described herein according to a particular embodiment based on various considerations, including the type of ailment and/or the structural arrangement at a treatment site. Example joints considered suitable to utilize a system, method, and/or component described herein include, but are not limited to, the shoulder joint, the elbow joint, the knee joint, the hip joint, and the ankle joint.

Figure 1:
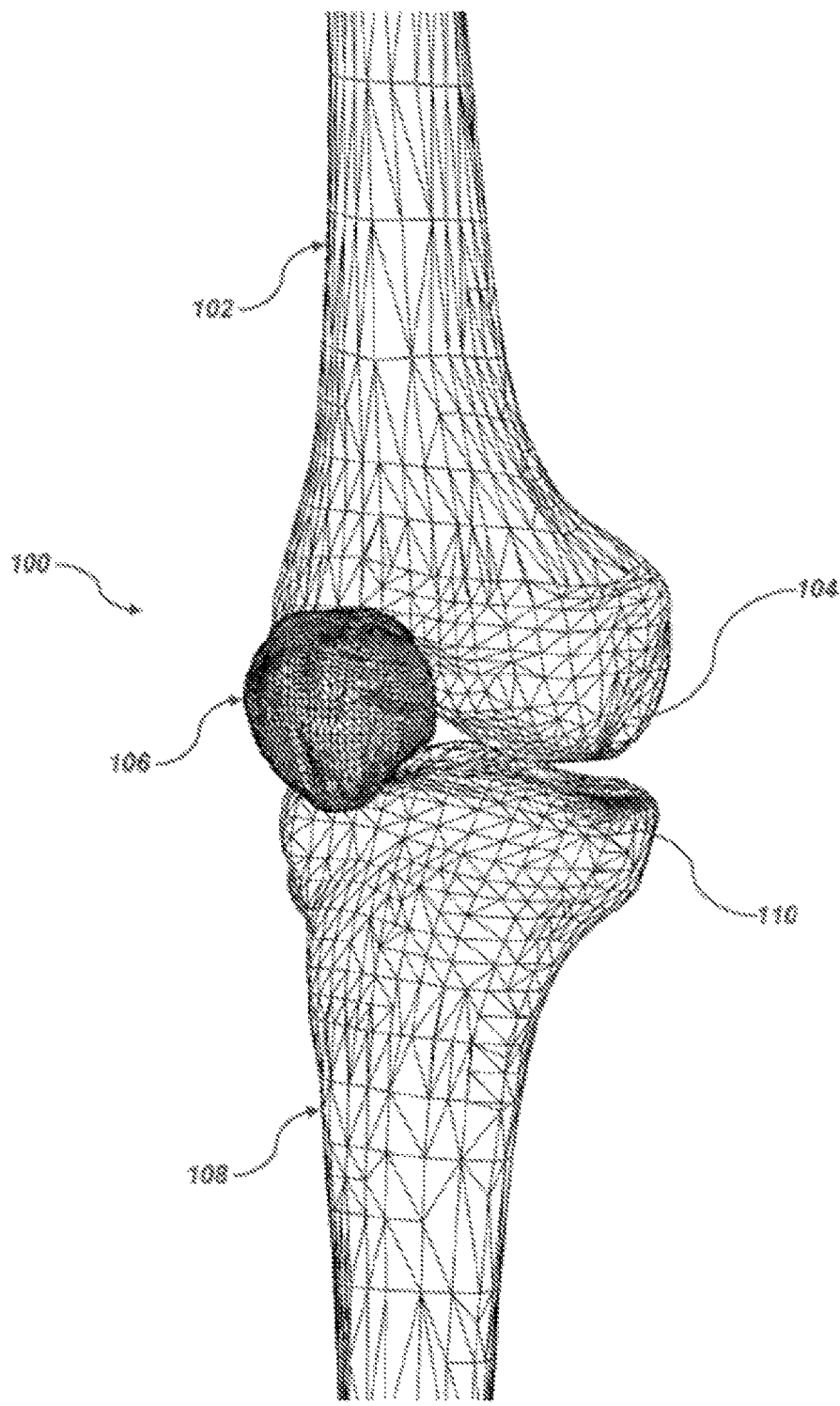
FIG. 1 is an illustration of an anterior/medial view of the bones of a human knee joint, according to an example embodiment.

FIG. 1 is an anterior view of the bones of a normal human knee joint. As shown therein, the knee 100 includes the femur 102 with the medial condyle 104 of the distal end of the femur, the patella 106, and the tibia 108 with the medial tibial plateau 110 of the proximal tibia. The knee is held in place by passive suspension with the aid of the anterior cruciate, posterior cruciate, medial collateral, and lateral collateral ligaments (not shown), by active suspension in which the knee muscles, including the quadriceps and hamstring help to balance the knee, and is separated by articular cartilage on the distal end of the femur and the meniscus on the proximal end of the tibia.

Arthritis, bone disease or injury can alter the smooth functioning of the knee joint. In primary unicompartmental knee repair, the medial femoral condyle is typically removed, and a prosthetic component is implanted in its place, and the medial tibial plateau is typically removed, and a prosthetic tray and articular surface is implanted in its place. Unicompartmental knee repair may preserve more naturally occurring knee tissue and normal knee kinematics (e.g., as compared to a total knee replacement) by retaining the anterior cruciate ligament, posterior cruciate ligament and other compartments of the joint.

FIGS. 2-32 illustrate components for use in a knee joint repair or reconstruction according to the disclosure so that the knee joint may be stabilized in such a way that normal joint functions can be maintained.

Figure 2:
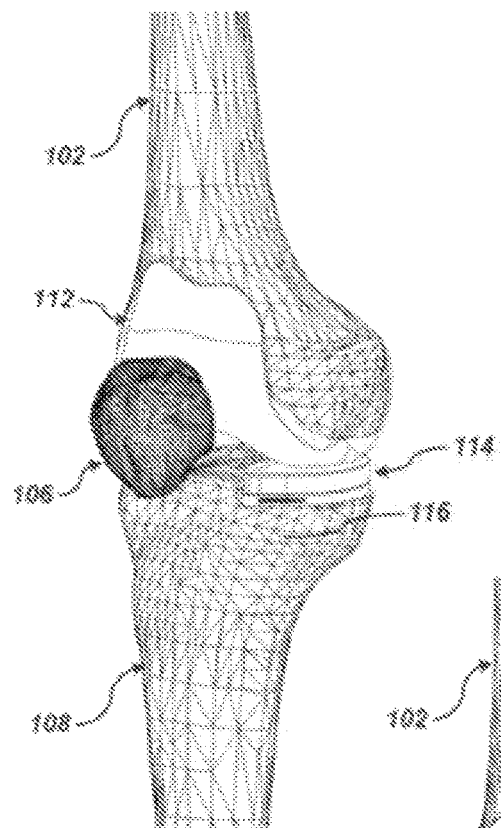
FIG. 2 is an illustration of an anterior/medial view of an implant inserted into a human knee joint, according to an example embodiment.
Figure 3:
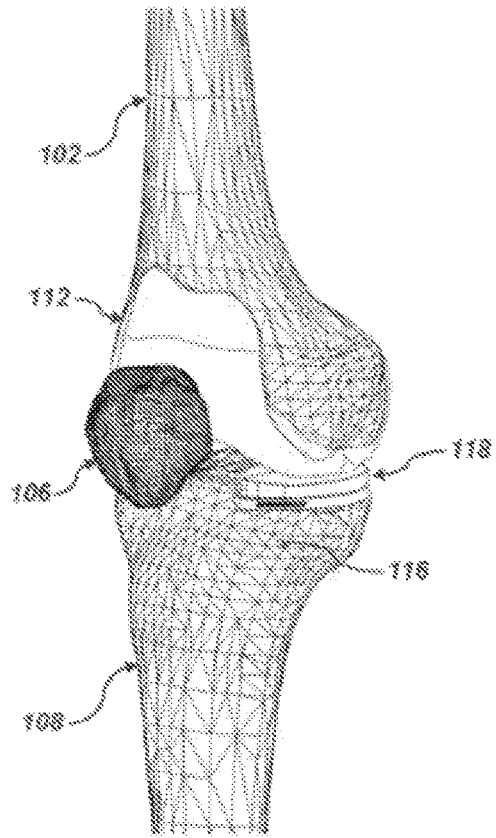
FIG. 3 is an illustration of an anterior/medial view of an implant inserted into a human knee joint, according to another example embodiment.
Figure 4:
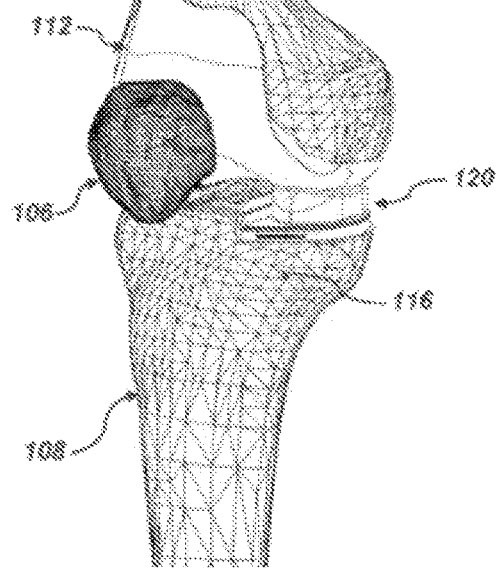
FIG. 4 is an illustration of an anterior/medial view of an implant inserted into a human knee joint, according to another example embodiment.

A first embodiment of the disclosure is shown in FIGS. 2-4 with optional articular components and illustrated in a knee joint. As shown therein, a femoral component 112 attached to the distal end of femur 102, and the first embodiment shown with the optional articular components 114, 118, and 120. This first embodiment has a screw that attaches through a hole 116 on the anterior tibia.

Figure 5:
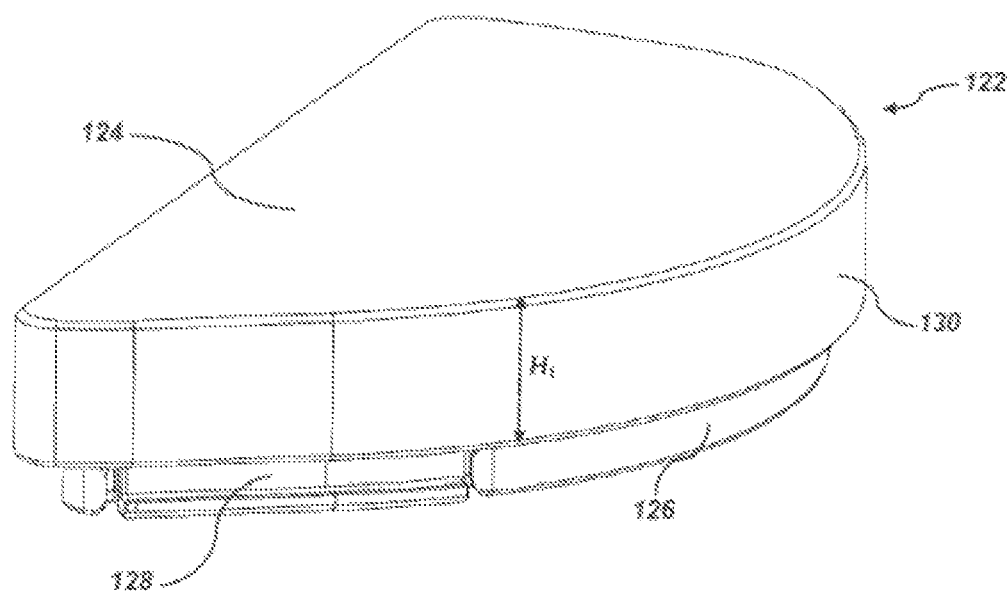
FIG. 5 is a front perspective view of a first articular component, according to an example embodiment.
Figure 6:
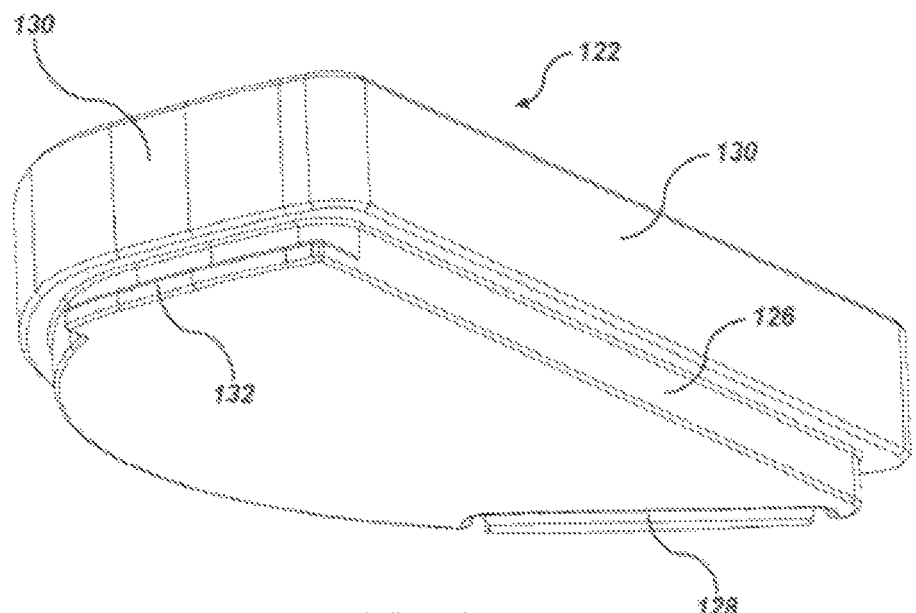
FIG. 6 is a rear perspective view of the first articular component of FIG. 5.

In the articular component 122 of the disclosure illustrated in FIGS. 5 and 6, the superior portion 124, which articulates with a femoral component (not shown), is shown as flat and fits into tibial tray (not shown) with geometry 126 and can be of thickness 130 with a distance $H_1$. Articular component 122 can attach to tibial tray anteriorly via a snap feature 128 and posteriorly via a tab 132, although other methods of attachment are possible.

Figure 7:
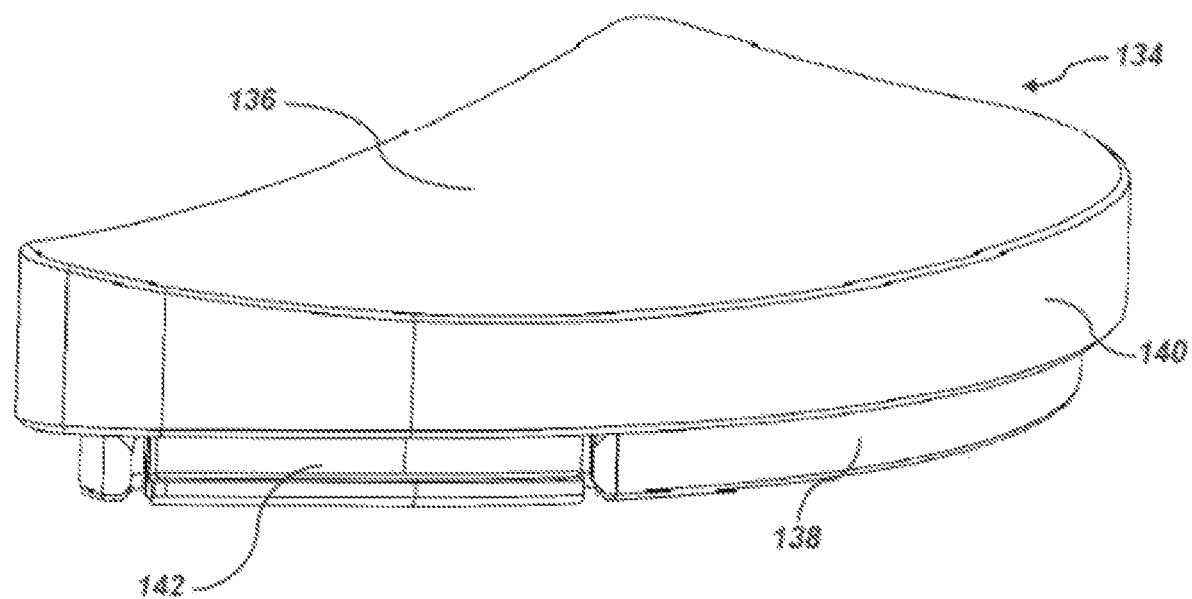
FIG. 7 is a front perspective view of a second articular component, according to an example embodiment.
Figure 8:
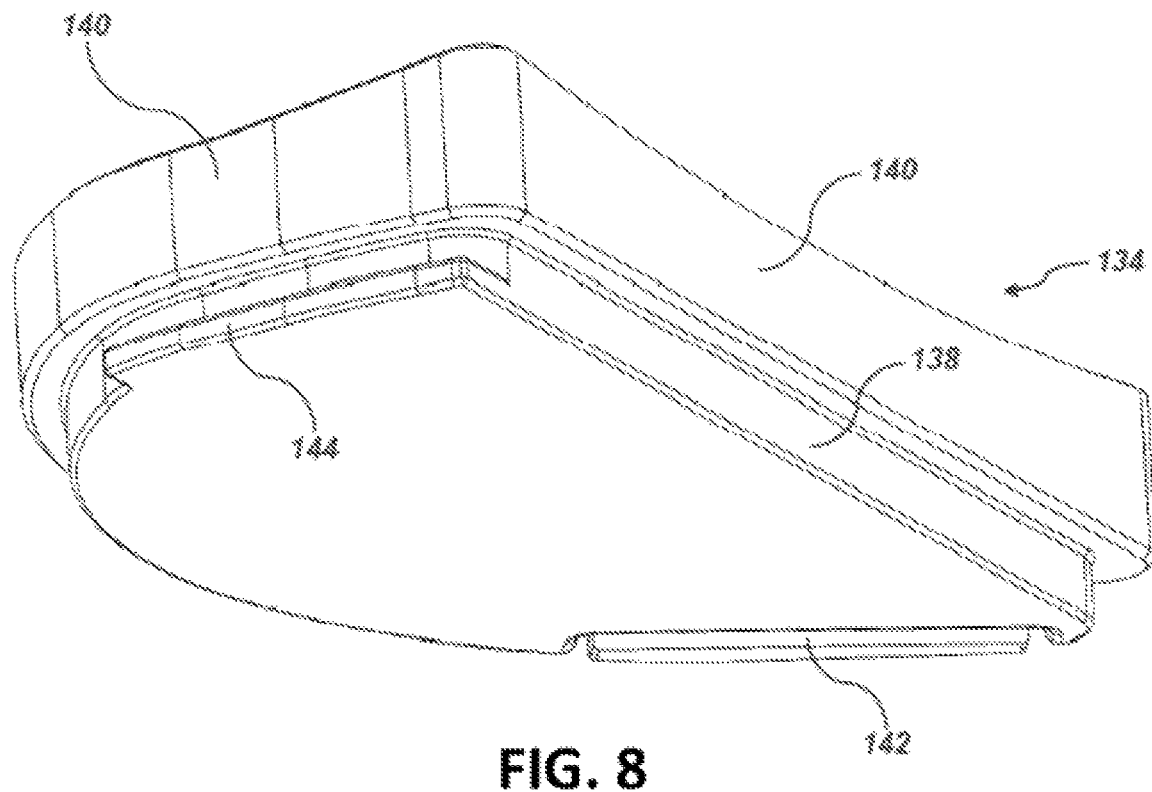
FIG. 8 is a rear perspective view of the second articular component of FIG. 7.

In the articular component 134 of the disclosure illustrated in FIGS. 7 and 8, the superior portion 136, which articulates with a femoral component (not shown), is shown as concave and fits into tibial tray (not shown) with geometry 138 and can be of variable thickness 140. Articular component 134 can attach to tibial tray anteriorly via a snap feature 142 and posteriorly via a tab 144, although other methods of attachment are possible.

Figure 9:
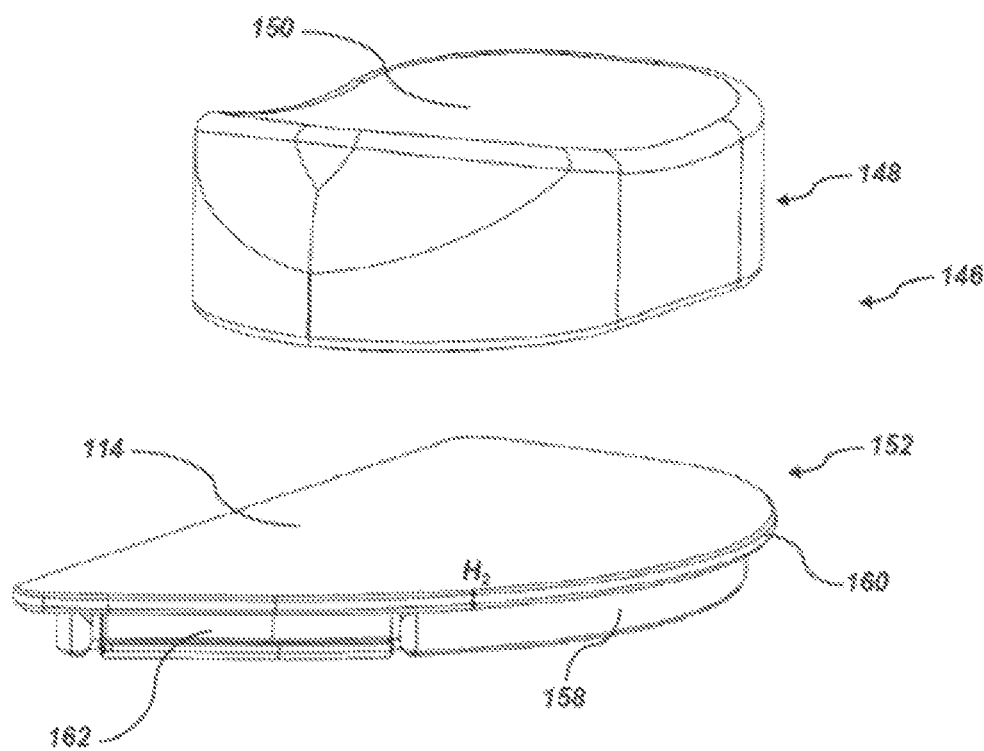
FIG. 9 is a front perspective view of an insert and a third articular component, according to an example embodiment.
Figure 10:
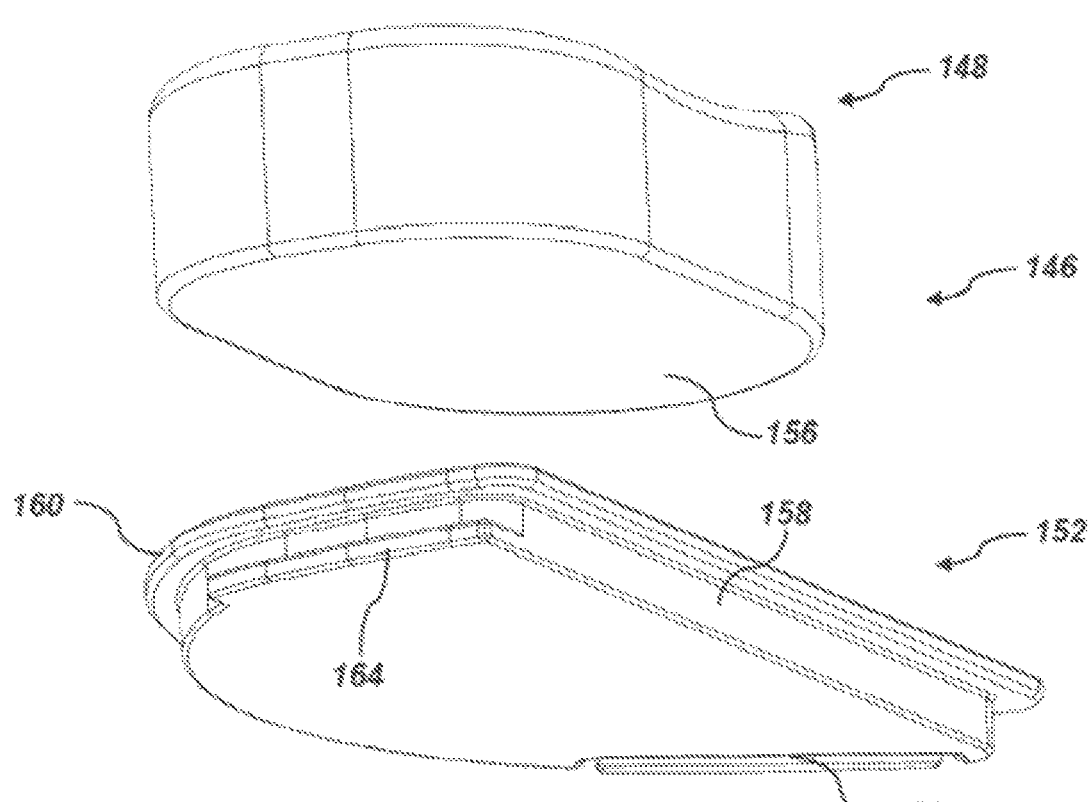
FIG. 10 is a rear perspective view of the insert and the third articular component of FIG. 9.

In the articular assembly 146 of the disclosure illustrated in FIGS. 9 and 10, the articular component 148, which articulates with a femoral component (not shown), has a superior concave surface 150. Bearing component 152 has a superior flat surface 154 which articulates with the flat bottom 156 of articular component 148 and fits into tibial tray (not shown) with geometry 158 and can be of thickness 160 with a distance $H_2$. Bearing component 152 can attach to tibial tray (not shown) anteriorly via a snap feature 162 and posteriorly via a tab 164, although other methods of attachment are possible.

Figure 11:
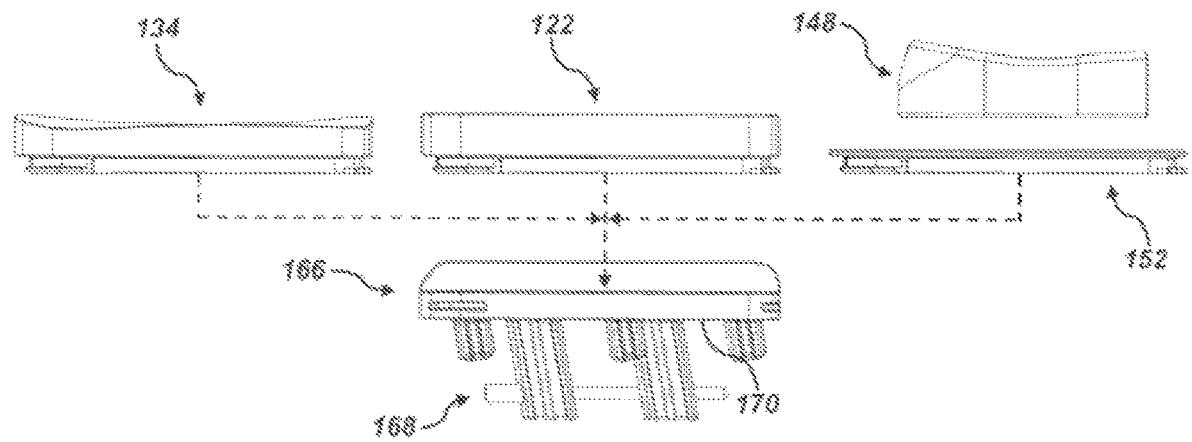
FIG. 11 is a side view of a modular implant assembly, according to an example embodiment.

FIG. 11 illustrates how tibial tray 166 can have various different articular/bearing components, including 122, 134, 148, and 152. Tibial tray 166 is illustrated with a fastener 168 arranged preferentially parallel to tibial tray fixation surface 170 creating a modular keel arrangement.

Figure 12:
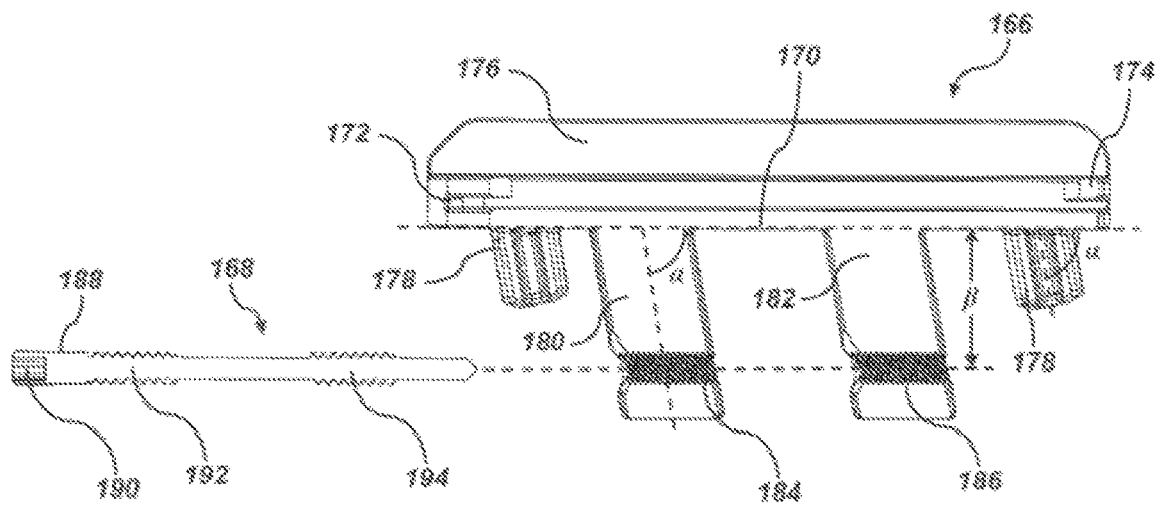
FIG. 12 is a cross section view of a surgical implant, according to an example embodiment.

FIG. 12 is a section view of tibial tray 166 and fastener 168. Tibial tray 166 has slots 172 anteriorly and 174 posteriorly for attachment to articular/bearing components 122, 134, and 152, a lateral keel 176, peripheral fixation pegs 178 that may be of different lengths than central fixation pegs 180 and 182, and peripheral fixation pegs 178 and central fixation pegs 180 and 182 can be preferentially angled at α degrees. Central fixation peg 180 has a threaded cavity 184 and central fixation peg 182 has a threaded or non-threaded cavity 186, each cavity accepting a fastener 168. Fastener 168 has a proximal end 188 with geometry 190 for a screwdriver, a threaded section 192, and a threaded or smooth distal section 194. Fastener 168 is preferentially directed parallel β to fixation surface 170.

Figure 13:
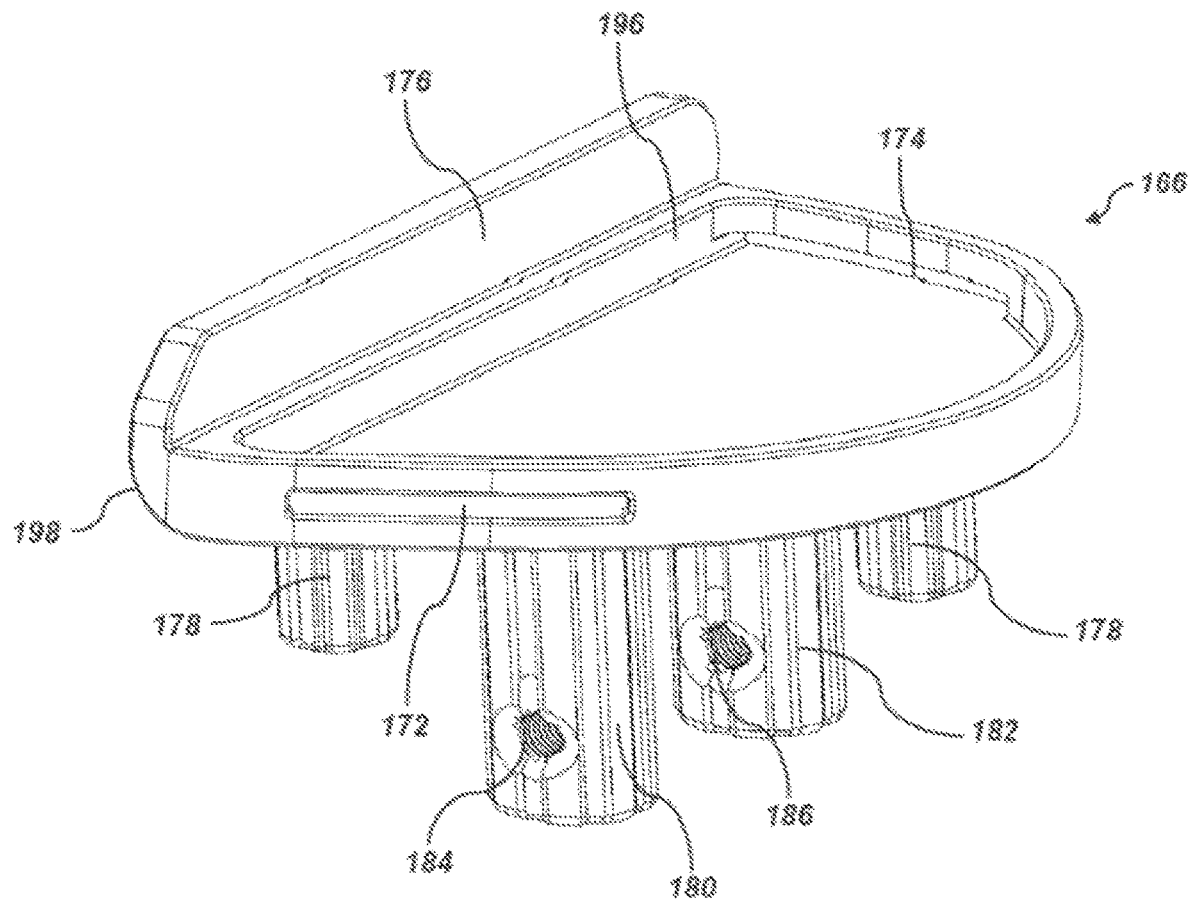
FIG. 13 is a front perspective view of a tibial tray, according to an example embodiment.

FIG. 13 is a front perspective view of the tibial tray 166. Tibial tray 166 has internal geometry 196 to accept various iterations articular/bearing components, slots 172 anteriorly and 174 posteriorly for attachment to articular/bearing components, a lateral keel 176, peripheral fixation pegs 178 that may be of different lengths than central fixation pegs 180 and 182. Tibial tray 166 is filleted along inferior/lateral edge 198 to help in relieving stress risers on the cut bone surface. Central fixation peg 180 has a threaded cavity 184 and central fixation peg 182 has a threaded or non-threaded cavity 186.

Figure 14:
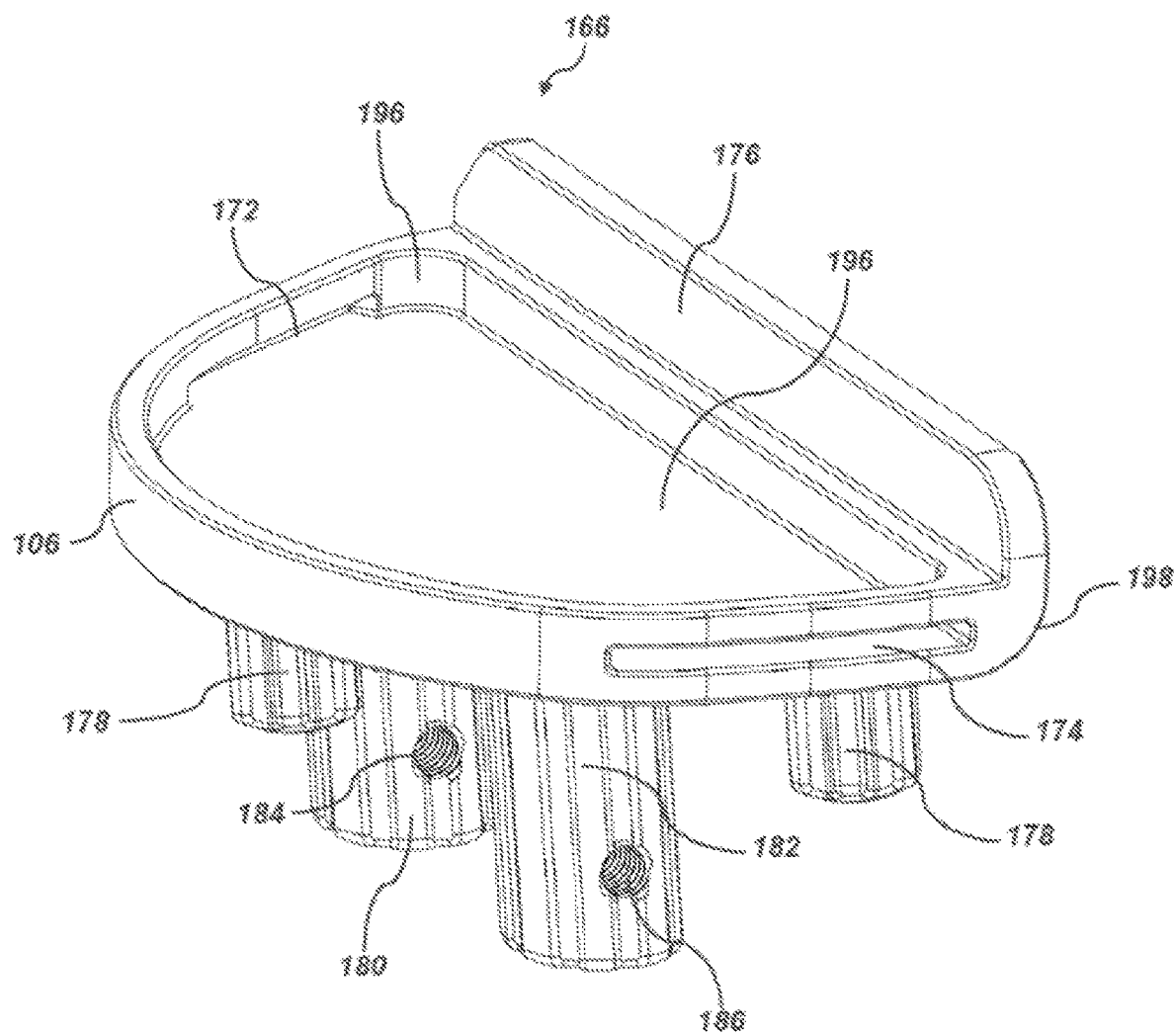
FIG. 14 is a rear perspective view of the tibial tray of FIG. 13.

FIG. 14 is a rear perspective view of the tibial tray 166. Tibial tray 166 has internal geometry 196 to accept various iterations and geometries of articular/bearing components (not shown), slots 172 anteriorly and 174 posteriorly for attachment to articular/bearing central fixation pegs 180 and 182, and side geometry to more closely match the shape of the cut tibial plateau. Tibial tray 166 is filleted along inferior/lateral edge 198 to help in relieving stress risers on the cut bone surface. Central fixation peg 180 has a threaded cavity 184 and central fixation peg 182 has a threaded or non-threaded cavity 186.

Figure 15:
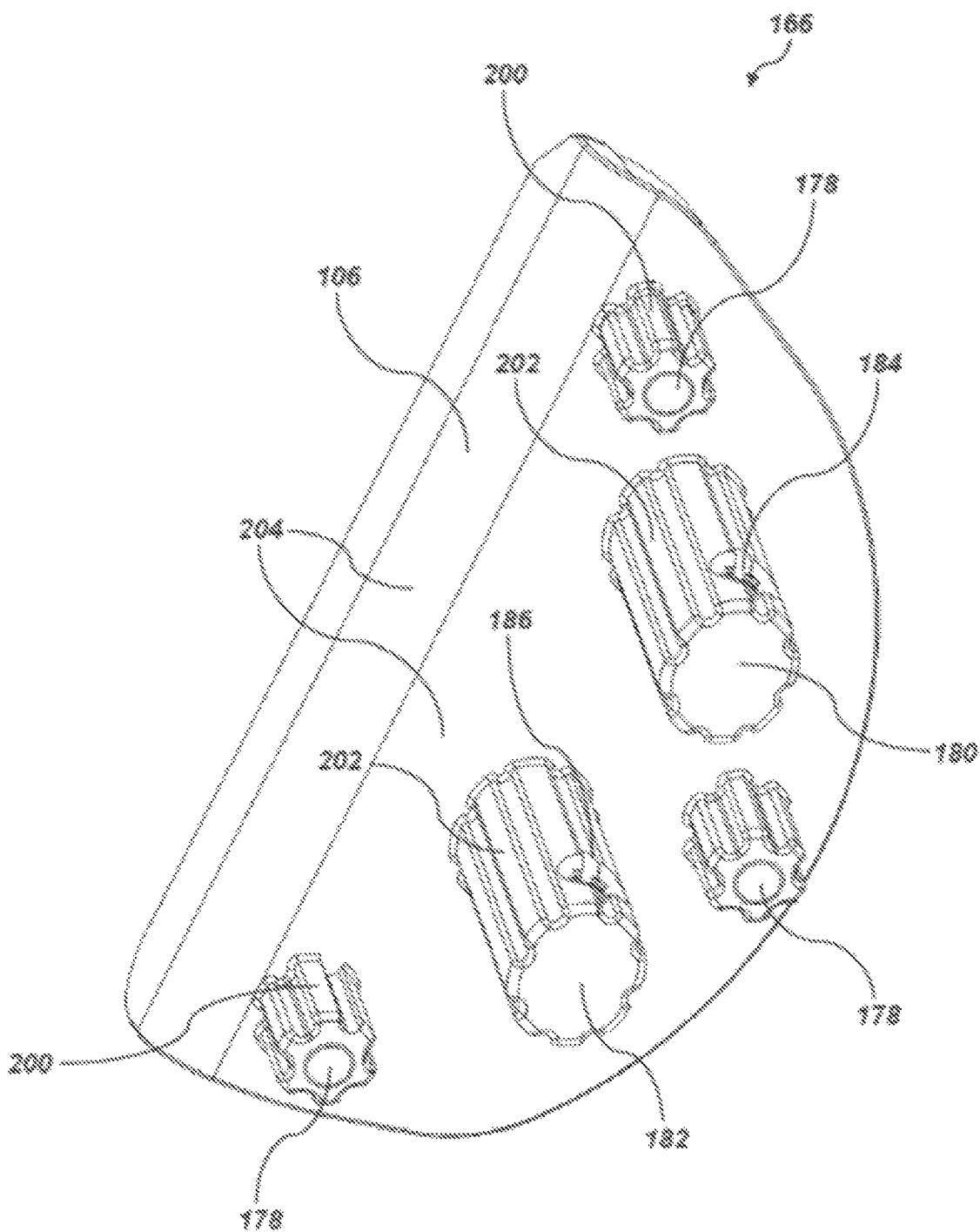
FIG. 15 is an inferior perspective view of the tibial tray of FIG. 13.

FIG. 15 is an inferior perspective view of the tibial tray 166. Tibial tray 166 has peripheral fixation pegs 178 that can be smooth or have 1 groove or 1+N grooves 200 circumferentially along peg, and can be of different lengths than central fixation pegs 180 and 182 that can be smooth or have 1 groove or 1+N grooves 202 circumferentially along peg, and side geometry to more closely match the shape of the cut tibial plateau. Tibial tray 166 is filleted along inferior/lateral edge 198 to help in relieving stress risers on the cut bone surface. Central fixation peg 180 has a threaded cavity 184 and central fixation peg 182 has a threaded or non-threaded cavity 186. The underside of tibial tray 204 can be smooth of have an irregular surface to aid in bone ingrowth into surface for added fixation.

Figure 16:
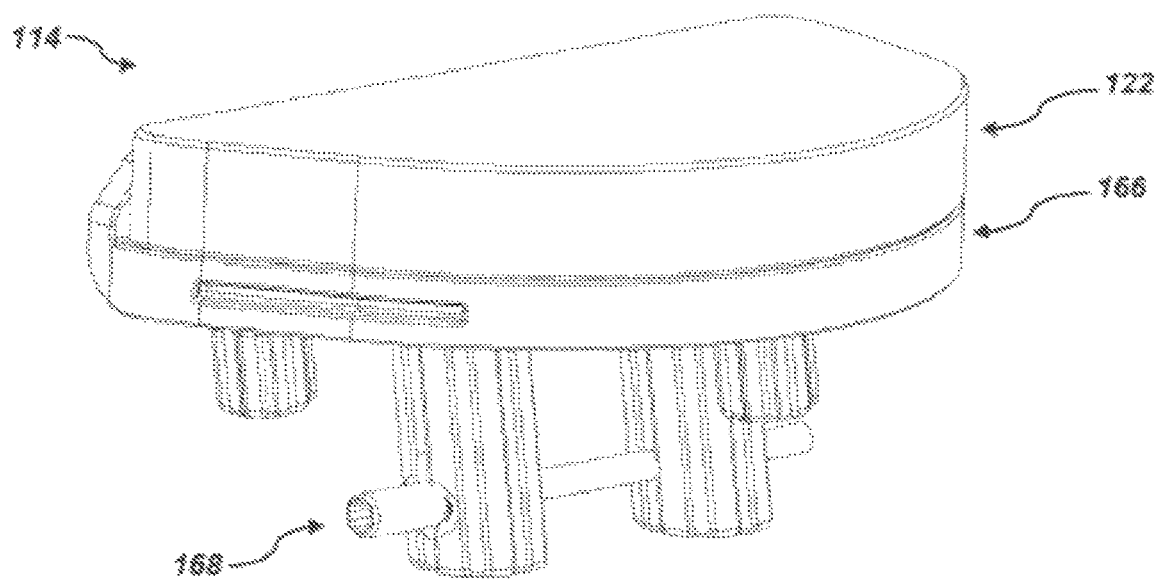
FIG. 16 is a front perspective view of another surgical implant, according to an example embodiment.
Figure 17:
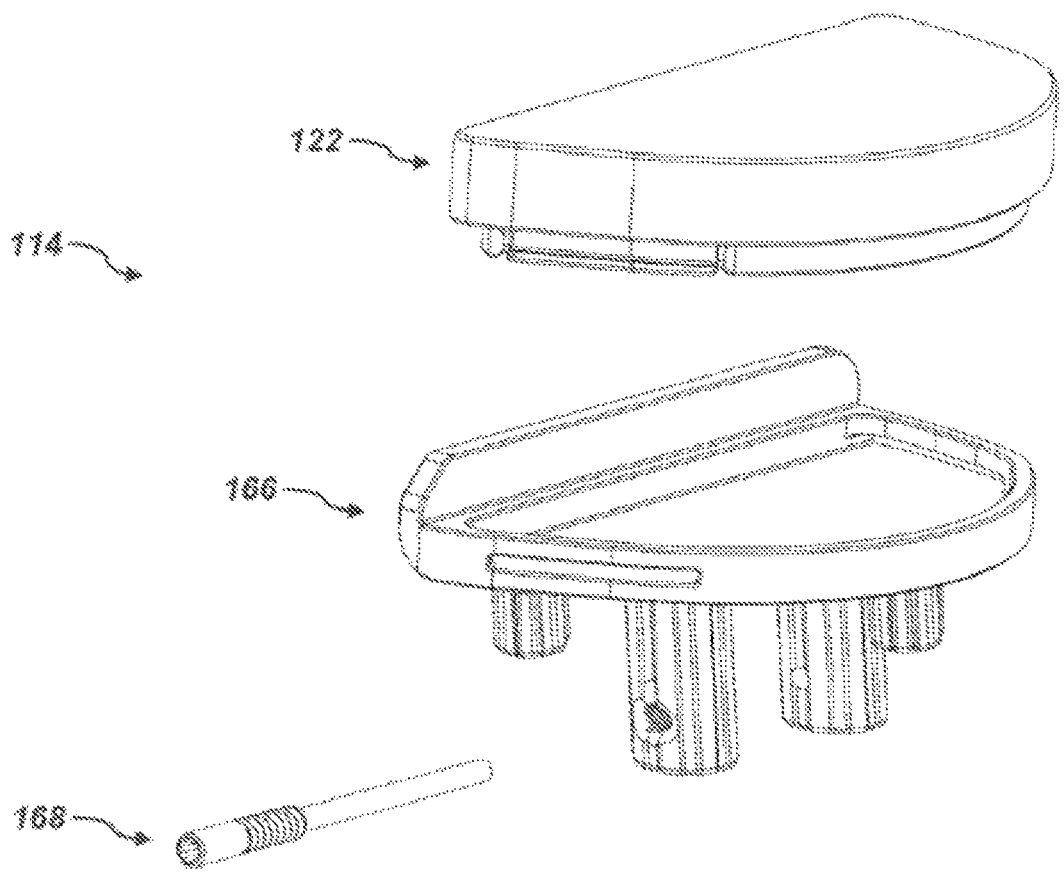
FIG. 17 is an exploded view of the surgical implant of FIG. 16.

In the articular assembly 114 of the disclosure illustrated in FIGS. 16 and 17 is composed of an articular component 122, which articulates with a femoral component (not shown), a tibial tray 166 that is fixed to the tibia, and a fastener 168 that aids in compressing tibial tray to tibia.

Figure 18:
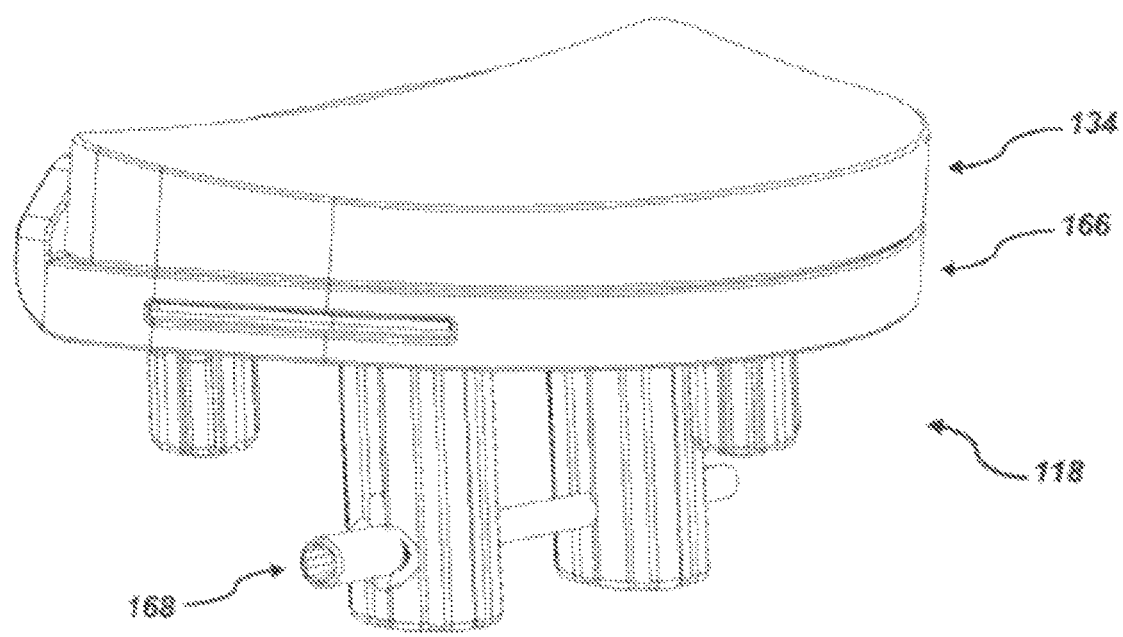
FIG. 18 is a front perspective view of another surgical implant, according to an example embodiment.
Figure 19:
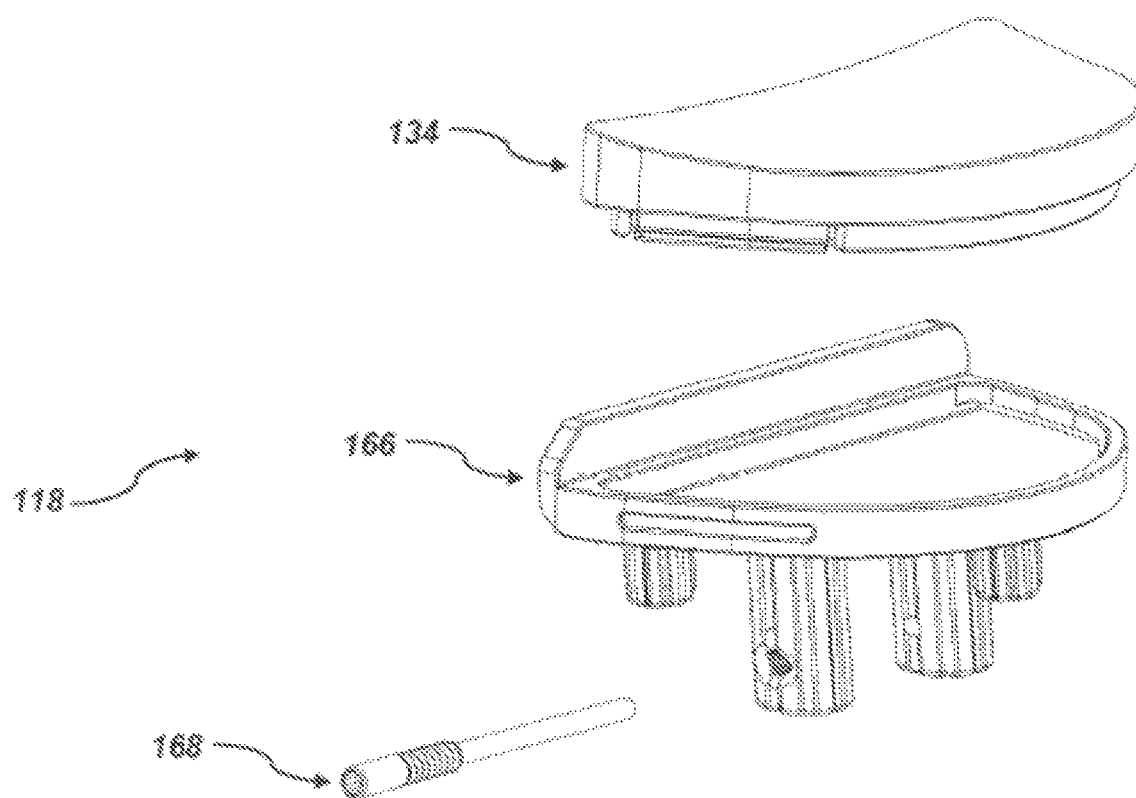
FIG. 19 is an exploded view of the surgical implant of FIG. 18.

In the articular assembly 118 of the disclosure illustrated in FIGS. 18 and 19 is composed of an articular component 134, which articulates with a femoral component (not shown), a tibial tray 166 that is fixed to the tibia, and a fastener 168 that aids in compressing tibial tray to tibia.

Figure 20:
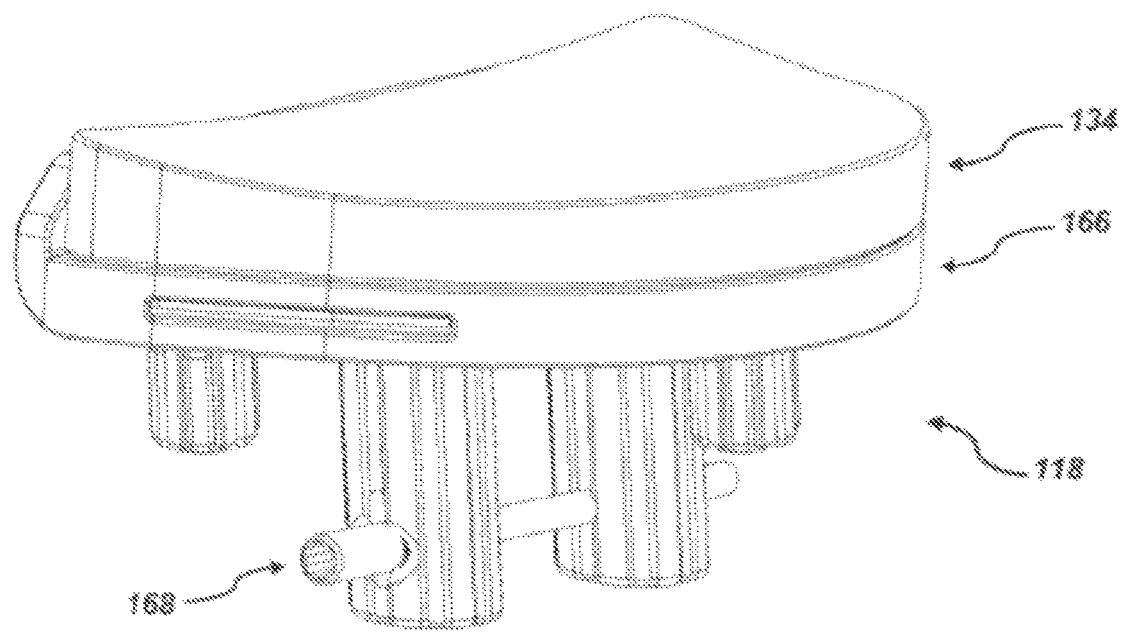
FIG. 20 is a front perspective view of another surgical implant, according to an example embodiment.
Figure 21:
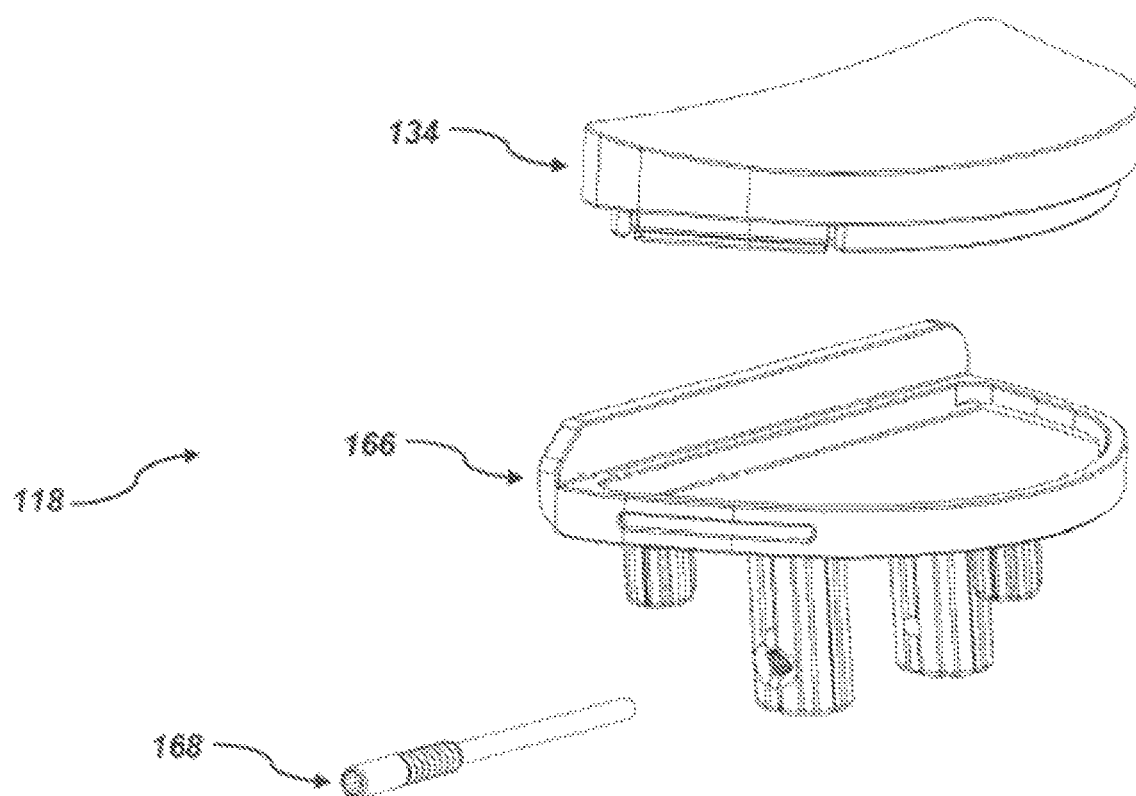
FIG. 21 is an exploded view of the surgical implant of FIG. 20.

In the articular assembly 120 of the disclosure illustrated in FIGS. 20 and 21 is composed of an articular component 148, which articulates with a femoral component (not shown), a bearing component 152 that attaches to tibial tray, a tibial tray 166 that is fixed to the tibia, and a fastener 168 that aids in compressing tibial tray to tibia.

Figure 24:
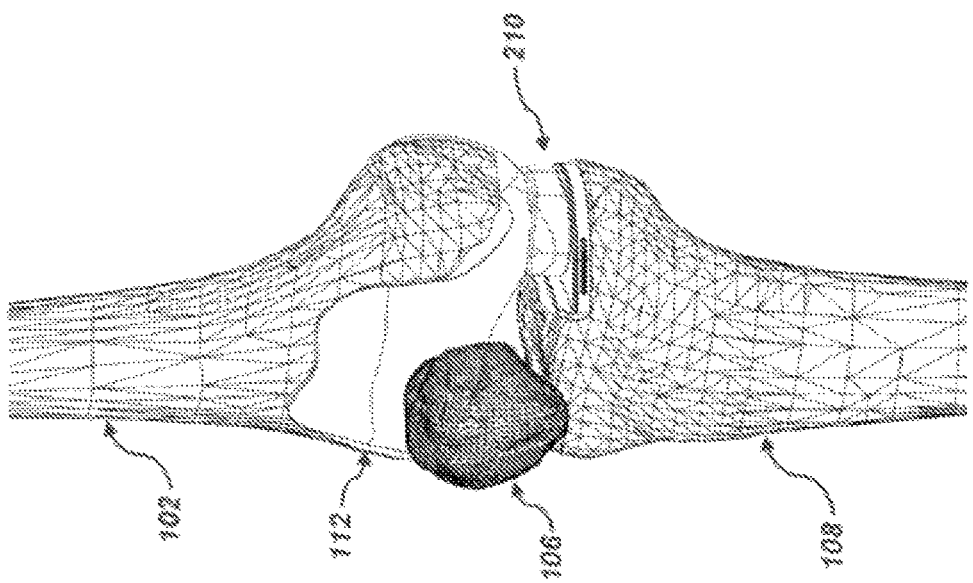
FIG. 24 is an anterior/medial view of another surgical implant implanted in a human knee joint, according to an example embodiment.
Figure 23:
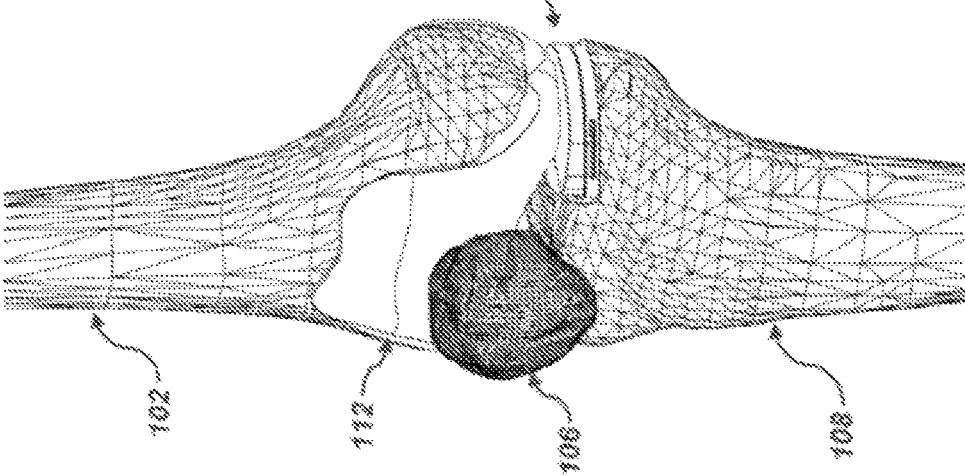
FIG. 23 is an anterior/medial view of another surgical implant implanted in a human knee joint, according to an example embodiment.
Figure 22:
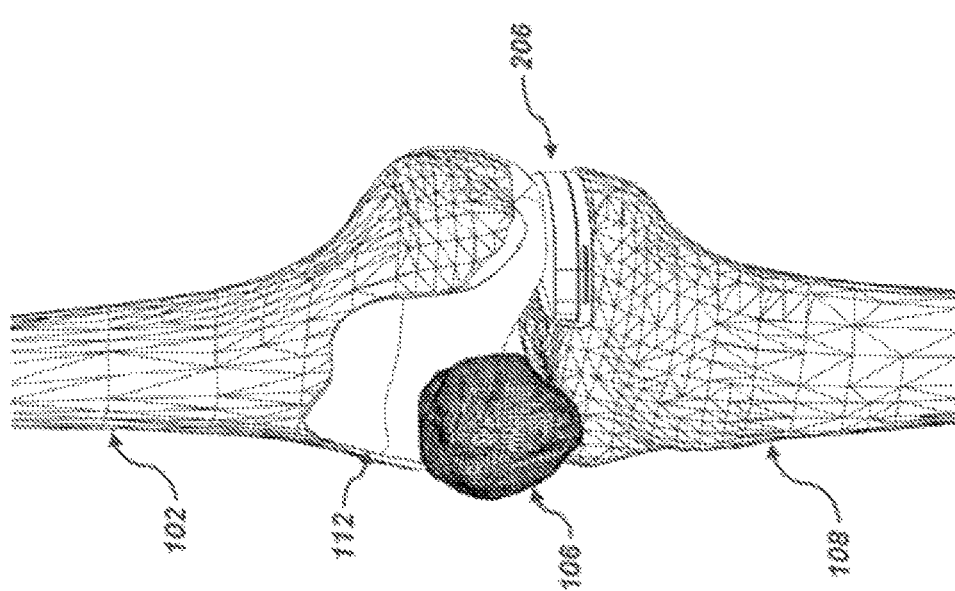
FIG. 22 is an anterior/medial view of another surgical implant implanted in a human knee joint, according to an example embodiment.

A second embodiment of the disclosure is shown in FIGS. 22-24 with optional articular components and illustrated in a knee joint, including the femur 102, the patella 106, and the tibia 108. As shown therein, a femoral component 112 attached to the distal end of femur, and the second embodiment shown with the optional articular components 206, 208, and 210. This second embodiment has a screw that attaches superiorly at an angle through the tibial component.

Figure 25:
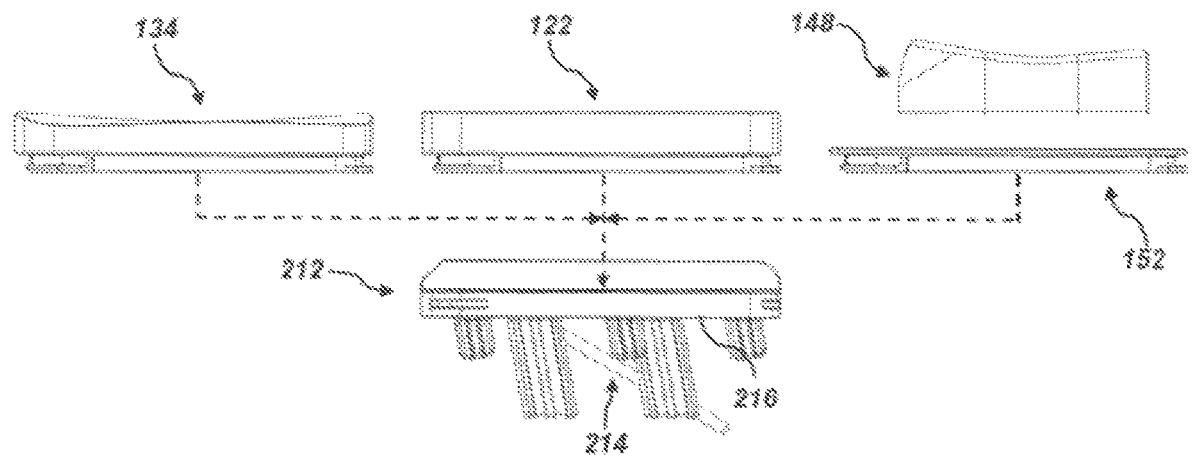
FIG. 25 is a side view of a modular implant assembly, according to an example embodiment.

FIG. 25 illustrates how tibial tray 212 can have various different articular/bearing components, including 122, 134, 148, and 152. Tibial tray 212 is illustrated with a fastener 214 arranged at an angle to tibial tray fixation surface 216.

Figure 26:
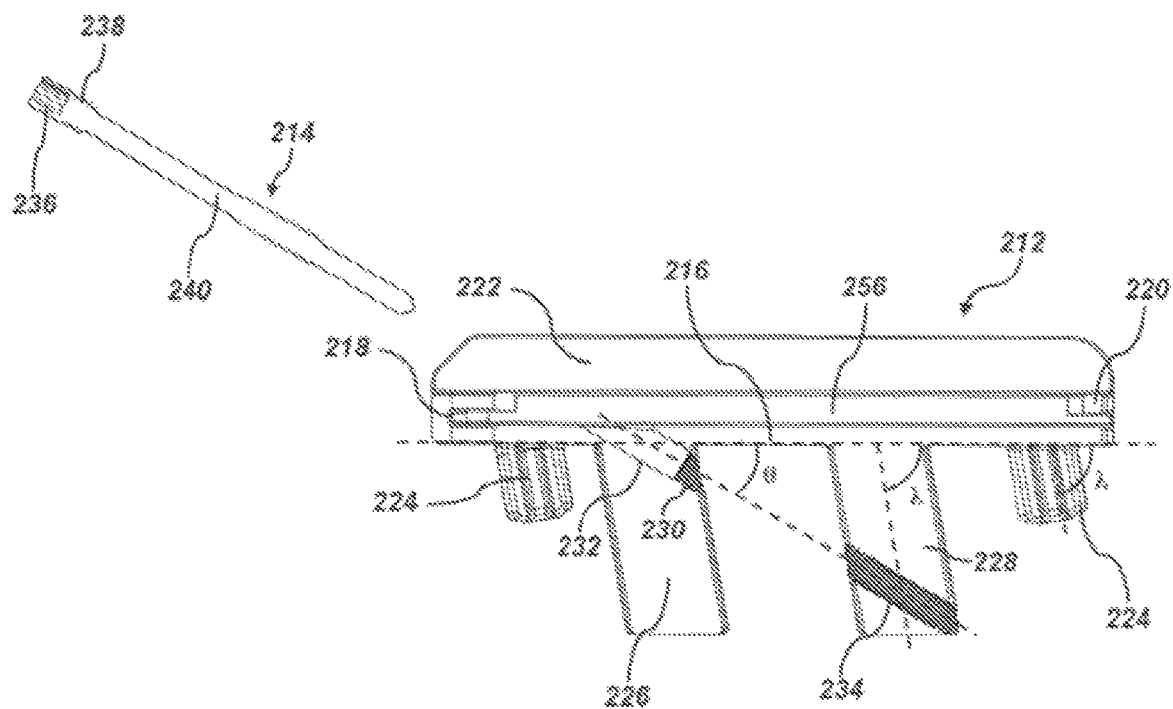
FIG. 26 is a cross sectional section view of a surgical implant, according to an example embodiment.

FIG. 26 is a section view of tibial tray 212 and fastener 214. Tibial tray 212 has slots 218 anteriorly and 220 posteriorly for attachment to articular/bearing components 122, 134, and 152, a lateral keel 222, peripheral fixation pegs 224 that may be of different lengths than central fixation pegs 226 and 228, and peripheral fixation pegs 224 and central fixation pegs 226 and 228 can be preferentially angled at λ degrees. Central fixation peg 226 has a cavity with a threaded area 230 and a non-threaded area 232, and central fixation peg 228 has a threaded or non-threaded cavity 234, each cavity accepting a fastener 214. Fastener 214 has a proximal end with geometry 236 for a screwdriver, a threaded section 238, and a threaded or smooth distal section 240. Fastener 214 is preferentially directed at an angle θ to fixation surface 216.

Figure 27:
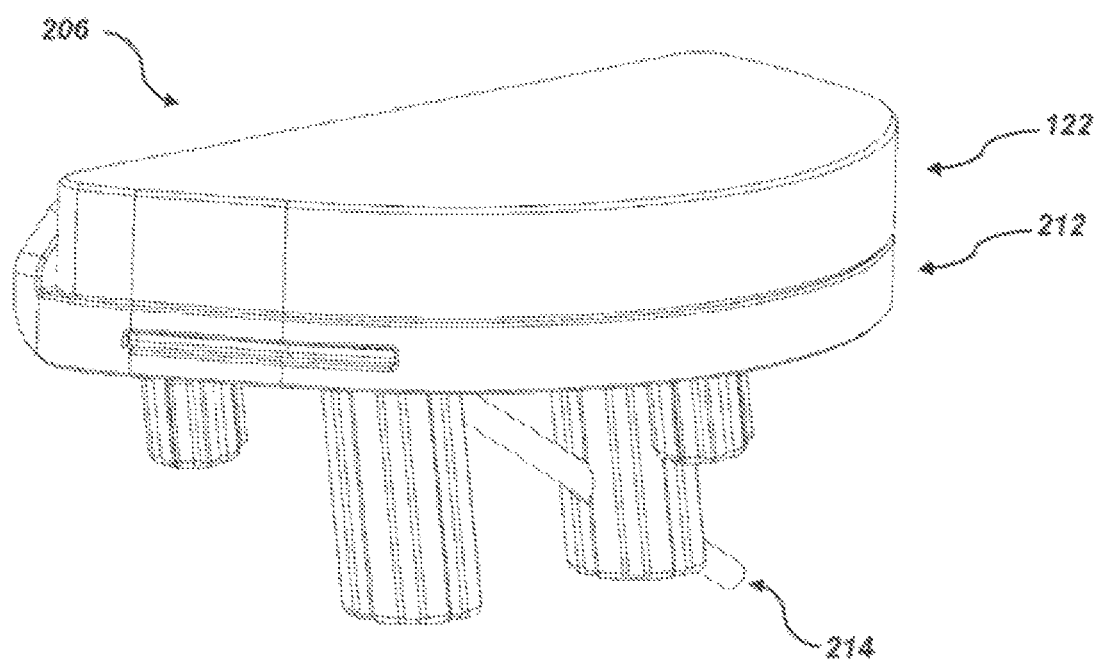
FIG. 27 is a front perspective view of the surgical implant of FIG. 26.
Figure 28:
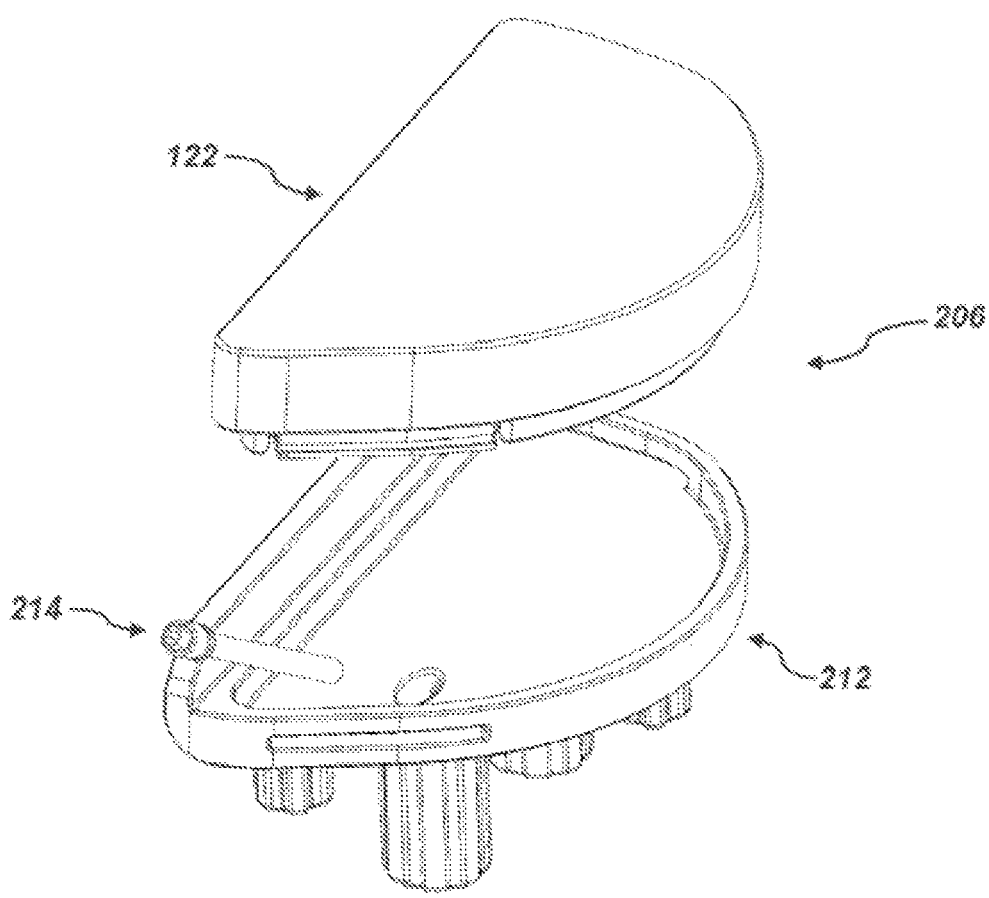
FIG. 28 is an exploded view of the surgical implant of FIG. 27.

In the articular assembly 206 of the disclosure illustrated in FIGS. 27 and 28 is composed of an articular component 122, which articulates with a femoral component (not shown), a tibial tray 212 that is fixed to the tibia, and a fastener 214 that aids in compressing tibial tray to tibia.

Figure 29:
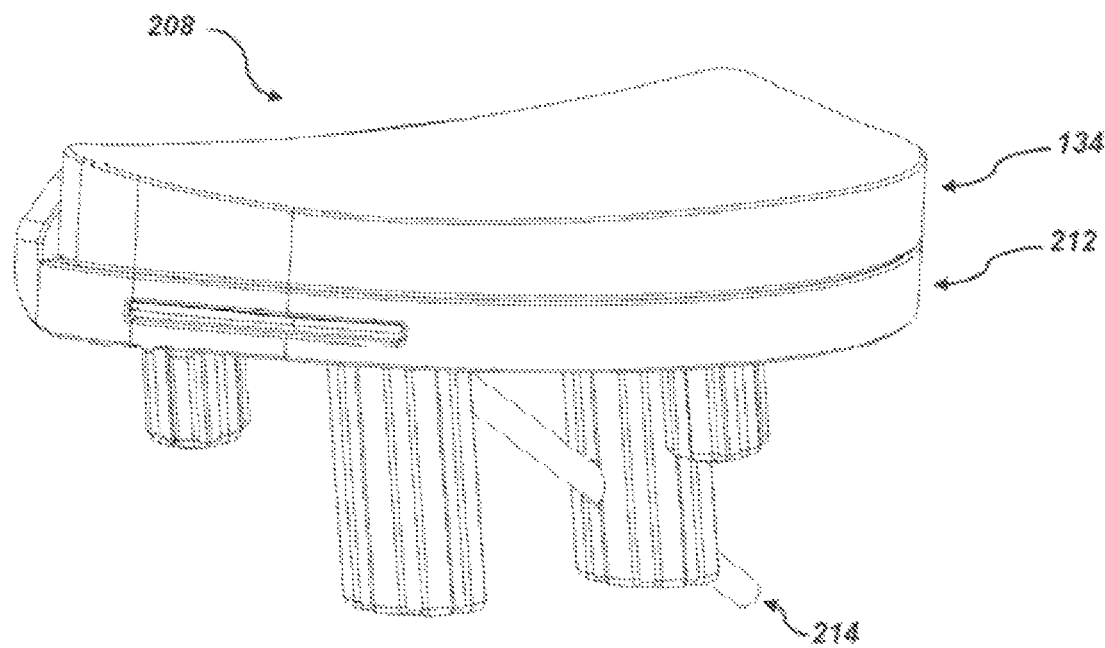
FIG. 29 is front perspective view of another surgical implant, according to an example embodiment.
Figure 30:
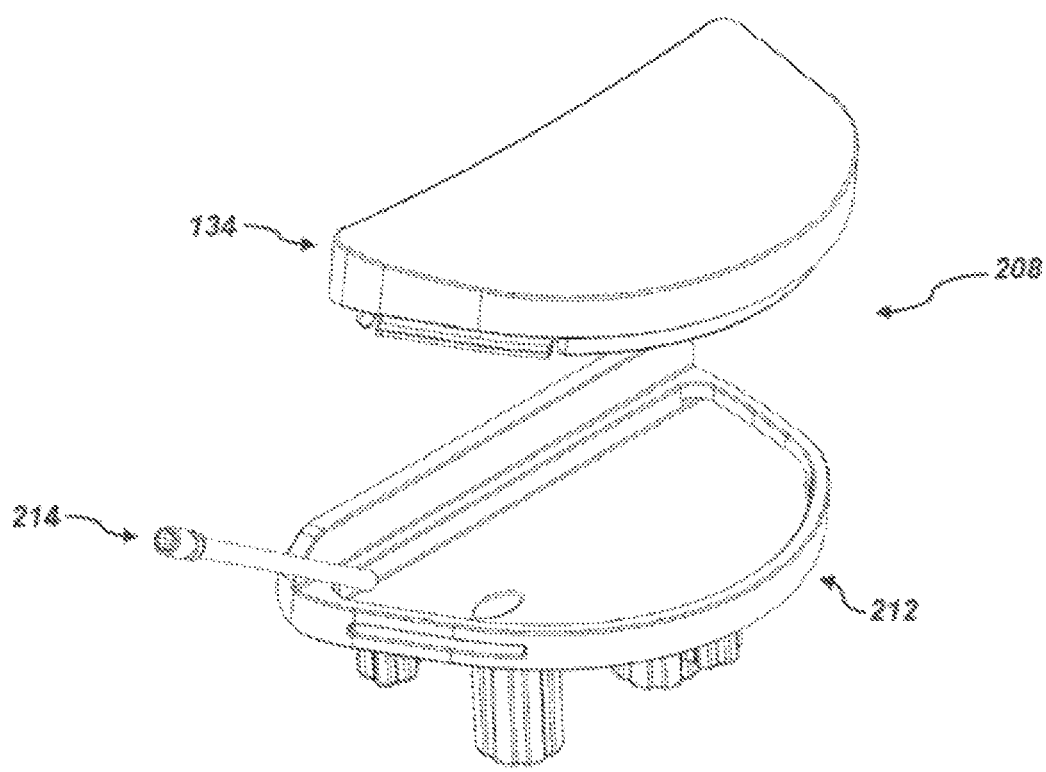
FIG. 30 is an exploded view of the surgical implant of FIG. 29.

In the articular assembly 208 of the disclosure illustrated in FIGS. 29 and 30 is composed of an articular component 134, which articulates with a femoral component (not shown), a tibial tray 212 that is fixed to the tibia, and a fastener 214 that aids in compressing tibial tray to tibia.

Figure 31:
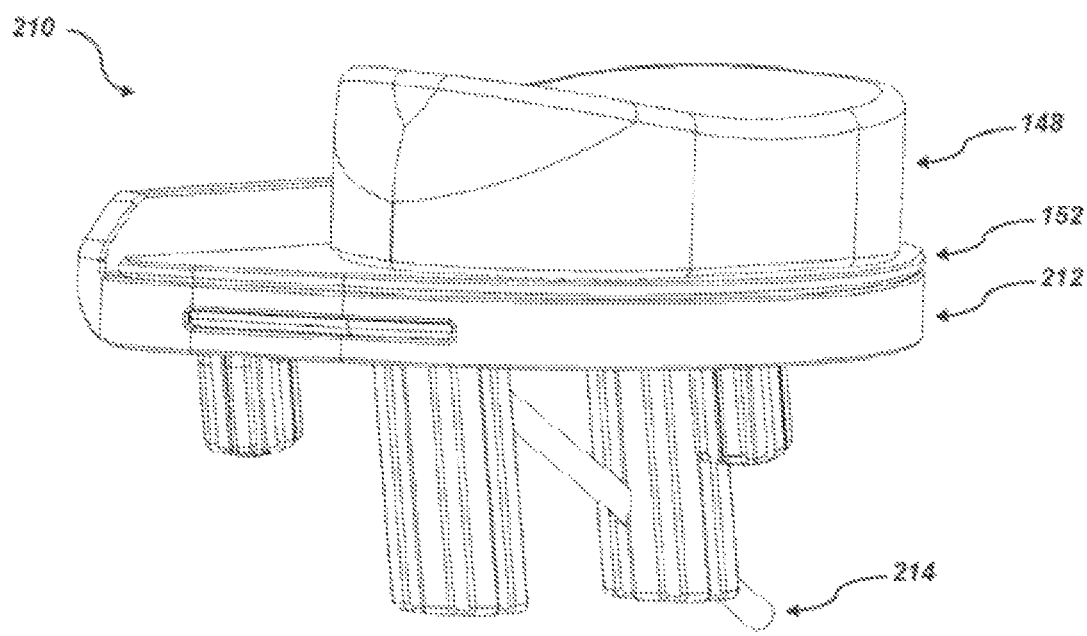
FIG. 31 is front perspective view of another surgical implant, according to an example embodiment.
Figure 32:
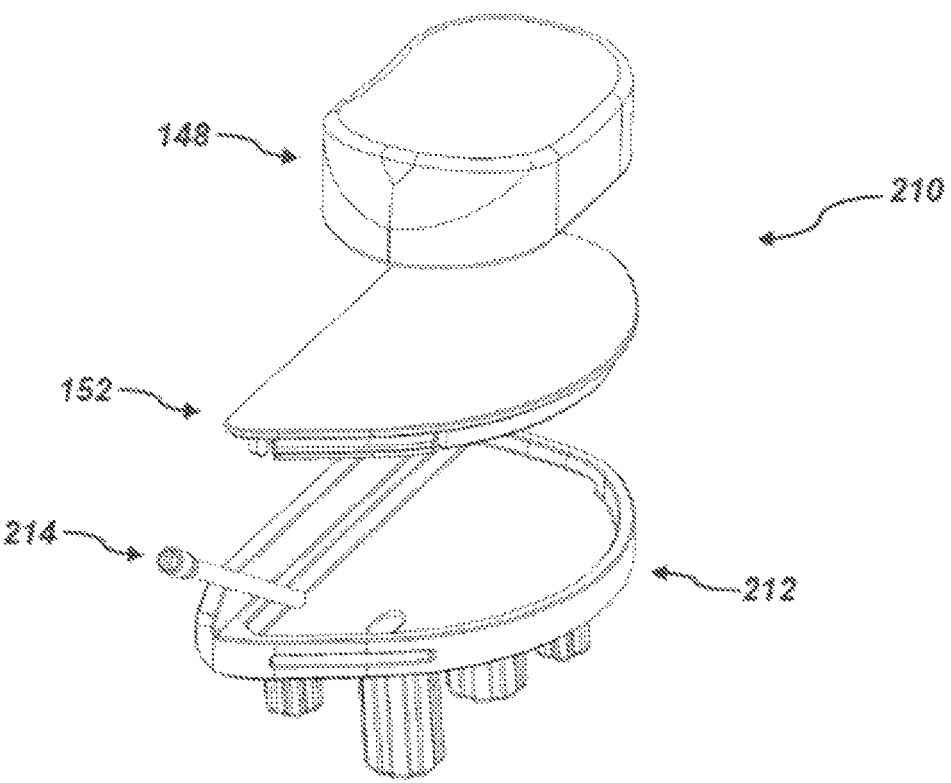
FIG. 32 is an exploded view of the surgical implant of FIG. 31.
Figure 33:
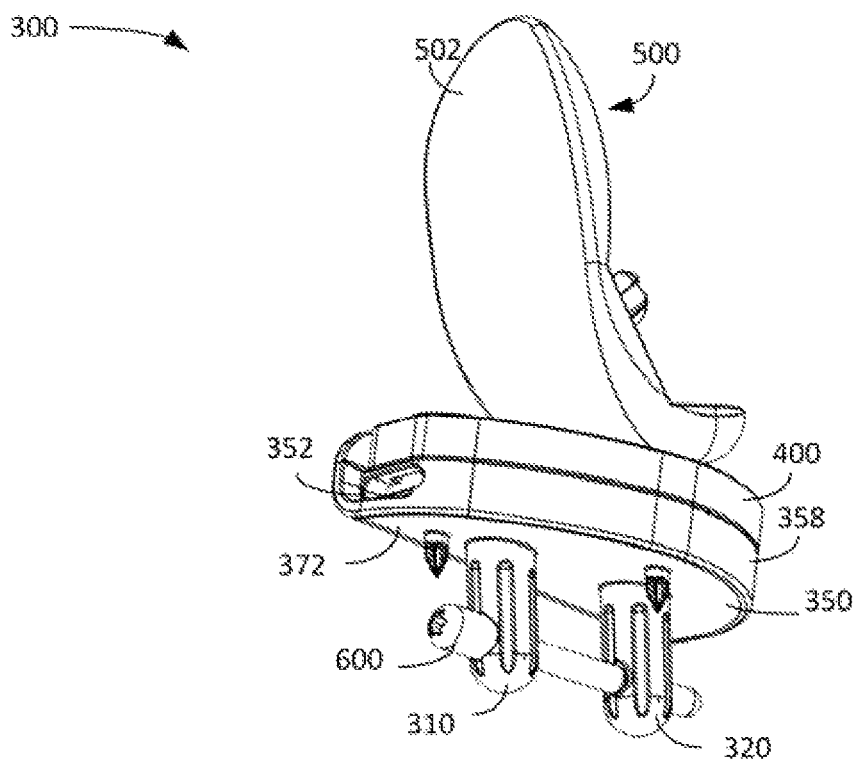
FIG. 33 is a perspective view of another surgical implant, according to an example embodiment.
Figure 34:
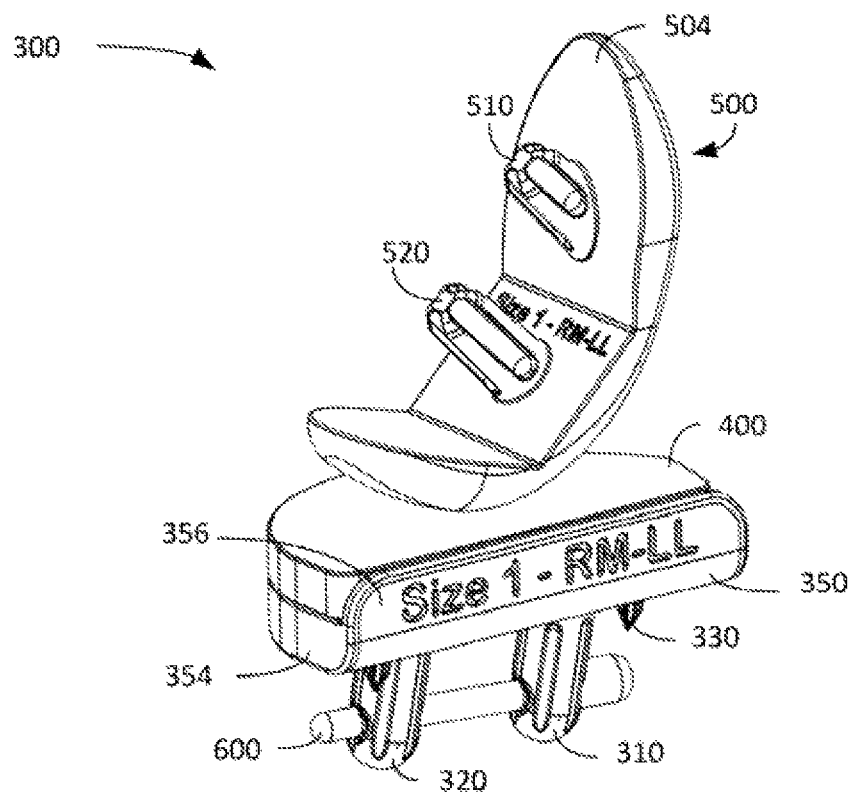
FIG. 34 is another perspective view of the surgical implant of FIG. 33.

In the articular assembly 210 of the disclosure illustrated in FIGS. 31 and 32 is composed of an articular component 148, which articulates with a femoral component (not shown), a bearing component 152 that attaches to tibial tray, a tibial tray 212 that is fixed to the tibia, and a fastener 214 that aids in compressing tibial tray to tibia.

Referring now to FIGS. 33-38, a surgical implant 300 is shown according to an example embodiment. The surgical implant 300 may be implanted into a knee as a part of UKA surgery. For example, the surgical implant 300 may be utilized during a fixed bearing UKA surgery. It should be appreciated that the surgical implant 300 may share one or more features of any of the other devices and/or components described herein.

As shown, the surgical implant 300 includes a tray 350. The tray 350 extends from a first end 352 to a second end 354 along a first plane. The tray further includes an upper surface 374 and a lower surface 372 opposite the upper surface 374. The tray 350 further includes a first edge 356 extending between the first end 352 and the second end 354 and a second edge 358 opposite the first edge 356 and extending between the first end 352 and the second end 354. As shown, the first edge 356 is generally linear while the second edge 358 is generally curved. The tray 350 further includes a projection 376 extending away from the upper surface 374. According to various embodiments, the projection 376 extends perpendicular to the upper surface 374.

They tray 350 may be configured couple to a bone portion, such as a tibia bone, that has been prepared for the tray 350. For example, a first aperture may be created in the bone portion, wherein the first aperture is configured to receive a first post 310 (e.g., a peg, a central fixation peg, etc.) that extends from a lower surface 372 of the tray 350. Further, a second aperture may be created in the bone portion, wherein the second aperture is configured to receive a second post 320 (e.g., a peg, a central fixation peg, etc.) that extends from the lower surface 372 of the tray. Furthermore, a third aperture may be created in the bone portion, wherein the third aperture extends into the first aperture and the second aperture such that a fastener 600 can be inserted into the third aperture, wherein a first portion (e.g., a first threaded portion 610 shown in FIGS. 37 and 38) of the fastener 600 is received within a first opening 312 in the first post 310 and a second portion (e.g., a second threaded portion 620 shown in FIGS. 37 and 38) of the fastener 600 is received within a second opening 322 in the second post 320. According to various embodiments, the combination of the first post 310, the second post 320, and the fastener 600 may operate to secure the tray 350 without the use of cement, which may facilitate patient recovery, as is discussed further throughout.

Further, the surgical implant 300 may include a plurality of spikes 330 (e.g., pegs, fixation pegs, etc.) that extend from a lower surface 372 of the tray 350. According to various embodiments, each of the spikes 330 includes a tip that is configured to be inserted into the bone portion. According to various embodiments, each of the spikes 330 is configured to be implanted into the bone portion without the need to create an aperture prior to implanting the spikes 330.

Figure 51:
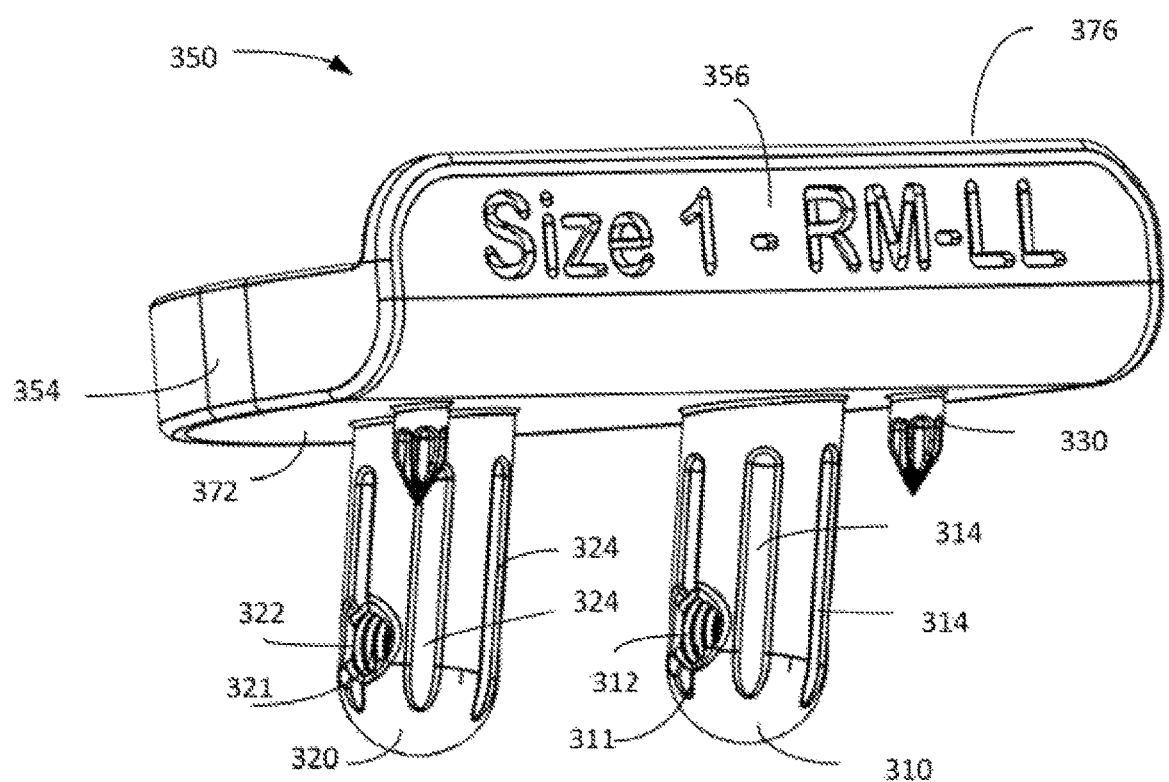
FIG. 51 is a perspective view of a tray, according to an example embodiment.

It should be appreciated that at least a portion of the first post 310, the second post 320, and each of the spikes 330 may include a osteoinductive portion (e.g., a porous portion that promotes ingrowth of bone into the first post 310 and the second post 320) to further secure the tray 350 to the bone portion throughout the bone healing process. For example, the entire first post 310, the entire second post 320, and each of the spikes 330 may be formed of an osteoinductive material. Further, as is discussed further herein, the first post 310 includes a plurality of ridges 314 (see FIG. 51) and the second post 320 includes a plurality of ridges 324 (see FIG. 51), which may provide additional stability of the tray 350 and promote ingrowth of bone into the first post 310 and the second post 320. However, according to other embodiments, the first post 310, the second post 320, and/or the spikes 330 do not include an osteoinductive portion, which result in a tray 350 that is easier to remove from the bone portion after surgery.

As shown, the tray supports a fixed articular component 400. For example, the fixed articular component 400 may be coupled to the tray 350 such that the position of the fixed articular component 400 is fixed relative to the tray 350. For example, as shown in FIG. 37, the tray 350 may include a cavity 366 that is configured to receive a portion of the fixed articular component 400.

The surgical implant further includes a femoral component 500 configured to interface with the fixed articular component 400 to enable relative movement between the femoral component 500 and the tray 350. For example, the femoral component 500 may include a first post 510 configured to be inserted into a first aperture created in a femur and a second post 520 configured to be inserted into a second aperture created in the femur to secure the femoral component 500 to the femur.

For example, the femoral component 500 may include an interior surface 504 and an exterior surface 502 opposite the interior surface 504. As shown, the exterior surface 502 is configured to interface with an upper surface 402 (see FIG. 39) to enable relative movement between the femoral component 500 and the fixed articular component 400, which may be fixed relative to the tray 350. As shown best in FIG. 38, the exterior surface 502 of the femoral component is rounded and defines a variable radius curve. According to various embodiments, the variable radius curve may of the exterior surface 502 may interface with the upper surface 402 of the fixed articular component 400 to imitate the natural motion of a healthy knee.

Figure 35:
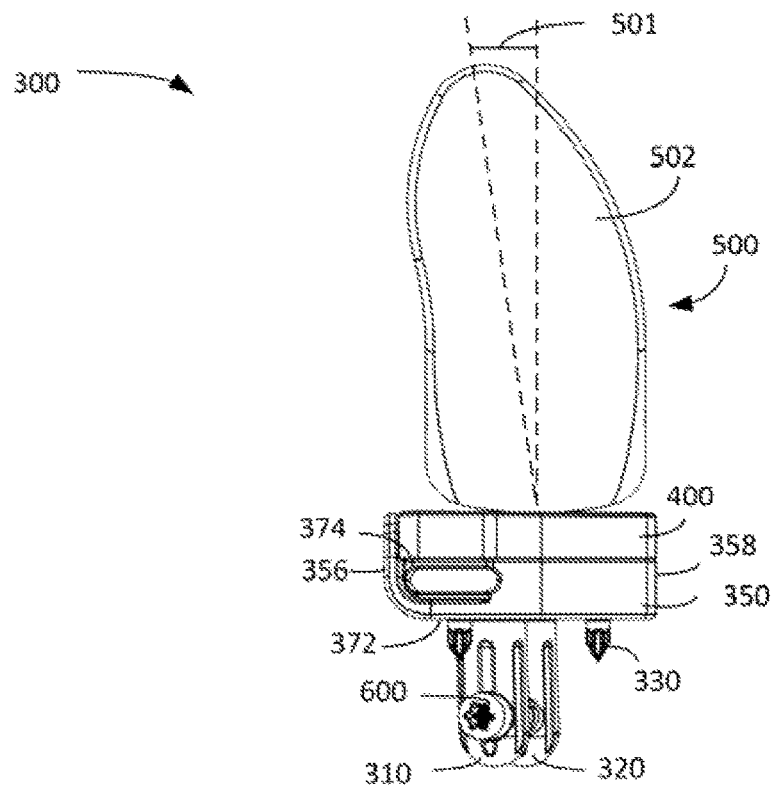
FIG. 35 is a front view of the surgical implant of FIG. 33.
Figure 36:
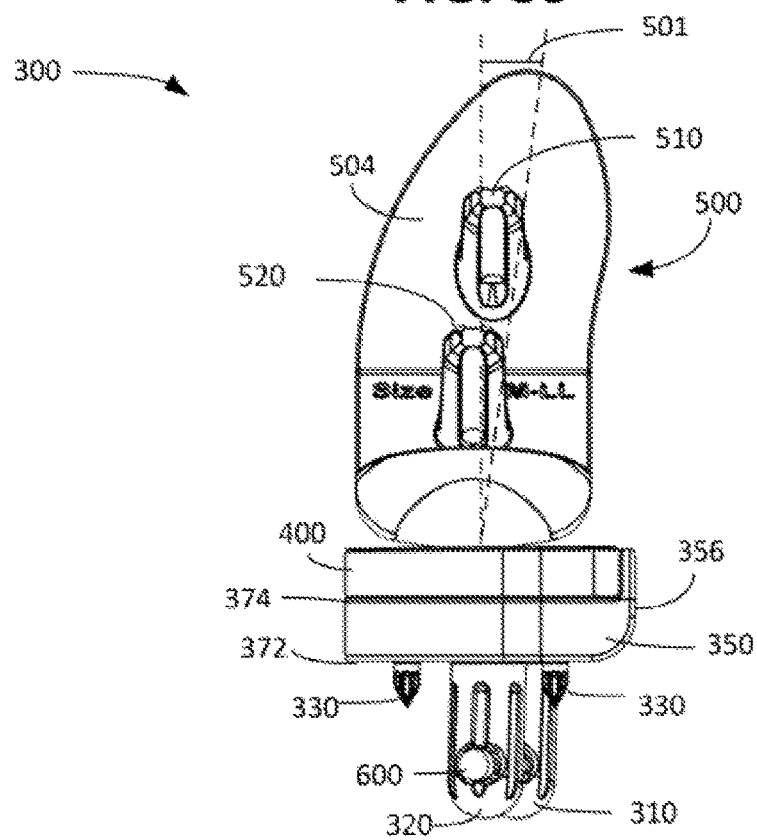
FIG. 36 is a rear view of the surgical implant of FIG. 33.

As best shown in FIGS. 35 and 36, the femoral component 500 extends away from the tray 350 at an angle 501 (e.g., towards the first edge 356) while the femoral component 500 engages the articular component 400. According to various embodiments, the angle 501 that the femoral component 500 extends along may more closely imitate the natural motion of a healthy knee, as compared to a similar femoral component that extends vertically (e.g., in a direction perpendicular to the upper surface 374 of the tray 350).

Figure 39:
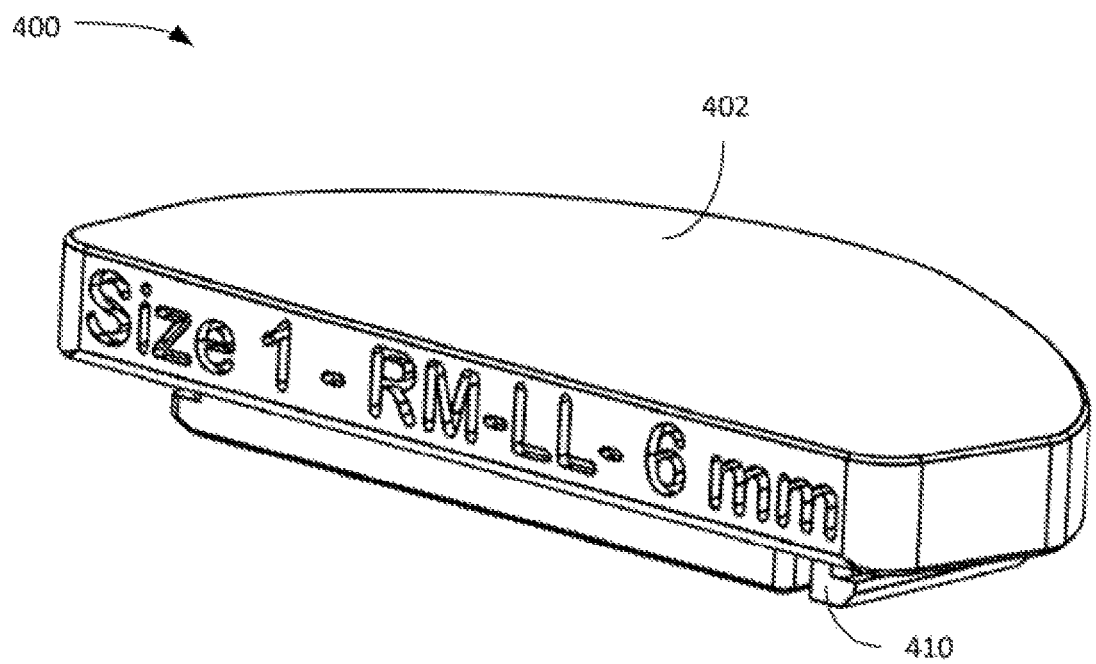
FIG. 39 is a perspective view of a fixed articular component, according to an example embodiment.
Figure 40:
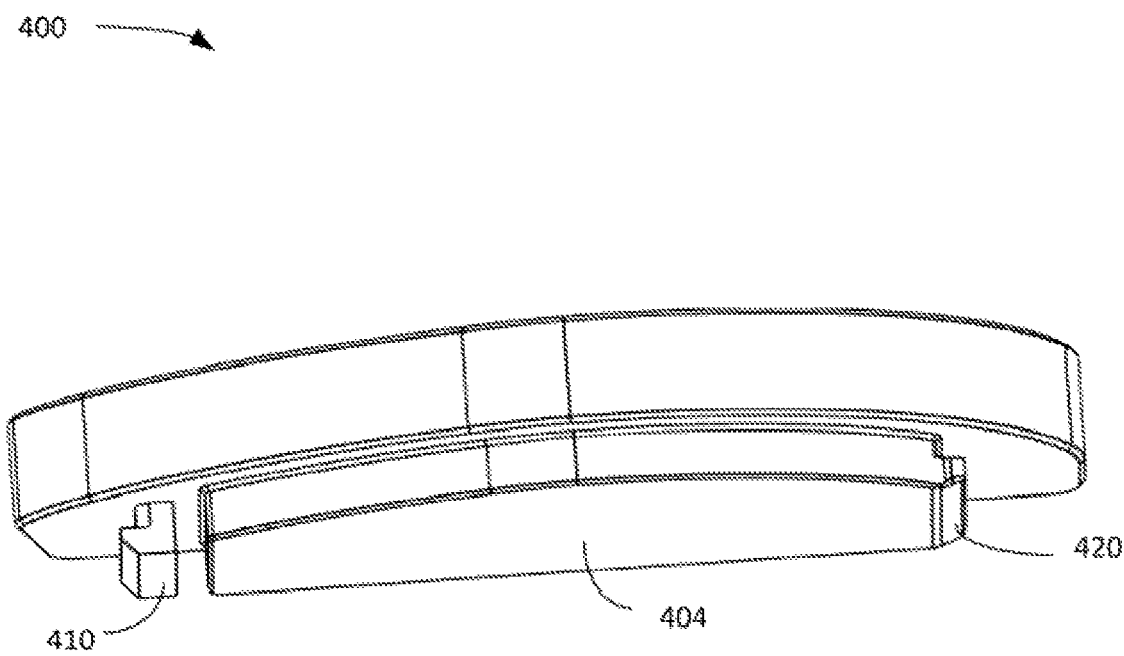
FIG. 40 is another perspective view of the fixed articular component of FIG. 39.
Figure 41:
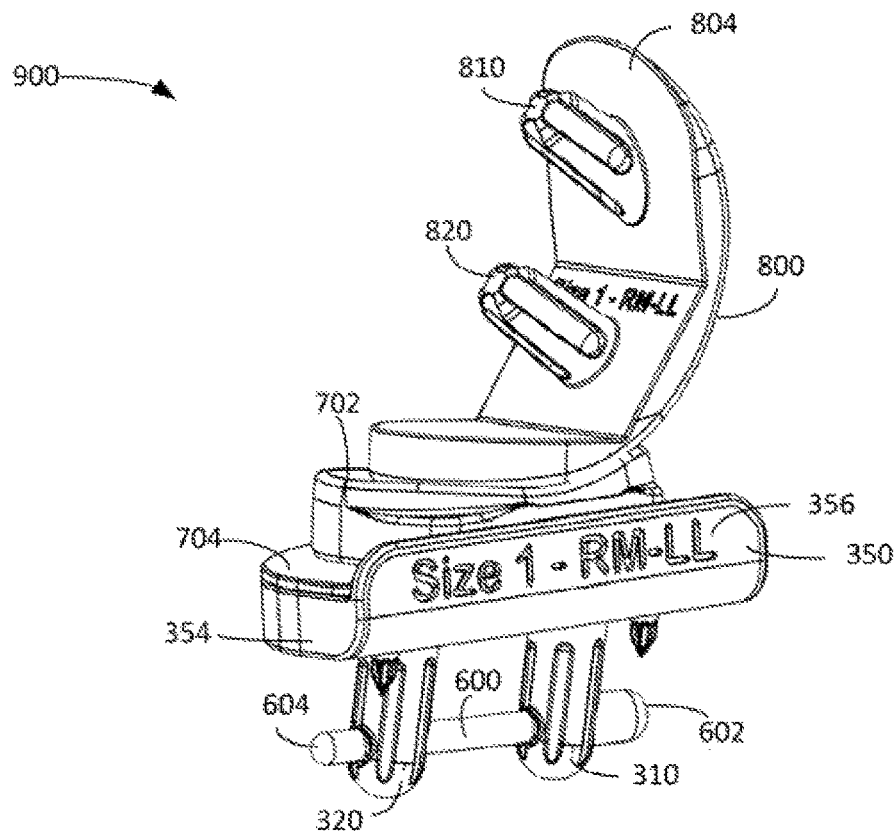
FIG. 41 is a perspective view of another surgical implant, according to an example embodiment.
Figure 42:
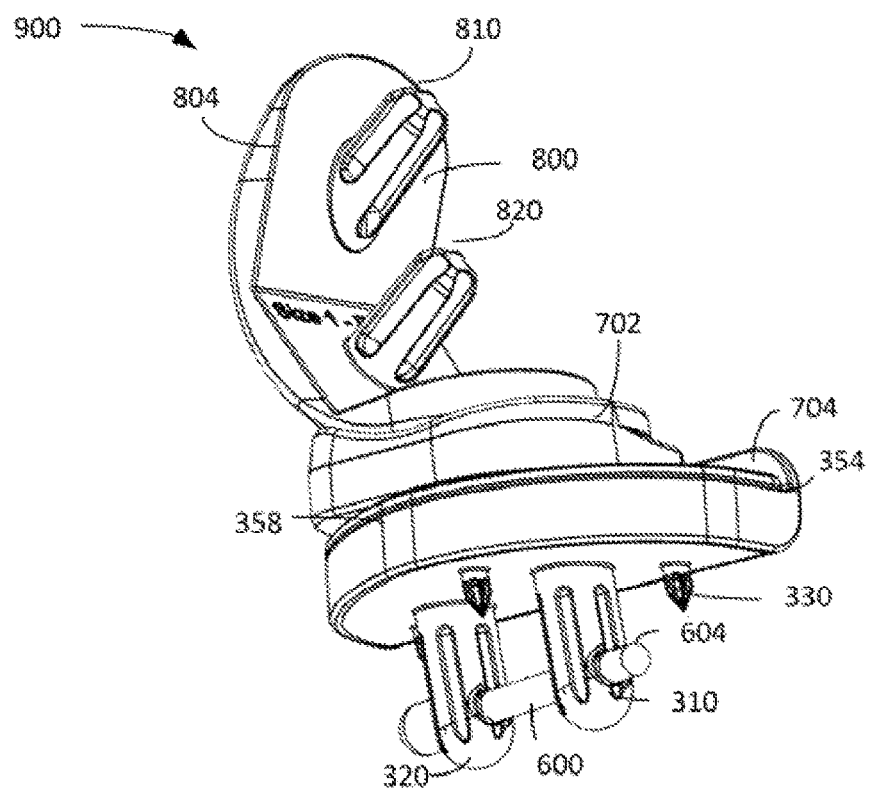
FIG. 42 is another perspective view of the surgical implant of FIG. 41.
Figure 43:
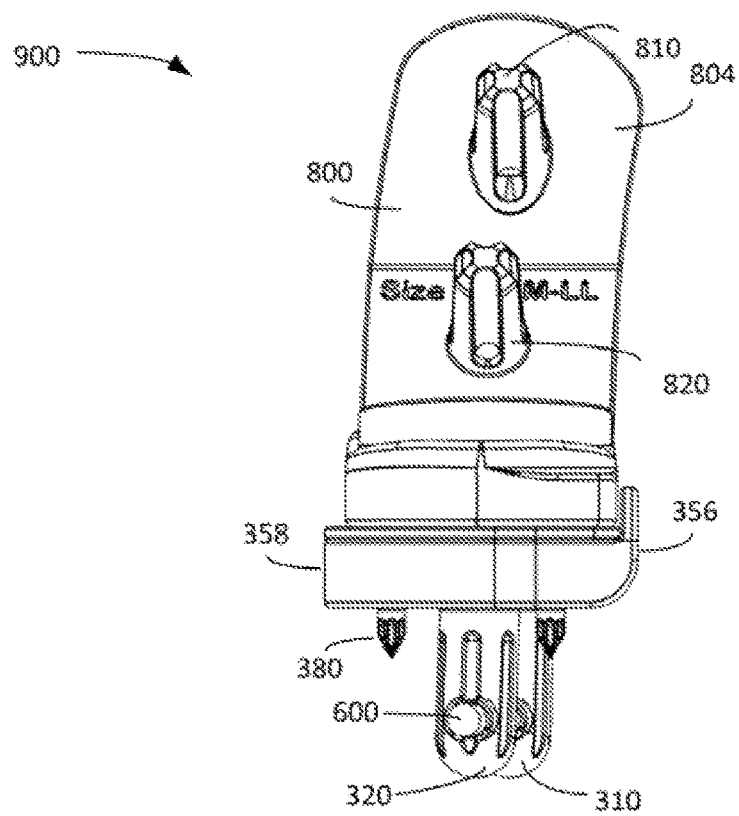
FIG. 43 is a rear view of the surgical implant of FIG. 43.
Figure 44:
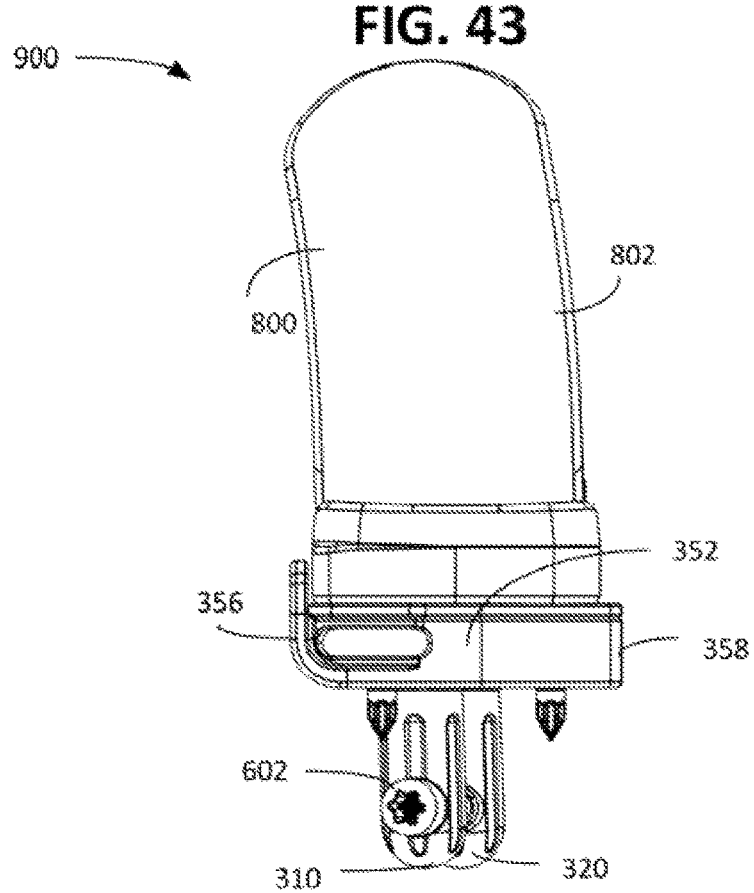
FIG. 44 is a front view of the surgical implant of FIG. 43.
Figure 46:
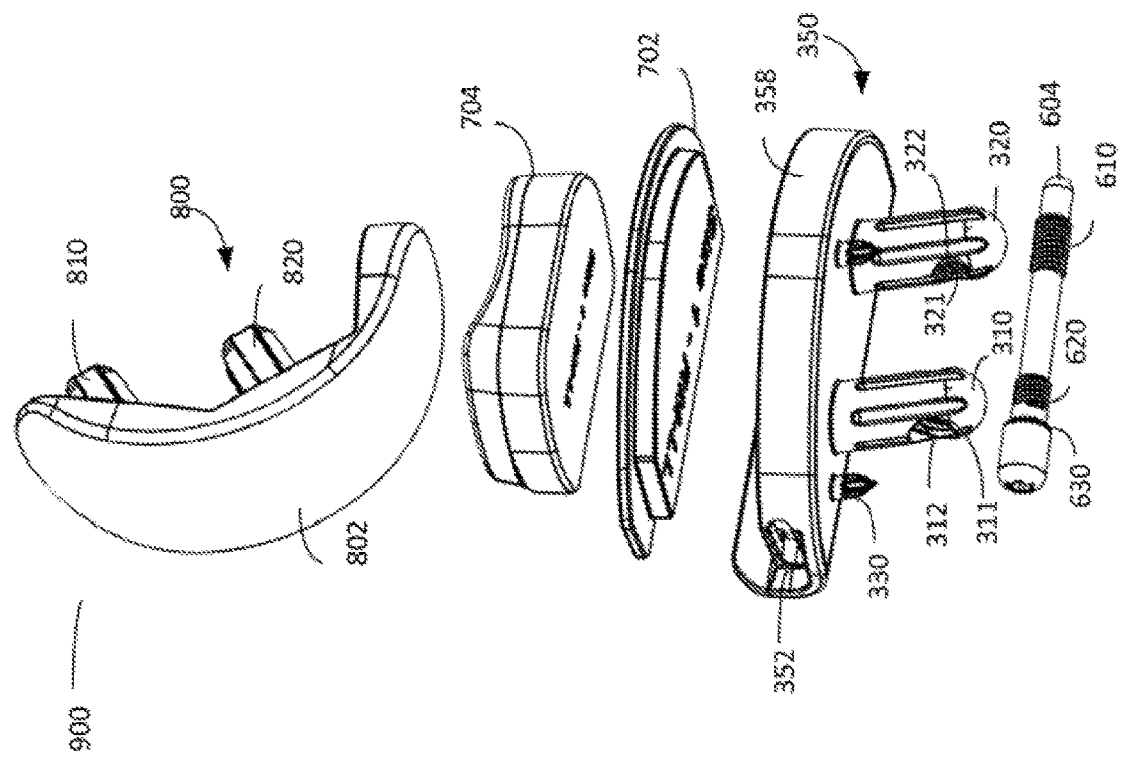
FIG. 46 is another exploded view of the surgical implant of FIG. 43.
Figure 45:
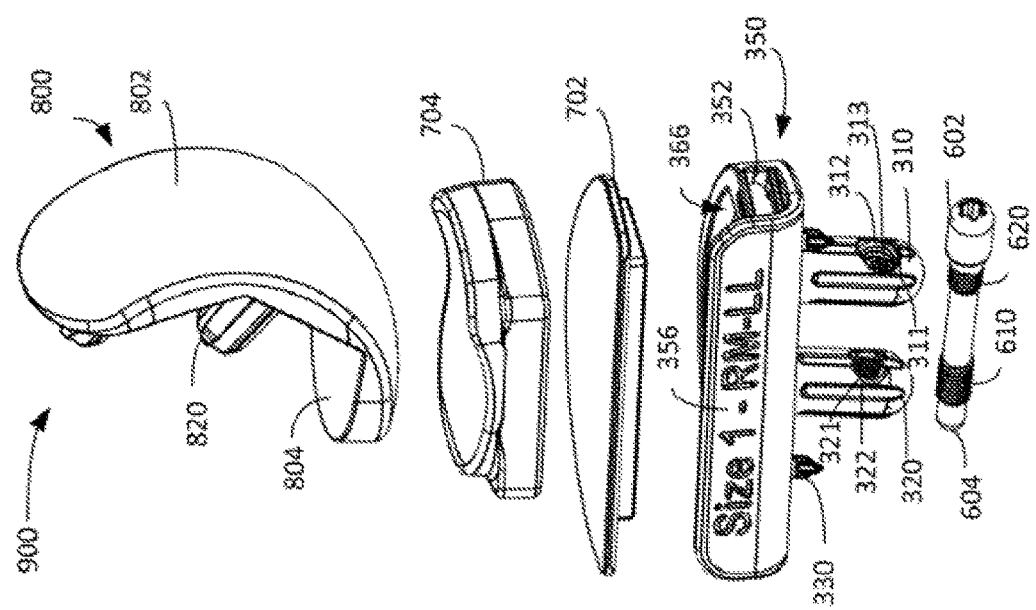
FIG. 45 is an exploded view of the surgical implant of FIG. 43.
Figure 52:
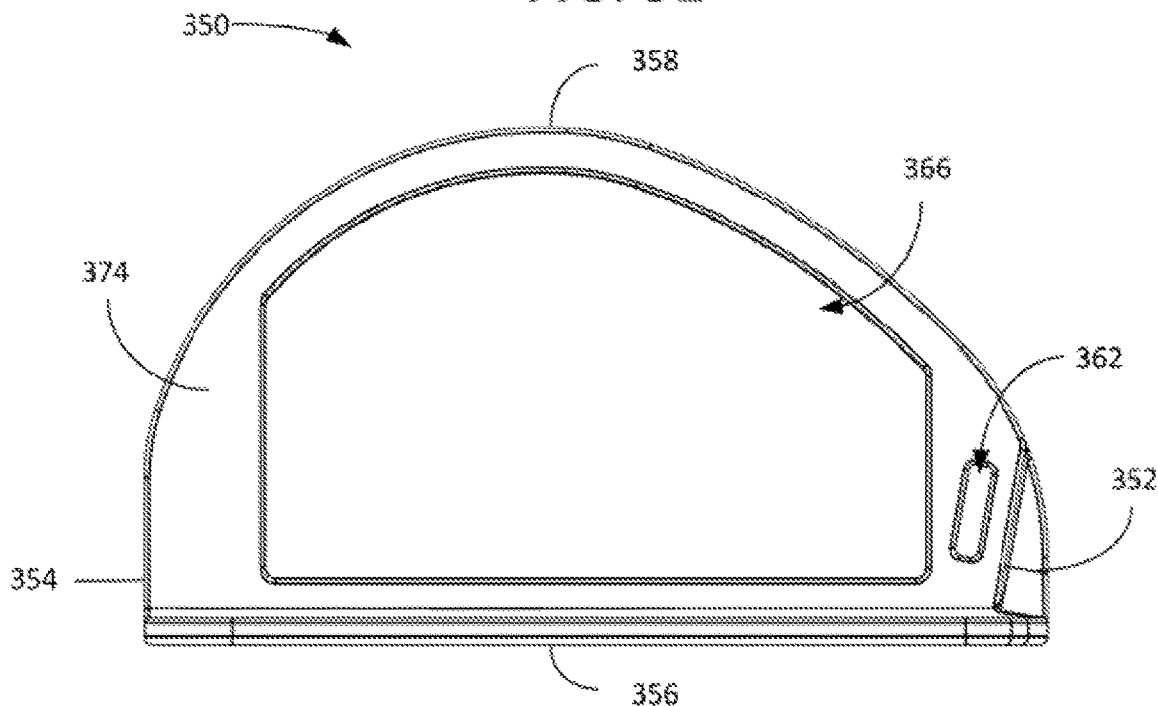
FIG. 52 is a top view of the tray of FIG. 51.
Figure 53:
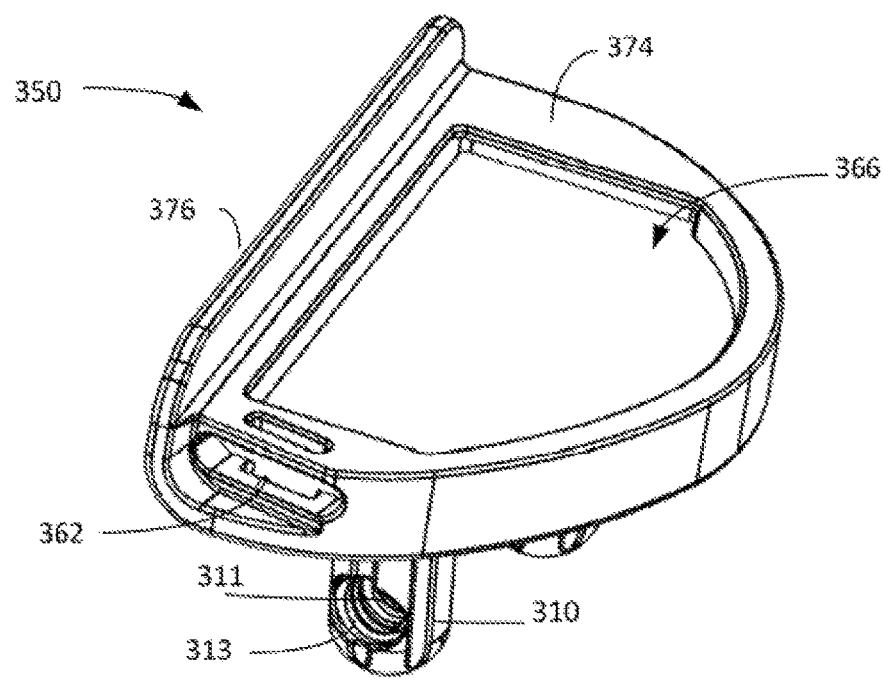
FIG. 53 is another perspective view of the tray of FIG. 51.
Figure 54:
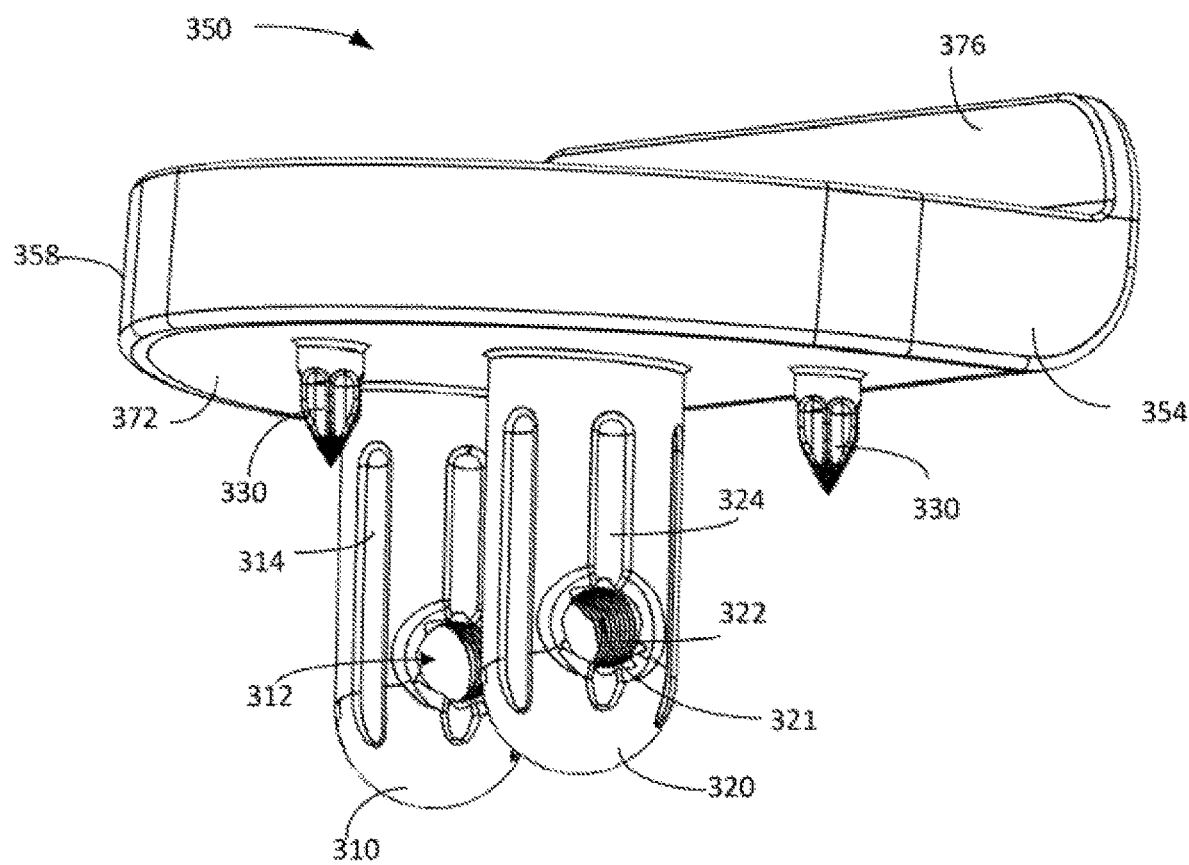
FIG. 54 is another perspective view of the tray of FIG. 51.

Referring now to FIGS. 39 and 40, the fixed articular component 400 is shown, according to an example embodiment. As shown, the fixed articular component 400 includes an upper surface 402 and a lower surface 404. The lower surface 404 is defined by a by a projection extending away from the upper surface 402. According to various embodiments, the projection is configured to be received within the cavity 366 (see FIG. 37) of the tray 350. Additionally, the fixed articular component 400 includes a first tab 410 and a second tab 420 extending away from the upper surface 402. According to various embodiments, a portion of the first tab 410 is configured to be received within a slot 362 (see FIG. 52) in the tray 350 to securely couple the fixed articular component 400 to the tray 350. According to various embodiments, the second tab 420 may interface with an edge of the cavity 366 (e.g., proximate the second end 354) such that the second tab 420 is compressed against the edge of the cavity 366, which may further secure the fixed articular component to the tray 350.

Referring now to FIGS. 41-46, a surgical implant 900 is shown according to an example embodiment. The surgical implant 900 may be implanted into a knee as a part of UKA surgery. For example, the surgical implant 900 may be utilized during a mobile bearing UKA surgery.

It should be appreciated that the surgical implant 900 may share one or more features of any of the other devices and/or components described herein. For example, the surgical implant 900 may utilize the tray 350, which is also configured to be used in a fixed bearing UKA, such as the surgical implant 300 described above. In this sense, the tray 350 (e.g., a baseplate) of the implant may be configured to accept both a fixed articular portion (e.g., a fixed bearing portion) and a mobile articular portion (e.g., a mobile bearing portion) such that the tray 350 can be used with either type of articular portion. In this sense, a surgeon may use either a fixed articular portion (e.g., a fixed bearing portion) or a mobile articular portion (e.g., a mobile bearing portion) in conjunction with the tray 350. According to various embodiments, the tray 350 may be provided as a part of a kit including the components of the surgical implant 300 and the components of the surgical implant 900 such that a single kit can be for both a fixed bearing UKA and a mobile bearing UKA. According to various embodiments, a surgeon may determine which type of UKA to perform after surgery has started. Therefore, providing the tray 350, which can be used for both fixed bearing UKA and a mobile bearing UKA may be advantageous. Further, according to various a patient may convert from a fixed bearing UKA to a mobile bearing UKA, or vice versa. In this example embodiment, the femoral component and the articular portion may be exchanged without the need to replace the tray 350, thereby simplifying the surgery.

As shown, the femoral component 800 configured to interface with a mobile articular component 704 to enable relative movement between the femoral component 800 and the tray 350. For example, the femoral component 800 may include a first post 810 configured to be inserted into a first aperture created in a femur and a second post 820 configured to be inserted into a second aperture created in the femur to secure the femoral component 800 to the femur.

As shown, the femoral component 800 includes an inner surface 804 and an outer surface 802 opposite the inner surface 804. As shown, the outer surface 802 is configured to interface with an upper surface 740 (see FIG. 47) to enable relative movement between the femoral component 800 and the mobile articular component 704. According to various embodiments, the mobile articular component 704 is configured to translate along an insert 702 relative to the tray 350. According to various embodiments, the outer surface 802 defines a uniform radius curve. The uniform radius curve of the outer surface 802, in conjunction with the mobile articular component 704 that is configured to translate along the insert 702 relative to the tray 350, may imitate the natural motion of a healthy knee.

Figure 47:
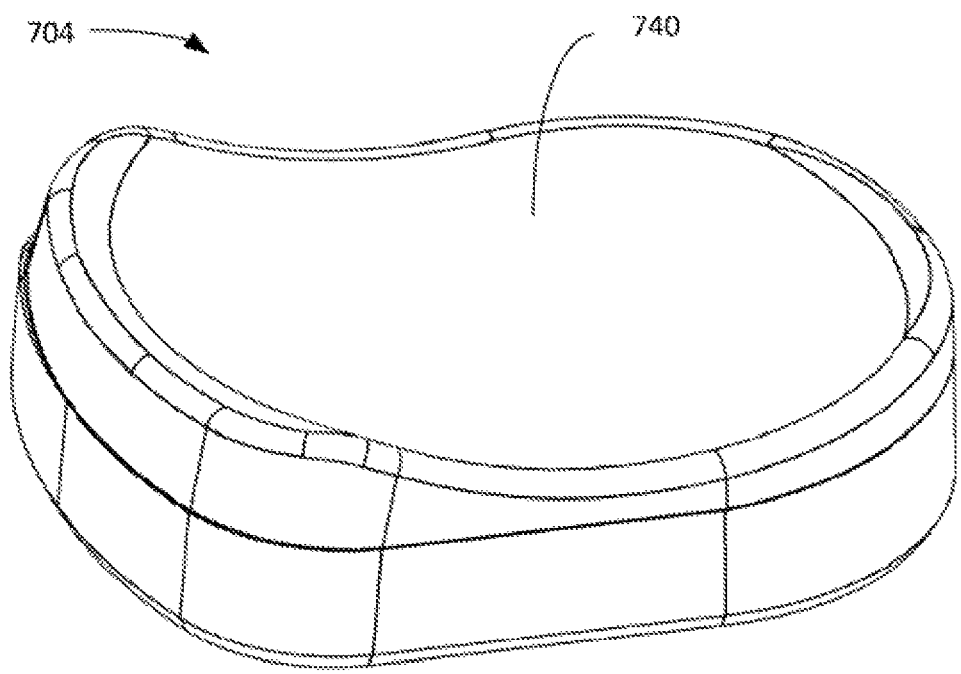
FIG. 47 is a perspective view of a mobile articular component, according to an example embodiment.
Figure 48:
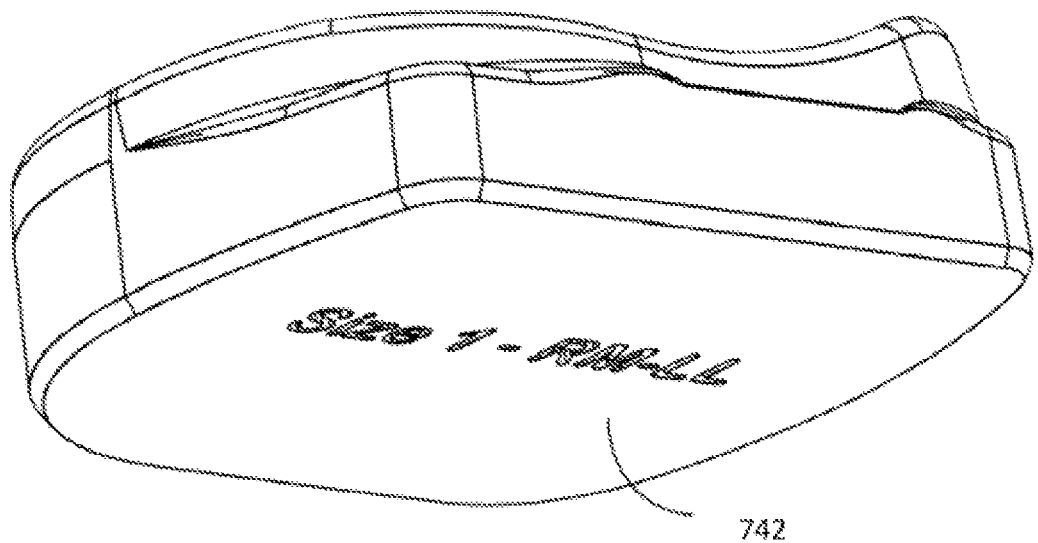
FIG. 48 is another perspective view of the fixed articular component of FIG. 47.

Referring to FIGS. 47 and 48, the mobile articular component 704 is shown according to an example embodiment. The mobile articular component 704 is configured to interface with the outer surface 802 of the femoral component 800 to enable bending of the knee. For example, the outer surface 802 of the femoral component 800 may interface with a concave upper surface 740 of the mobile articular component 704 to enable relative movement between the femoral component 800 and the mobile articular component 704. As is discussed further below with respect to FIGS. 47 and 48, a lower surface 742 of the mobile articular component 704 may interface with and upper surface 720 of the insert 702 to enable movement of the mobile articular component 704 relative to the insert 702 and the tray 350. It should be appreciated that the mobile articular component 704 (e.g., a mobile bearing) may share one or more characteristics with any of the other articular components described herein.

Figure 49:
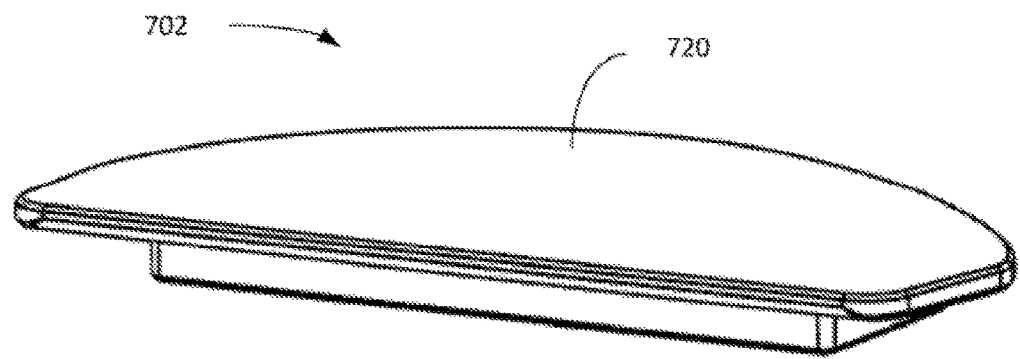
FIG. 49 is a perspective view of an insert, according to an example embodiment.
Figure 50:
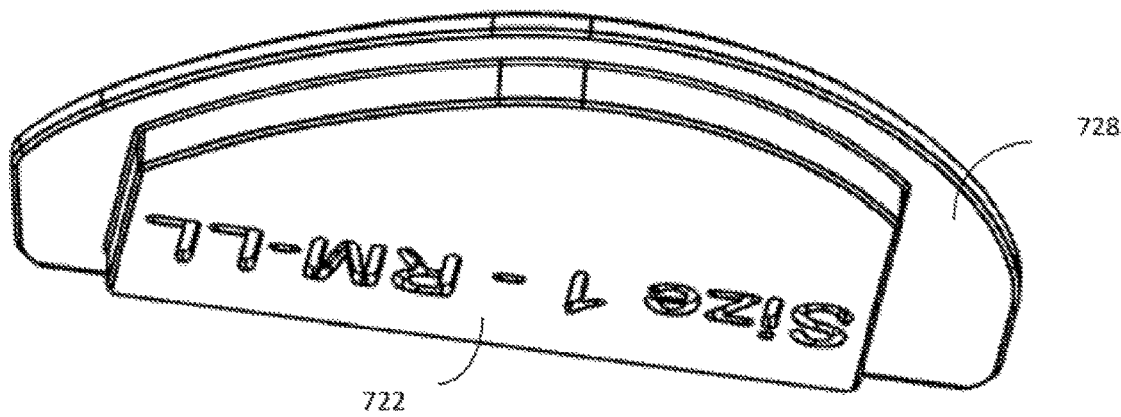
FIG. 50 is another perspective view of the insert of FIG. 49.

Referring now to FIGS. 49 and 50, an insert 702 is shown, according to an example embodiment. The insert 702 is configured to couple to the tray 350 to support a bottom surface 742 of the mobile articular component 704. For example, the insert 702 may include a tapered edge configured to couple the insert 702 to the tray 350. As shown, the insert 702 includes a top surface 720 and a bottom surface 722. The bottom surface 722 extends away from a tray interface surface 724 such that the bottom surface 722 is configured to be received within the cavity 366 (see FIG. 52) of the tray 350. According to various embodiments, the upper surface 720 includes a highly polished metal surface is configured to allow the mobile articular component 704 to translate along the upper surface 720 of the insert 702. According to other embodiments, the upper surface 720 may include ceramic, polished ceramic, polished ceramic coated metal, or polyethylene or any combination thereof.

Referring now to FIGS. 51-58, the tray 350 is shown in greater detail, according to an example embodiment. They tray 350 may be configured couple to a bone portion, such as a tibia bone, that has been prepared for the tray 350. For example, a first aperture may be created in the bone portion, wherein the first aperture is configured to receive a first post 310 that extends from a lower surface 372 of the tray 350. Further, a second aperture may be created in the bone portion, wherein the second aperture is configured to receive a second post 320 that extends from the lower surface 372 of the tray. Furthermore, a third aperture may be created in the bone portion, wherein the third aperture extends into the first aperture and the second aperture such that a fastener 600 (see FIG. 58) can be inserted into the third aperture, wherein a first portion (e.g., a first threaded portion 610 shown in FIGS. 59 and 60) of the fastener 600 is received within a first opening 312 in the first post 310 and a second portion (e.g., a second threaded portion 620 shown in FIGS. 59 and 60) of the fastener 600 is received within a second opening 322 in the second post 320. According to various embodiments, the combination of the first post 310, the second post 320, and the fastener 600 may operate to secure the tray 350 without the use of cement, which may facilitate patient recovery, as is discussed further throughout. It should be appreciated that the tray 350 may share one or more characteristics as any of the other tray or baseplate components described herein (e.g., the tibial tray 166, the tibial tray 212, etc.).

The tray 350 extends from a first end 352 to a second end 354 along a first plane. The tray further includes an upper surface 374 and a lower surface 372 opposite the upper surface 374. The tray 350 further includes a first edge 356 extending between the first end 352 and the second end 354 and a second edge 358 opposite the first edge 356 and extending between the first end 352 and the second end 354. As shown, the first edge 356 is generally linear while the second edge 358 is generally curved.

As discussed above, the tray 350 is configured to couple with a fixed articular component 400 and an insert 702. For example, a projection of the fixed articular component 400 or a projection of the insert 702 may be received within the cavity 366. They tray further includes a slot 362 proximate the first end 352 of the tray 350. The slot 362 may be configured to receive the first tab 410 of the fixed articular component 400 to secure the fixed articular component 400 to the tray 350. According to example embodiments, the first tab 410 may be depressed via the slot 362 to release the fixed articular component 400 from the tray 350.

As shown, the first post 310 includes a plurality of ridges 314 that extend along the first post 310 in the same direction as the first post 310. According to various embodiments, the ridges 314 may provide additional stability of the tray 350 and promote ingrowth of bone into the first post 310. According to various embodiments, the first post 310 may be integrally formed with the tray 350. Additionally, as discussed above, a portion or all of the first post 310 may include an osteoinductive portion (e.g., a porous portion that promotes ingrowth of bone into the first post 310) to further secure the tray 350 to the bone portion throughout the bone healing process. However, as discussed above, the first post 310 does not include an osteoinductive portion.

As shown, the first post 310 includes a first set of threads 311 within the first opening 312. As is discussed further below, the first set of threads 311 is configured to interface with a first threaded portion 610 (see FIG. 59) of the fastener 600 to couple the fastener 600 to the tray. According to various embodiments, the first set of threads 311 may be locking threads to prevent unintentional back out of the fastener 600. According to various embodiments, the first set of threads 311 may include a single thread start, a double thread start, a triple thread start, etc.

As shown, the second post 320 includes a plurality of ridges 324 that extend along the second post 320 in the same direction of the second post 320. According to various embodiments, the ridges 324 may provide additional stability of the tray 350 and promote ingrowth of bone into the second post 3200. According to various embodiments, the second post 320 may be integrally formed with the tray 350. Additionally, as discussed above, a portion or all of the second post 320 may include an osteoinductive portion (e.g., a porous portion that promotes ingrowth of bone into the second post 320) to further secure the tray 350 to the bone portion throughout the bone healing process. However, as discussed above, the second post 320 does not include an osteoinductive portion.

As shown, the second post 320 includes a second set of threads 321 within the second opening 322. As is discussed further below, the second set of threads 321 is configured to interface with a second threaded portion 620 (see FIG. 59) of the fastener 600 to couple the peg 600 to the tray. According to various embodiments, the second set of threads 321 may be locking threads to prevent unintentional back out of the fastener 600. According to various embodiments, the second set of threads 321 may include a single thread start, a double thread start, a triple thread start, etc.

According to various embodiments, the first post 310 includes another set of threads (e.g., a third set of threads 313) proximate the first opening 312. For example, a portion of the first opening 312 proximate the first end 352 may include a third set of threads 313 configured to couple the first post 310 to a surgical jig (e.g., the second portion second portion 1610 shown in FIGS. 86-86). In this sense, the third set of threads 313 within the opening 312 is configured to be coupled to a surgical jig and the first set of threads 311 within the first opening 312 is configured to engage a threaded portion of the fastener 600. According to various embodiments, the third set of threads 313 may include a single thread start, a double thread start, a triple thread start, etc.

Figure 55:
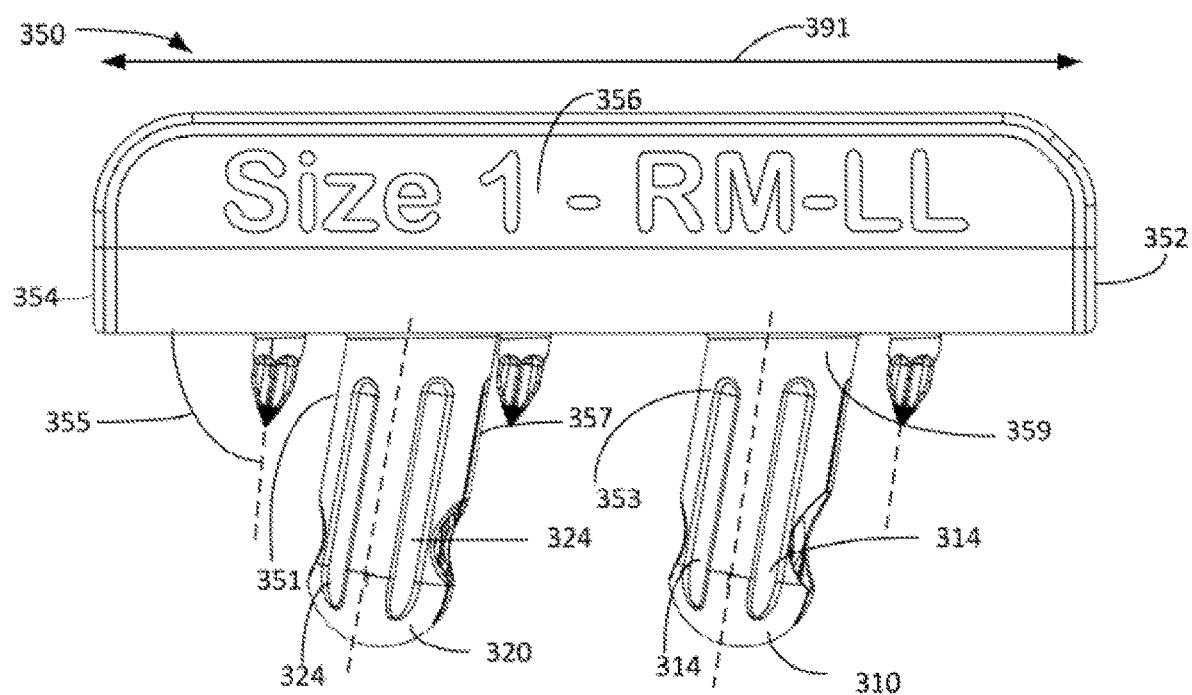
FIG. 55 is a side view of the tray of FIG. 51.

As best shown in FIG. 55, the first post 310 and second post 320 are angled with respect to the bottom surface 372 of the tray. For example, as shown, the first post 310 forms an angle 353 with the lower surface 372 and the second post 320 forms a second angle 351 with the lower surface 372 when viewed from the first edge 356. According to various embodiments, the first angle 353 and the second angle 351 are between 30 and 90 degrees. According to various embodiments, the first angle 353 and the second angle 351 are the same. According to various embodiments, the angled first post 310 and the angled second post 320 may improve stability of the tray 350.

Further, each of the plurality of spikes 330 may form an angle with respect to the bottom surface 372 of the tray. For example, as shown, the spikes 330 for a third angle 355 with the bottom surface 372 when viewed from the first edge 356. According to various embodiments, the third angle is between 30 and 90 degrees. According to various embodiments, third angle 355 may be the same as the first angle 353 and/or the second angle 351 are the same.

Figure 56:
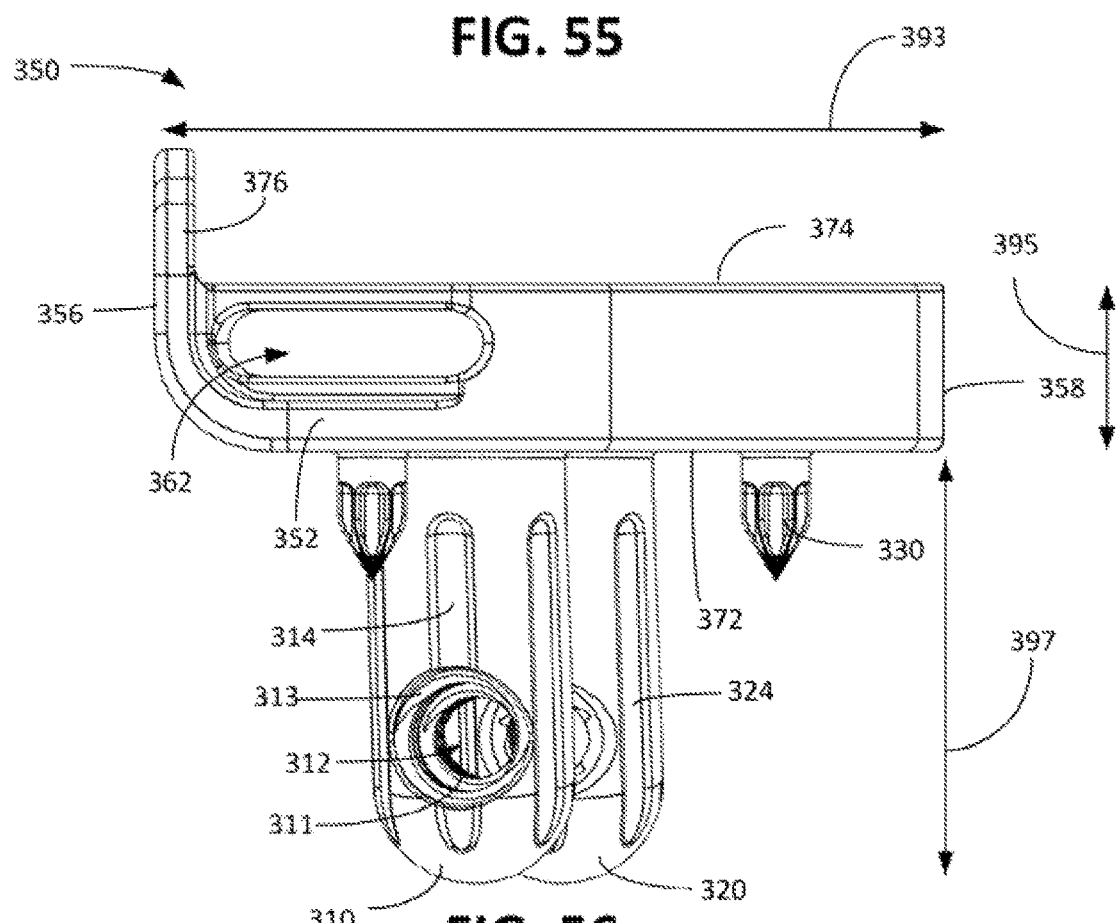
FIG. 56 is a front view of the tray of FIG. 51.

As shown in FIGS. 55 and 56, a distance between the first end 352 and the second end 354 defines a length 391 of the tray 350. According to various embodiments, the length 391 is between 30 mm and 50 mm. For example, the length may be about 40 mm. Further, a distance between the first edge 356 and the second edge 358 may define a width 393 of the tray 350. According to various embodiments, the width 393 may be between 10 mm and 30 mm. For example, the width 393 may be about 20 mm. Further, a distance between the upper surface 374 and the lower surface 372 may define a depth 395 of the tray 350. According to various embodiments, the depth 395 may be between 3 mm and 5 mm. For example, the depth 395 may be about 4 mm. Further, a distance between the lower surface 372 and an end of the first post 310 and/or the second post 320 defines a post depth 397. According to various embodiments, the post depth 397 may be between 8 mm and 16 mm. Therefore, according to various embodiments, the length 391 to width 393 ration may be between 5 and 1. According to various embodiments, the length 391 to post depth 397 ratio may be between 6.25 and 1.875.

Figure 57:
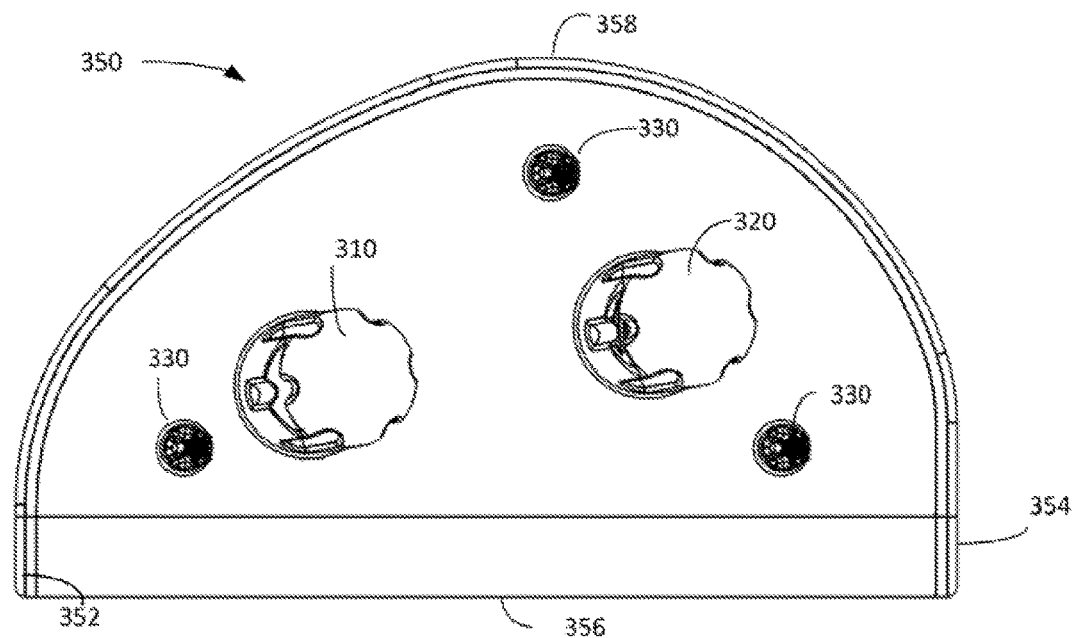
FIG. 57 is a bottom view of the tray of FIG. 51.
Figure 58:
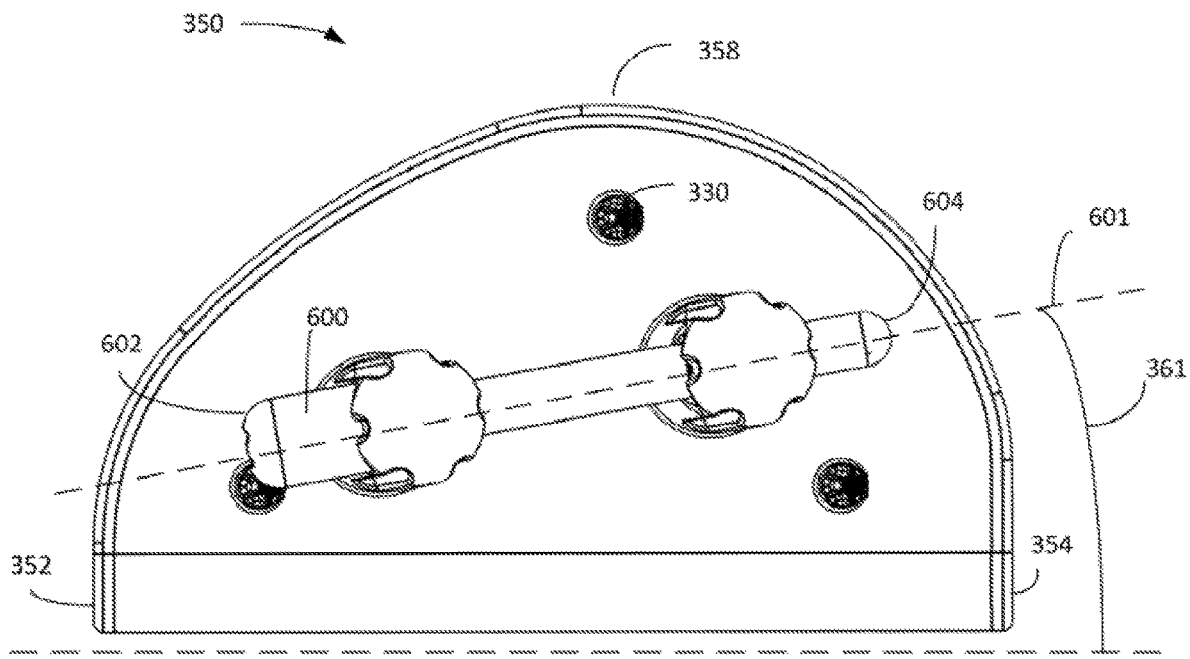
FIG. 58 is a bottom view of the tray of FIG. 51 and a fastener coupled to the tray, according to an example embodiment.

As best shown in FIGS. 57 and 58, when then fastener 600 is inserted through the first post 310 and the second post 320, the fastener 600 forms an angle 361 with respect to the first edge 356. According to various embodiments, the angle 361 may be between 0 and 45 degrees. According to various embodiments, aligning the openings in the first post 310 and the second post 320 to for the angle 361 may compress the tray 350 (e.g., the first edge 356) against the bone portion, which may improve stability of the tray 350.

Figure 59:
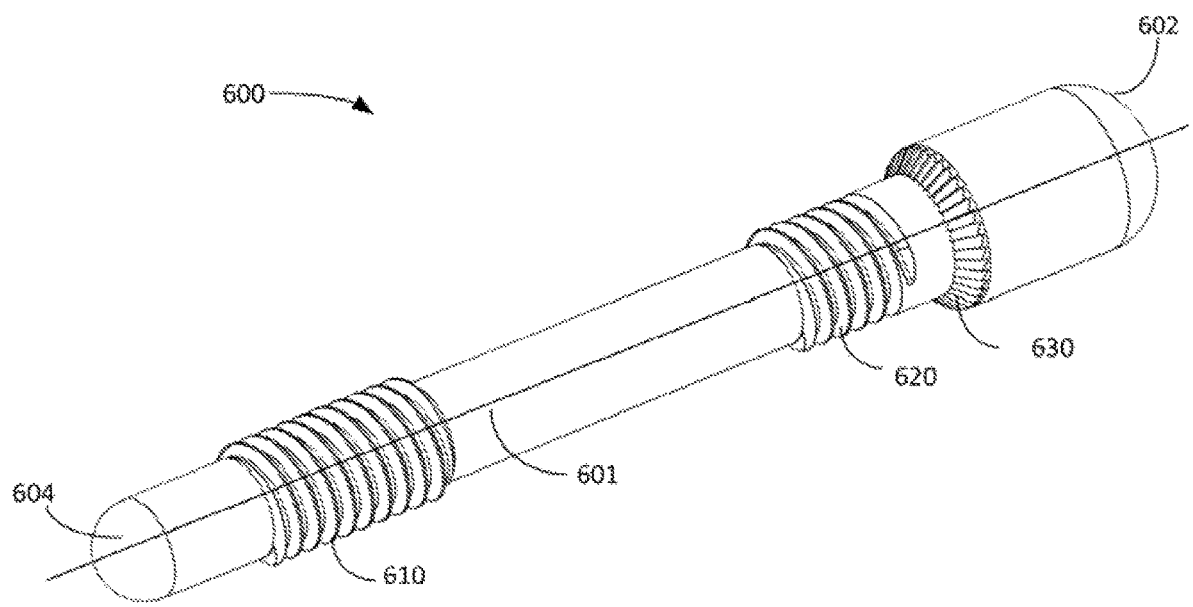
FIG. 59 is a perspective view of a peg, according to an example embodiment.
Figure 60:
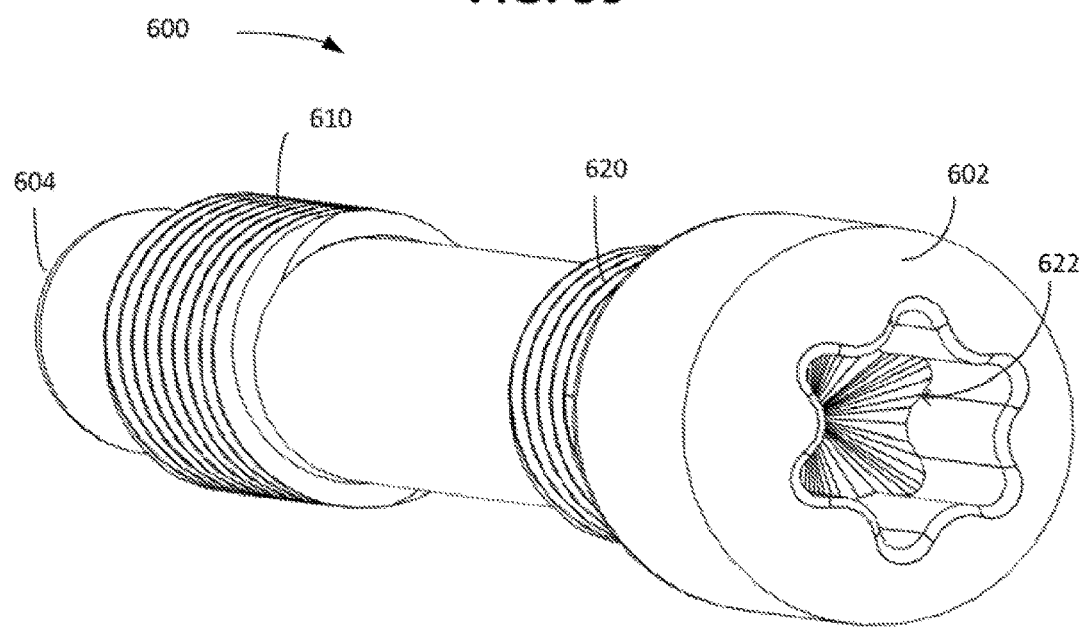
FIG. 60 is another perspective view of the fastener of FIG. 59.
Figure 61:
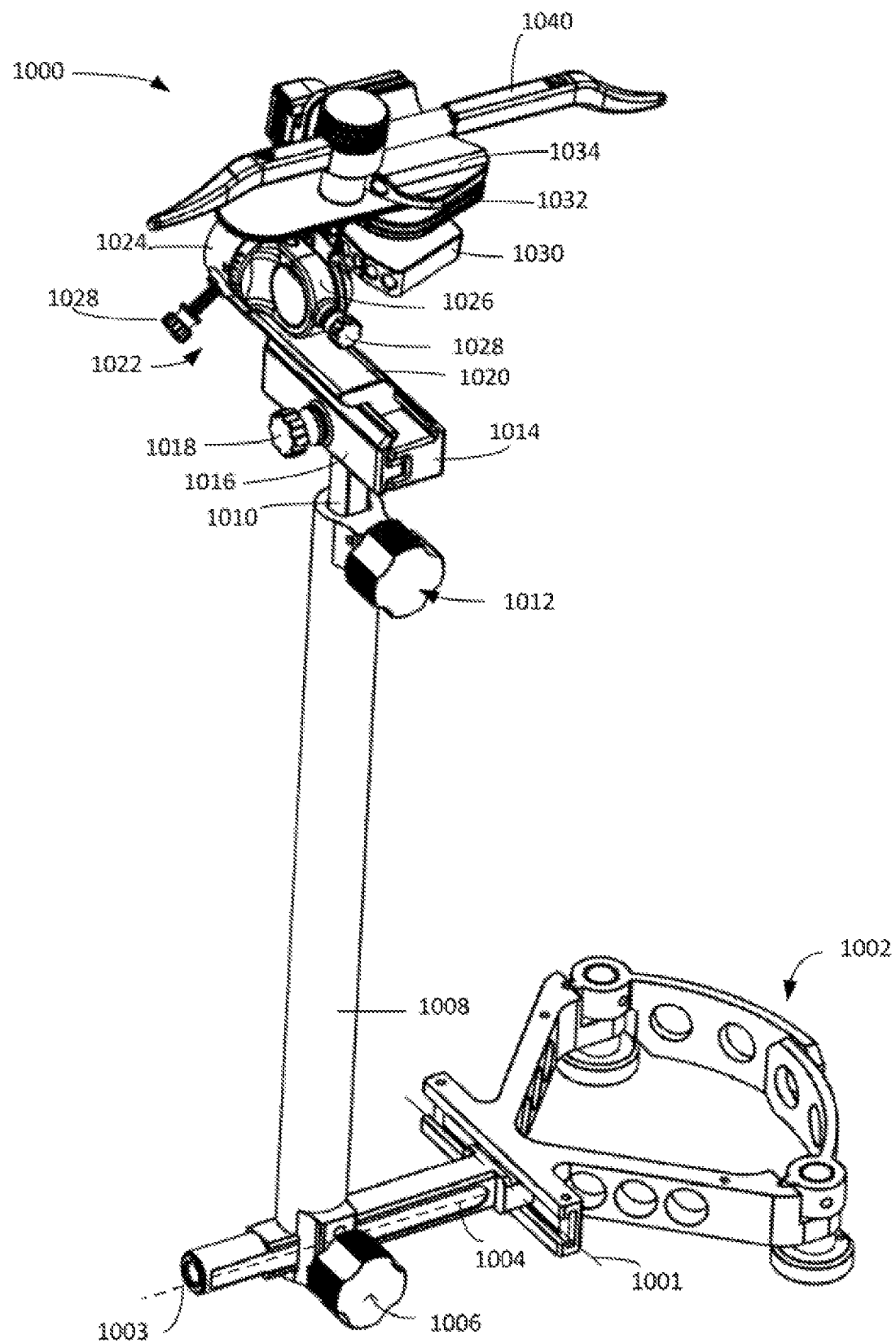
FIG. 61 is a perspective view of a surgical jig, according to an example embodiment.
Figure 62:
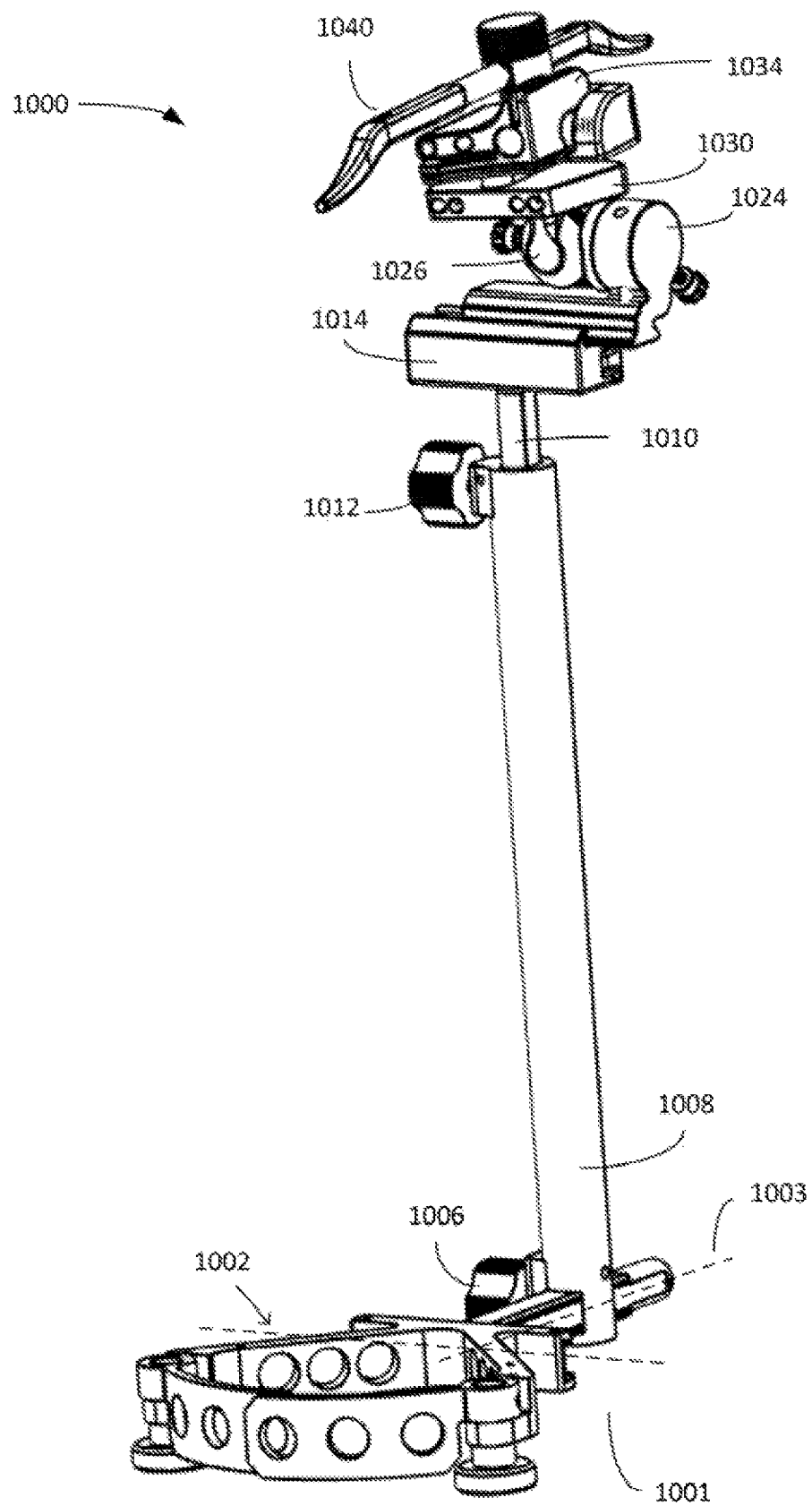
FIG. 62 is another perspective view of the surgical jig of FIG. 61.
Figure 64:
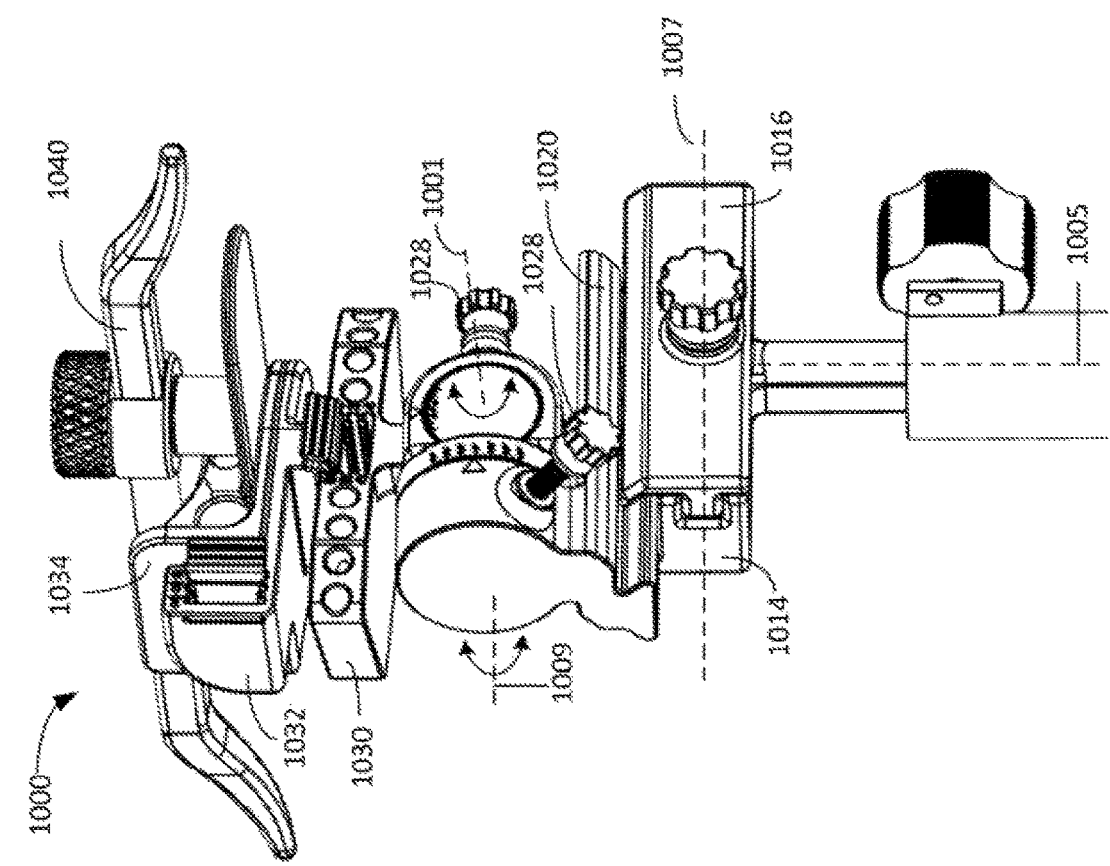
FIG. 64 is another partial perspective view of the surgical jig of FIG. 61.
Figure 63:
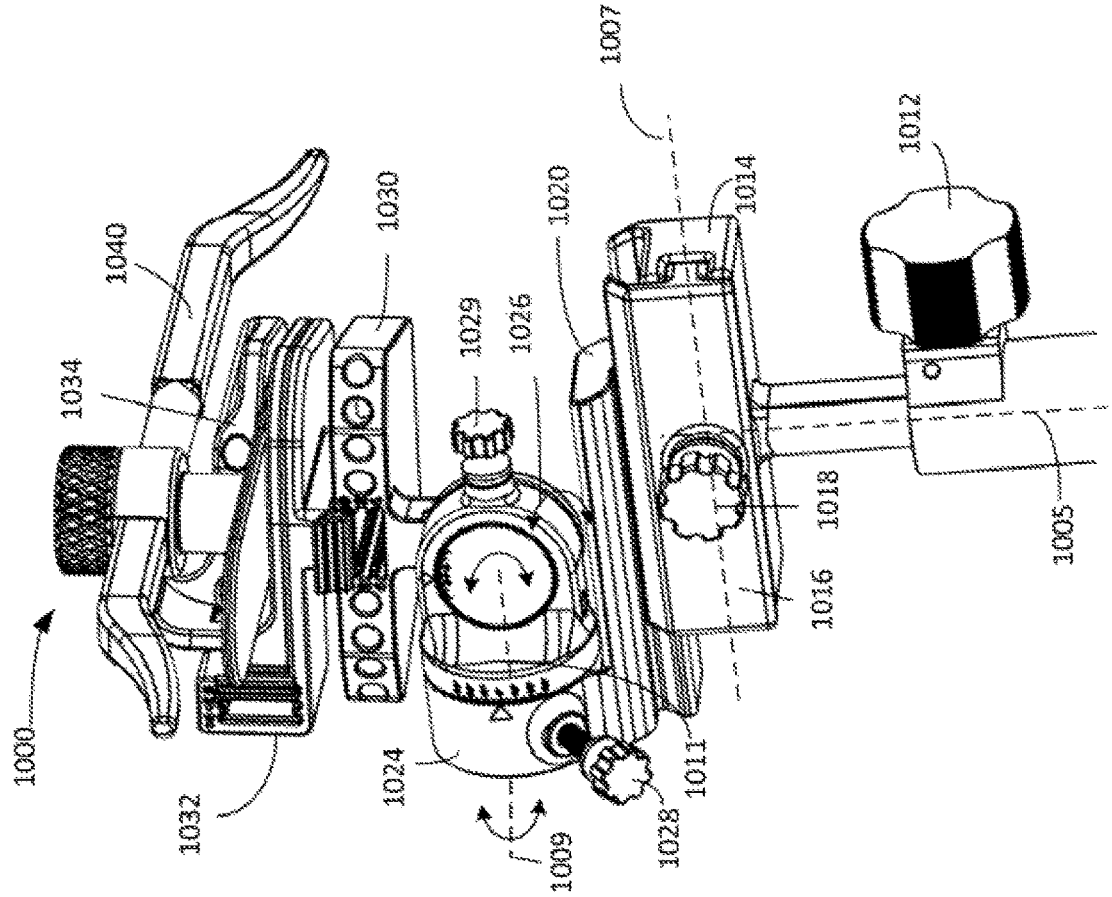
FIG. 63 is a partial perspective view of the surgical jig of FIG. 61.

Referring now to FIGS. 59 and 60, the fastener 600 is shown in greater detail. As shown, the fastener 600 extends along an axis 601 between a first end 602 (e.g., a head) and a second end 604 (e.g., a tip). As shown, the fastener 600 includes a first threaded portion 610 proximate the second end 604 and a second threaded portion 620 proximate the first end 602. As discussed above, the first threaded portion 610 is configured to engage a second set of threads 321 in the second opening 322 in the second post 320 and the second threaded portion 620 is configured to engage the first set of thread in the first opening 312 in the first post 310 to secure the tray 350 to the bone portion. According to various embodiments, the first threaded portion 610 and the second threaded portion 620 are defined by the same characteristics (e.g., thread angle, number of threads per inch, etc.). According to various embodiments, the first threaded portion 610 and/or the second threaded portion 620 may include a single thread start, a double thread start, a triple thread start, etc.

According to various embodiments, the fastener 600 includes an osteoinductive portion (e.g., a porous portion that promotes ingrowth of bone into the fastener 600). For example, some or all of the fastener 600 may be formed of a porous material. However, according to other embodiments, the fastener 600 does not include an osteoinductive portion.

According to an example embodiment, the first threaded portion 610 is configured to pass through the first opening 312 in the first post 310 before engaging the second threaded portion in the opening 322 of the second post 320. For example, the first threaded portion 610 and the second threaded portion 620 may be defined by the same characteristics (e.g., thread angle, number of threads per inch, etc.) such that the first threaded portion 610 engages the first set of threads 311 in the first opening 312 in the first post 310 such that rotation of the fastener 600 causes the first threaded portion 610 to translate though the first opening 312 in the first post. For example, a driver may be inserted into the port 622 of the fastener to cause the fastener 600 to rotate. Once the first threaded portion 610 completely passes the first set of threads 311, the fastener 600 may be further inserted until the first threaded portion 610 engages the second set of threads 321 in the second opening 322 of the second post. When the first threaded portion 610 engages the second set of threads 321 in the second opening 322, the fastener 600 may again be rotated such the first threaded portion translates into the second opening 322 of the second post and the second threaded portion 620 engages the first set of threads 311 in the first opening 312 in the first post 310.

In an alternative embodiment, an outer diameter of the first threaded portion 610 may be smaller than an outer diameter of the second threaded portion 620 such that the first threaded portion 610 can pass through the first opening 312 in the first post 310 without engaging the first set of threads 311 in the first opening 312.

As shown, the fastener 600 further includes a plurality of teeth 630 proximate first end 602. According to various embodiments, the plurality of teeth 630 are configured to reduce the likelihood of unintentional back out of the fastener 600. For example, once the fastener 600 is coupled to the tray 350, the plurality of teeth 630 may engage the first post 310 proximate the first opening 312. As shown, the plurality of teeth 630 are angled such that they are configured to dig into the first post 310 in the event the fastener 600 turns counterclockwise (e.g., as a part of an unintentional back out). According to various embodiments, the plurality of teeth 630 are compressed against the first post when the fastener is fully inserted.

Referring now to FIGS. 61-68, a surgical jig 1000 is shown, according to an example embodiment. The surgical jig 1000 may be used to prepare one or more bone portions for implantation of one or more components of any of the surgical implants described herein. For example, the surgical jig 1000 may be used to prepare a portion of the tibia as a part of a UKA.

As shown, the surgical jig 1000 includes first component 1002. The first component may act as a base support or couple to another structure (e.g., a support structure, a human body part such as a leg, etc.) during use of the surgical jig 1000. As shown, the first component 1002 is adjustably coupled to a second component 1004 such that the first component 1002 can controllably translate about a first axis 1001 with respect to the second component.

As shown, the second component 1004 is coupled to a third component 1008 (e.g., a first support) such that the third component 1008 can translate along a second axis 1003 relative to the second component 1004. According to various embodiments, the second axis 1003 is perpendicular to the first axis 1001. As shown, a first locking mechanism 1006 may be used to fix the position of the third component 1008 relative to the second component 1004.

As shown, the third component 1008 is coupled to a fourth component 1010 (e.g., a second support) is coupled to the third component 1008 such that the fourth component 1010 is configured to translate along a third axis 1005 with respect to the third component 1008. According to various embodiments, the third axis 1005 is perpendicular to the first axis 1001 and/or the second axis 1003. As shown, the fourth component 1010 is configured to translate within an opening (e.g., in a telescoping manner) of the third component. Further, a second locking mechanism 1012 is configured to secure the position of the fourth component 1010 relative to the third component 1008.

As shown, the fourth component 1010 is adjustably coupled to a fifth component 1016 such that the fifth component 1016 is configured to selectively translate along a fifth axis 1007. According to various embodiments, the fifth axis 1007 is perpendicular to the second axis 1003 and/or the third axis 1005. According to various embodiments, the fifth axis 1007 is parallel to the first axis 1001. As shown, a third locking mechanism 1018 is configured to secure the position of the fifth component 1016 relative to the fourth component 1014.

As shown, a sixth component 1020 (e.g., an adjustment bar) is coupled to the fourth component 1014 and the fifth component 1016 such that the sixth component 1020 is configured to translate along the fifth axis 1007. According to various embodiments, the third locking mechanism 1018 is configured to secure the position of the sixth component 1020 relative to the fourth component 1014 and/or the fifth component 1016.

As shown, the sixth component 1020 is coupled to a first angular adjustment mechanism 1024. According to various embodiments, the first angular adjustment mechanism 1024 is integrally formed with the sixth component 1020. The first angular adjustment mechanism 1024 enables rotation of a first cutting block 1030 about a sixth axis 1009. According to various embodiments, the sixth axis 1009 is parallel to the fifth axis 1007. As shown, a fourth locking mechanism 1028 is configured to secure the angular position of the first cutting block 1030 relative to the sixth axis 1009. Further, as shown, the first angular adjustment mechanism 1024 includes a plurality of visual indicators to indicate the relative angular position of the first cutting block 1030 relative to the sixth axis 1009.

As shown, the second angular adjustment mechanism 1026 is coupled to a first angular adjustment mechanism 1024. The second angular adjustment mechanism 1026 enables rotation of the first cutting block 1030 about a seventh axis 1011. According to various embodiments, the seventh axis 1011 is perpendicular to the sixth axis 1009. As shown, a fifth locking mechanism 1029 is configured to secure the angular position of the first cutting block 1030 relative to the seventh axis 1011. Further, as shown, the second angular adjustment mechanism 1026 includes a plurality of visual indicators to indicate the relative angular position of the first cutting block 1030 relative to the seventh axis 1011.

Figures 65, 66:
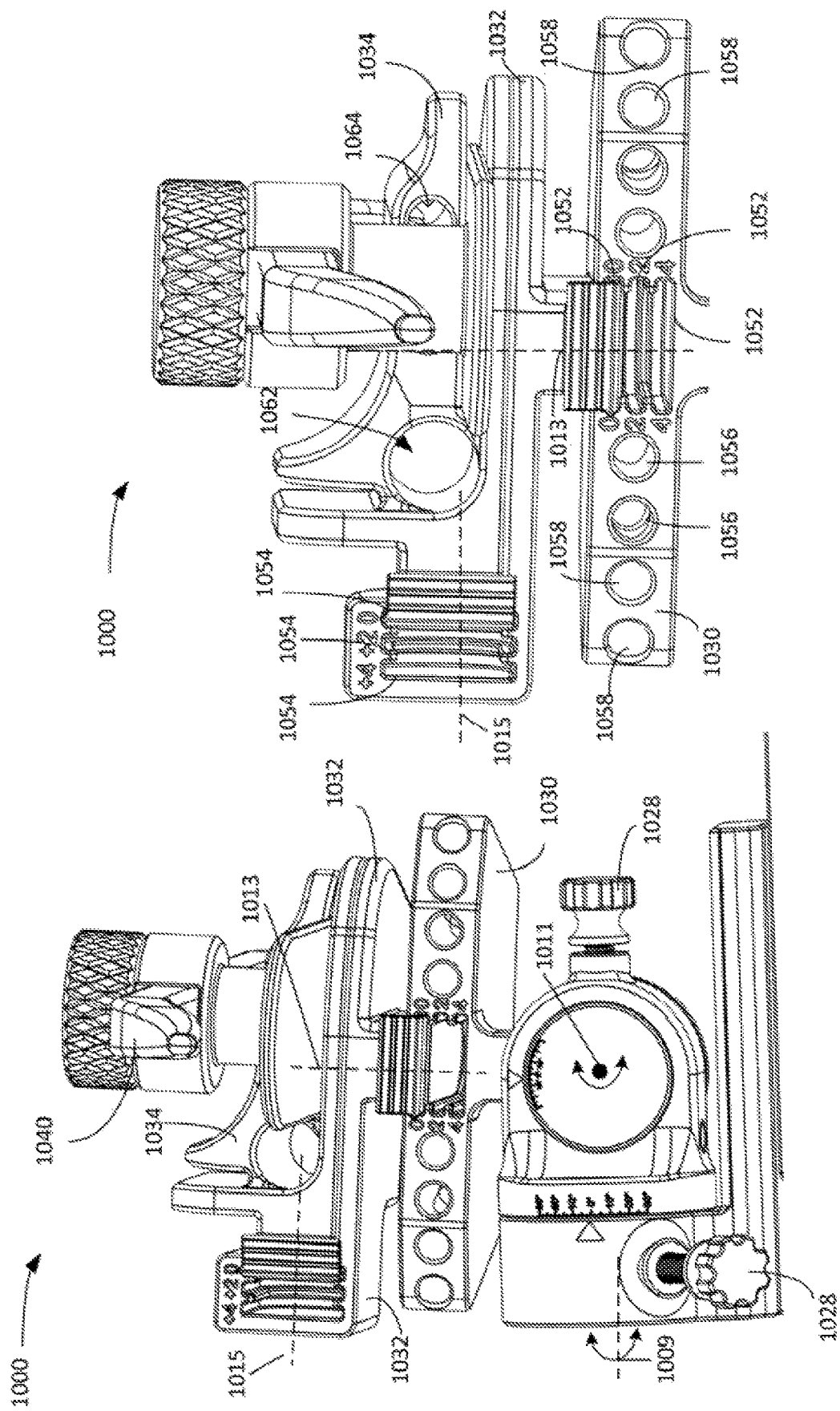
FIG. 65 is another partial perspective view of the surgical jig of FIG. 61.
FIG. 66 is another partial perspective view of the surgical jig of FIG. 61.
Figure 67:
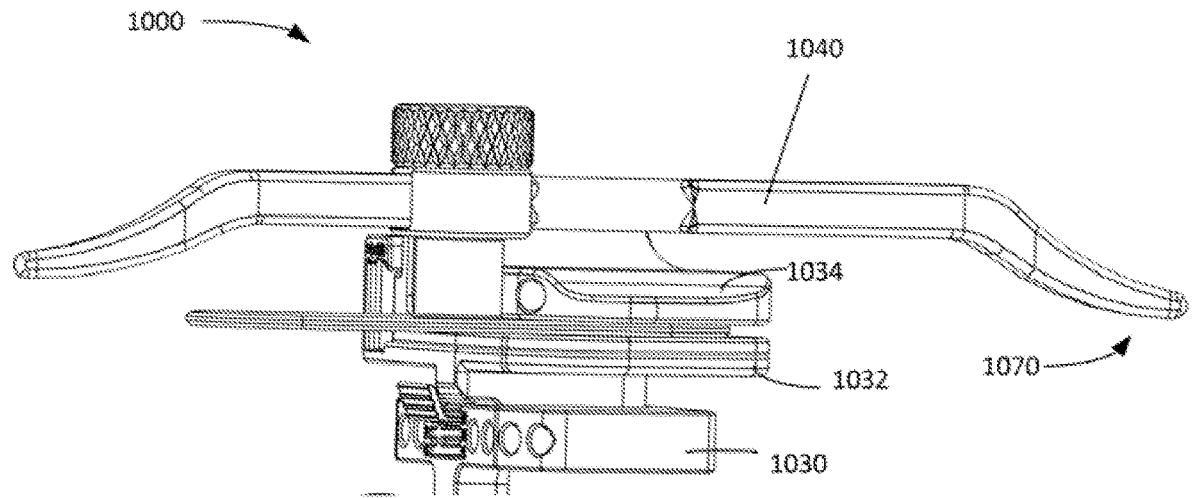
FIG. 67 is another partial perspective view of the surgical jig of FIG. 61.
Figure 68:
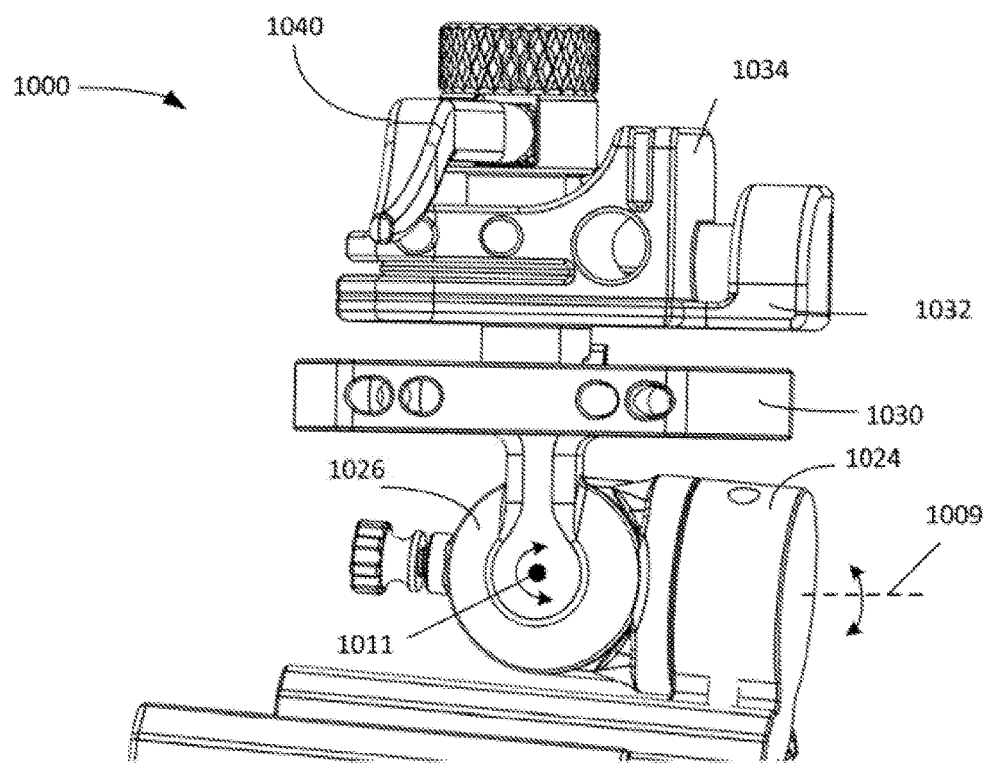
FIG. 68 is another partial perspective view of the surgical jig of FIG. 61.
Figure 72:
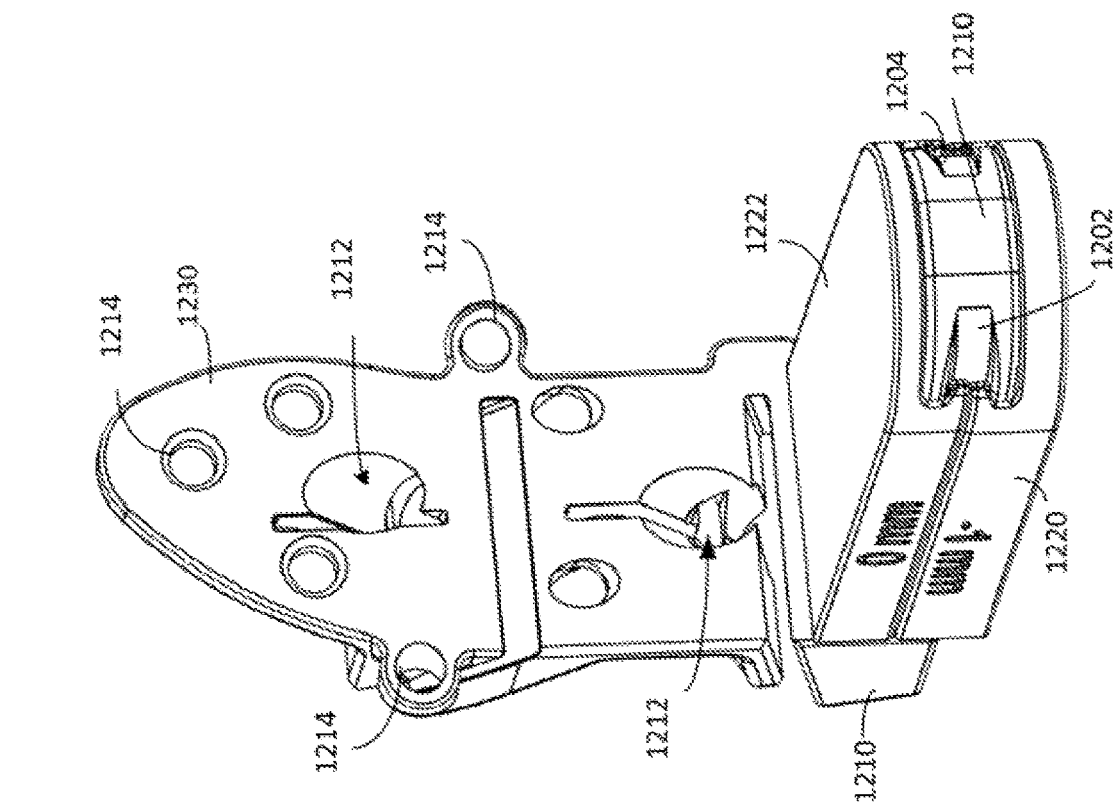
FIG. 72 is another perspective view of the surgical jig of FIG. 71.
Figure 71:
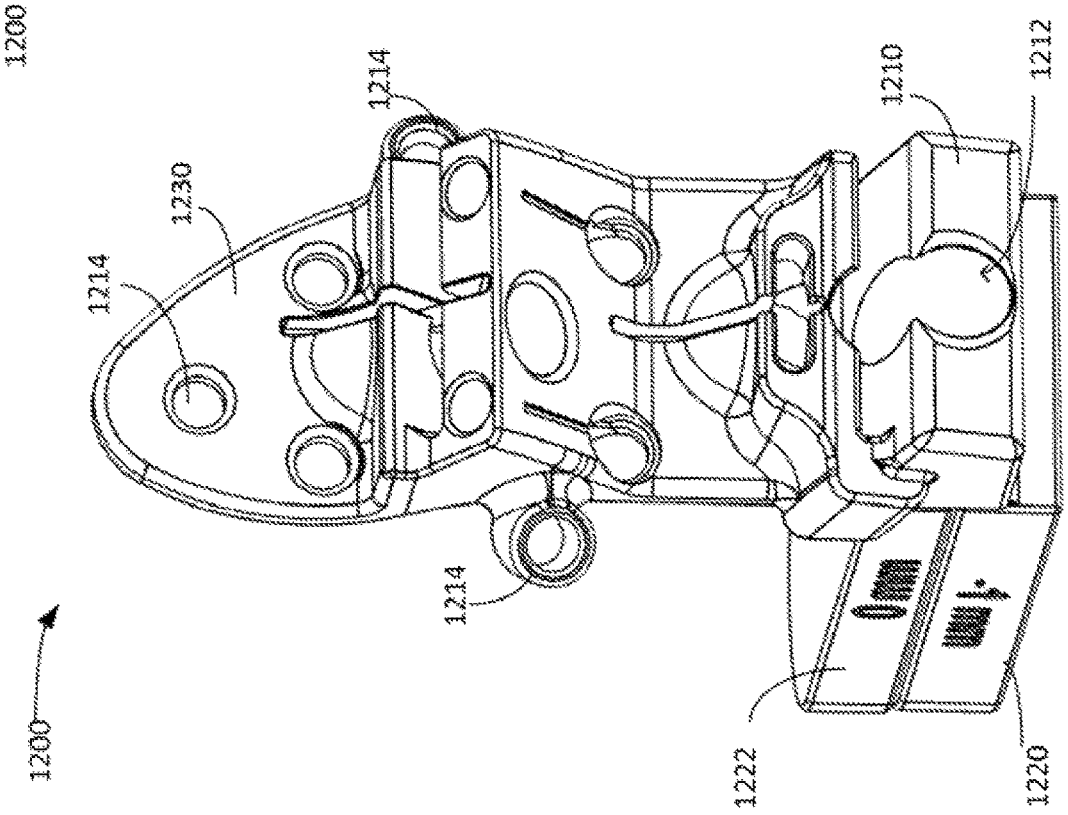
FIG. 71 is a perspective view of another surgical jig, according to an example embodiment.

As is best shown in FIGS. 65 and 66, the first cutting block 1030 includes a plurality of holes 1056, 1058 extending through the first cutting block 1030. According to various embodiments, the holes 1056, 1058 may be configured to receive a screw and/or a drill bit. As shown, a first plurality of holes 1056 extend straight through the first cutting block 1030 while a second plurality of holes 1058 are angled towards a middle portion of the first cutting block 1030.

As shown, a second cutting block 1032 is coupled to the first cutting block such that a distance along an eighth axis 1013 can be selectively adjusted (e.g., adjusting a distance between an upper surface of the first cutting block 1030 and a lower surface of the second cutting block 1032). As shown, a portion of the second cutting block 1032 is received within one of a plurality of slots 1052. Due to the fixed number of slots 1052, the second cutting block 1032 is adjustable relative to the first cutting block 1030 between a fixed numbers of positions. As shown, the first cutting block 1030 includes a plurality of visual indicators proximate the slots 1052 that are configured to provide an indication of the distance between the first cutting block 1030 and the second cutting block 1032.

As shown, a third cutting block 1034 is coupled to the second cutting block 1032 such that position of the third cutting block 1034 relative to the second cutting block 1032 along a ninth axis 1015 can be selectively adjusted. For example, as shown, the second cutting block 1032 includes a plurality of slots 1054 configured to receive a portion of the third cutting block 1034. According to various embodiments, the ninth axis 1015 is perpendicular to the eighth axis 1013. Due to the fixed number of slots 1054, the third cutting block 1034 is adjustable relative to the second cutting block 1032 between a fixed numbers of positions. As shown, the second cutting block 1032 includes a plurality of visual indicators proximate the slots 1054 that are configured to provide an indication of the distance between the second cutting block 1032 and the third cutting block 1034.

As shown, the third cutting block 1034 includes a plurality of holes 1062, 1064 extending through the third cutting block 1034. The holes 1062, 1064 may be configured to receive a screw and/or a drill bit. According to various embodiments, the hole 1062 is configured to receive a drill bit configured to drill into the tibia (e.g., to create a ledge for the first edge 356 of the tray 350 to align with).

As shown, a bar 1040 (e.g., a stylus) is coupled to the third cutting block 1034. The bar 1040 includes a curved portion 1070 proximate an end of the bar 1040. According to various embodiments, the curved portion 1070 is configured to engage a bone portion (e.g., a surface of the tibia) such that the holes 1056, 1058, 1062, 1064 can be aligned relative to the bone portion engaged by the curved portion 1070.

Referring now to FIGS. 69 and 70, another surgical jig 1100 is shown, according to an example embodiment. The surgical jig 1100 may be configured to prepare a portion of bone for implantation of a component of a surgical implant. For example, the surgical jig 1100 may be configured to prepare a portion of a femur as a part of a UKA.

As shown, the surgical jig 1100 includes a baseplate 1110 extending in a first direction. The baseplate 1110 includes a first guide 1112 on a first lateral side and a second guide 1114 on a second lateral side. As shown, the first guide 1112 and the second guide 1114 are configured to receive a portion of a first spacer 1120 and a second spacer 1122 to couple the first spacer 1120 and the second spacer 1122 to a lower surface and an upper surface of the baseplate 1110.

According to various embodiments, the baseplate 1110 is configured to be used in conjunction with a number of different sized spacers. According to various embodiments, the surgeon may select a certain size spacer based on the type of surgery (e.g., fixed bearing UKA vs mobile bearing UKA), the size of the patient, and/or the space available in the surgical location.

As shown, the surgical jig 1100 further includes a cutting block 1130 coupled to the baseplate 1110 (e.g., via the guides 1112, 1114). According to various embodiments, the cutting block 1130 extends perpendicularly away from the baseplate 1110. According to various embodiments, the cutting block 1130 includes a plurality of parallel apertures 1132 extending though the cutting block. According to various embodiments the apertures 1132 may be configured to receive a screw (e.g., the bone screw 1150) and/or a drill bit. For example, a plurality of bone screws 1150 may be inserted into the apertures 1132 and drilled into a bone portion to secure the cutting block 1130 to the bone portion. Once the cutting block 1130 is secured to the bone portion, the other apertures 1132 may receive a drill bit to drill additional openings in the bone portion. According to various embodiments, the apertures 1132 may be parallel, convergent, or divergent from one another.

Referring now to FIGS. 71-74, another surgical jig 1200 is shown, according to an example embodiment. The surgical jig 1200 may be configured to prepare a portion of bone for implantation of a component of a surgical implant. For example, the surgical jig 1200 may be configured to prepare a portion of a femur as a part of a UKA.

As shown, the surgical jig 1200 includes a baseplate 1210 extending in a first direction. The baseplate 1210 includes a first guide 1202 on a first lateral side and a second guide 1204 on a second lateral side. As shown, the first guide 1202 and the second guide 1204 are configured to receive a portion of a first spacer 1220 and a second spacer 1222 to couple the first spacer 1220 and the second spacer 1222 to a lower surface and an upper surface of the baseplate 1210.

According to various embodiments, the baseplate 1210 is configured to be used in conjunction with a number of different sized spacers. According to various embodiments, the surgeon may select a certain size spacer based on the type of surgery (e.g., fixed bearing UKA vs mobile bearing UKA), the size of the patient, and/or the space available in the surgical location.

Figure 73:
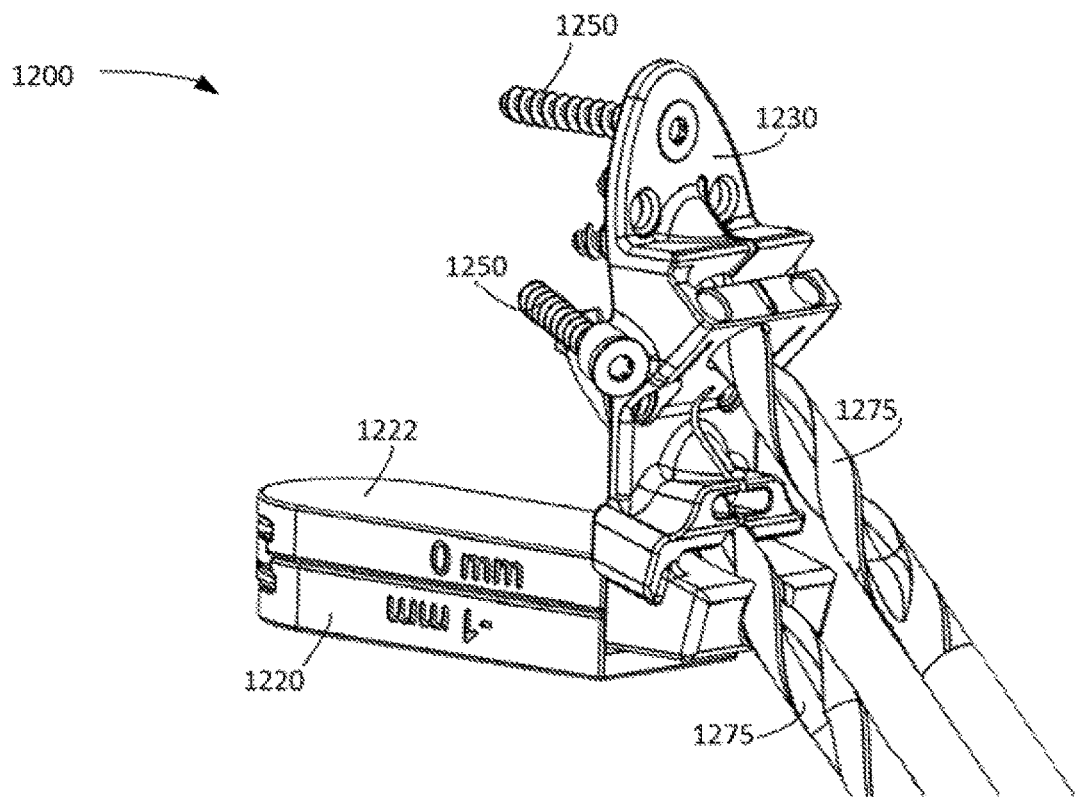
FIG. 73 is another perspective view of the surgical jig of FIG. 71.
Figure 74:
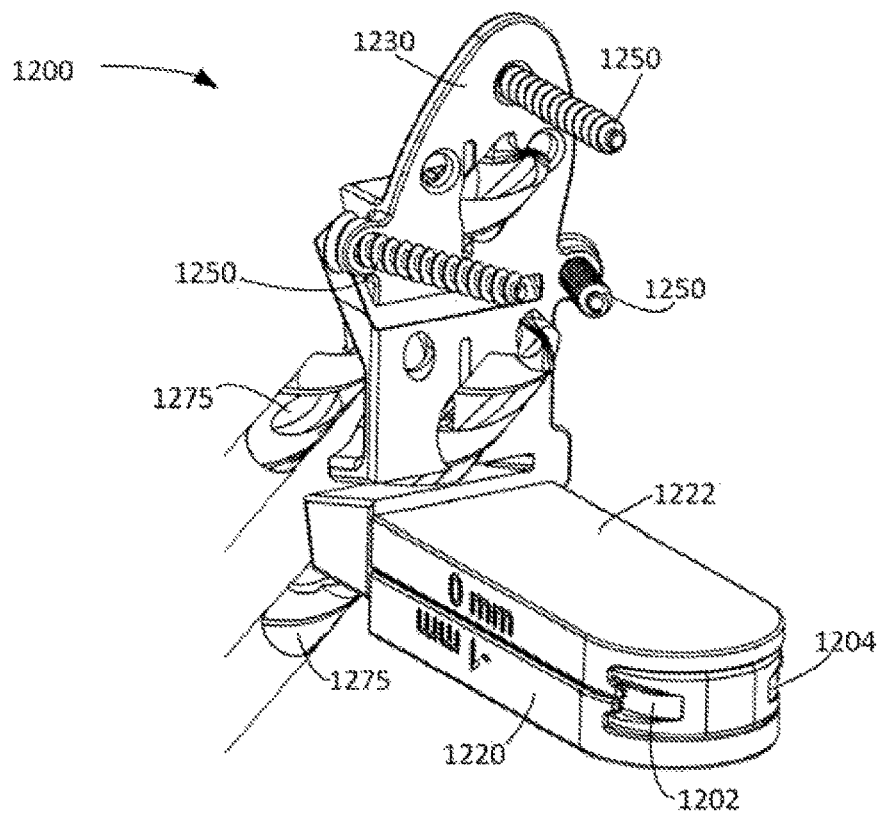
FIG. 74 is another perspective view of the surgical jig of FIG. 71.
Figure 75:
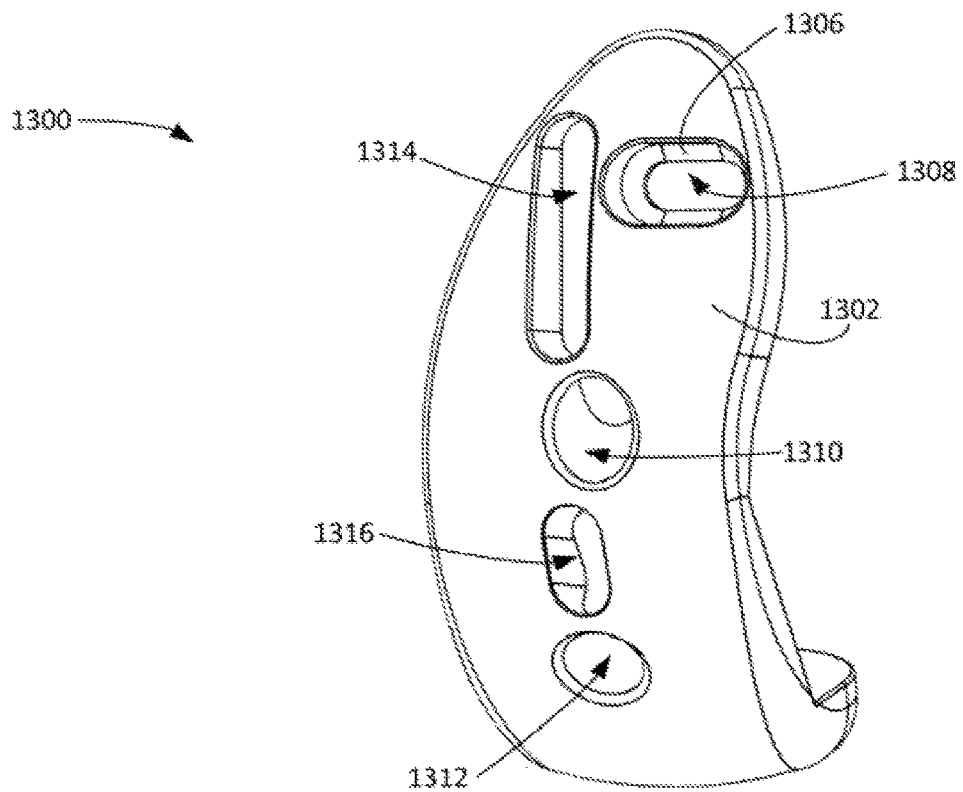
FIG. 75 is a perspective view of another surgical jig, according to an example embodiment.

As shown, the surgical jig 1200 further includes a cutting block 1230 coupled to the baseplate 1210. According to various embodiments, the cutting block 1230 is integrally formed with the baseplate 1210. According to various embodiments, the cutting block 1230 is perpendicular to the baseplate 1210. According to various embodiments, the cutting block 1230 includes a plurality of screw apertures 1214 and a plurality of drill apertures 1212. According to various embodiments the screw apertures 1214 are configured to receive a screw (e.g., the bone screw 1250) and the drill apertures 1212 are configured to receive a drill bit (e.g., the drill bit 1275). For example, a plurality of bone screws 1250 may be inserted into the screw apertures 1214 (e.g., as shown in FIGS. 73 and 74) and drilled into a bone portion to secure the cutting block 1230 to the bone portion. Once the cutting block 1230 is secured to the bone portion, drill bits 1275 may be inserted into the drill apertures 1212 to create apertures in the bone portion.

Referring now to FIGS. 75-78, another surgical jig 1300 is shown, according to an example embodiment. The surgical jig 1300 may be configured to prepare a portion of bone for implantation of a component of a surgical implant. For example, the surgical jig 1300 may be configured to prepare a portion of a femur as a part of a UKA (e.g., a mobile bearing UKA).

As shown, the surgical jig 1300 includes a body portion that defines an inner surface 1304 and an outer surface 1302. As shown, first slot 1306 extends into the outer surface 1302 and terminates at a first ledge. A second slot 1308 extends from the first ledge through the inner surface 1304. The second slot 1308 is configured to receive a bone screw (e.g., the bone screw 1318) and the first ledge is configured to prevent a head of the bone screw 1318 from passing through the inner surface 1304. Advantageously, a portion of the bone screw 1318 is configured to translate within the second slot 1308 such that the position of the surgical jig 1300 can be adjusted after a portion of the bone screw 1318 has been drilled into the bone portion. Once the surgical jig 1300 is in a desired location, the bone screw 1318 can be tightened to fix the position of the surgical jig 1300 relative to the bone portion.

As shown, the surgical jig 1300 includes a first drill aperture 1310 configured to receive a drill bit 1350 and a second drill aperture 1312 configured to receive a second drill bit 1350. According to various embodiments, the first drill aperture 1310 and the second drill aperture 1312 are parallel to one another.

Figure 76:
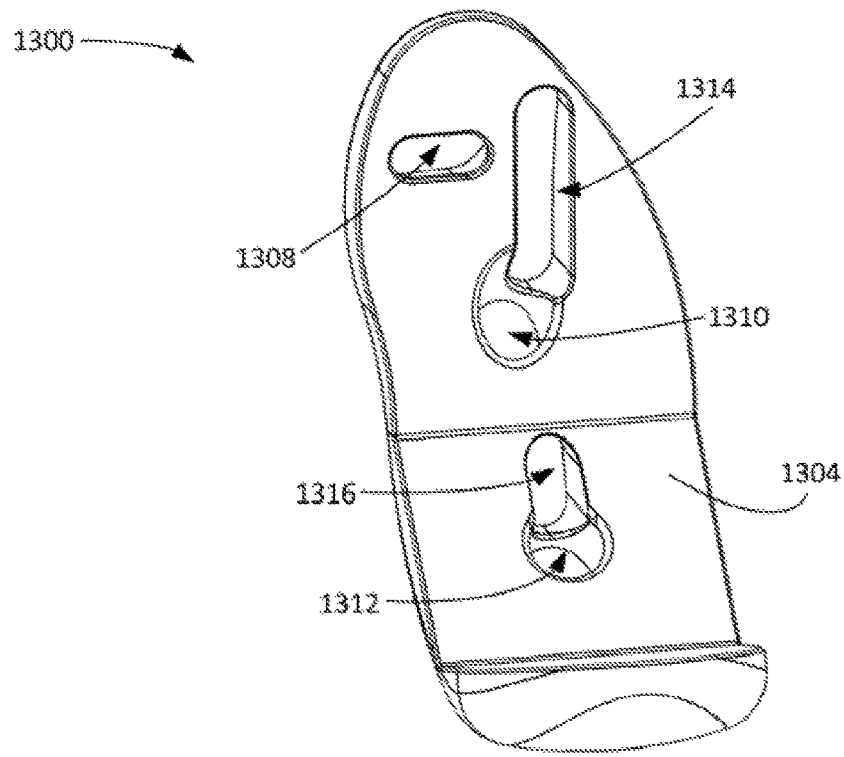
FIG. 76 is another perspective view of the surgical jig of FIG. 75.
Figure 77:
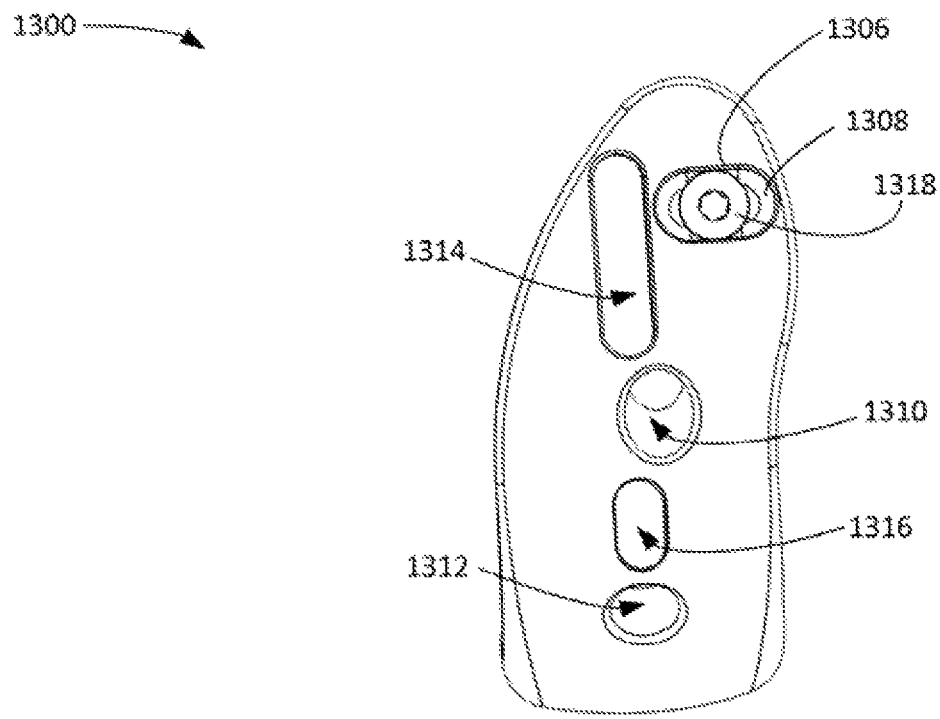
FIG. 77 is another perspective view of the surgical jig of FIG. 75.
Figure 78:
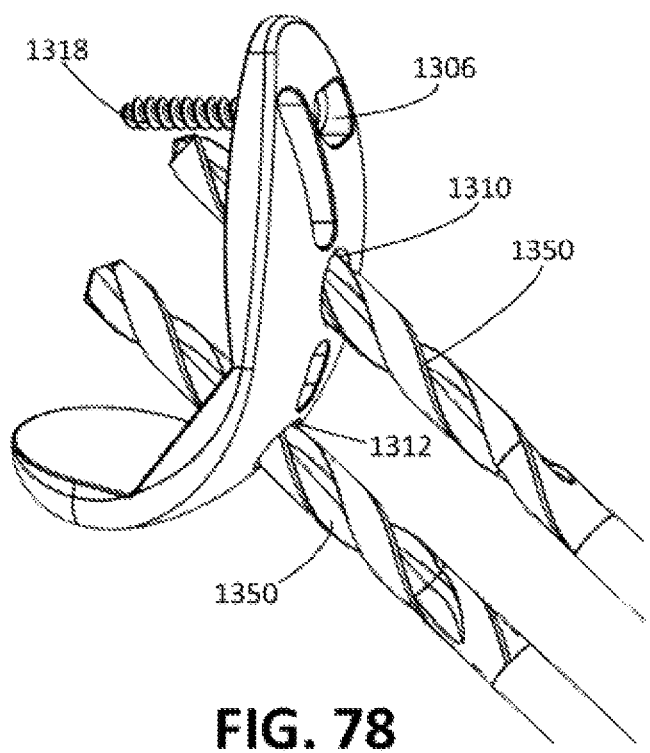
FIG. 78 is another perspective view of the surgical jig of FIG. 75.
Figure 79:
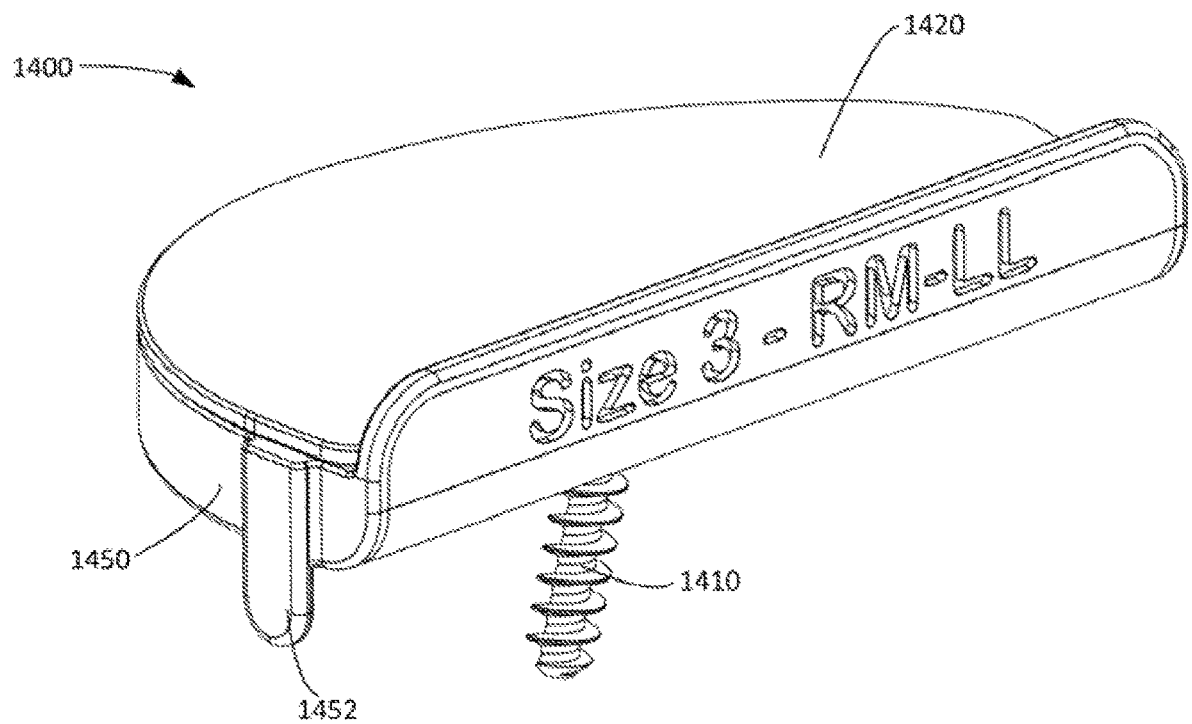
FIG. 79 is a perspective view of another surgical jig, according to an example embodiment.
Figure 80:
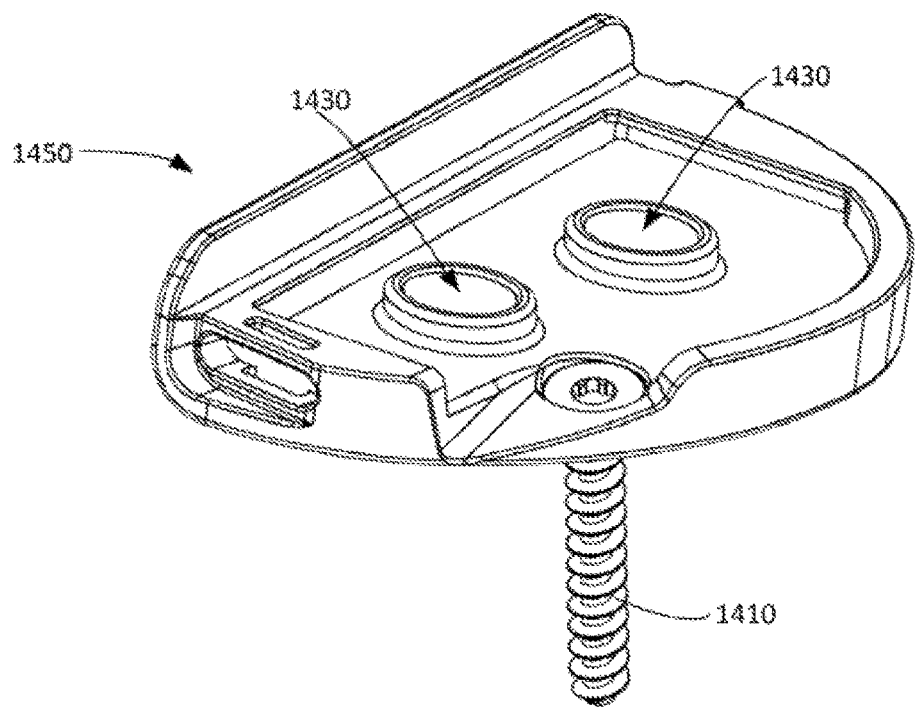
FIG. 80 is another perspective view of the surgical jig of FIG. 79.
Figure 81:
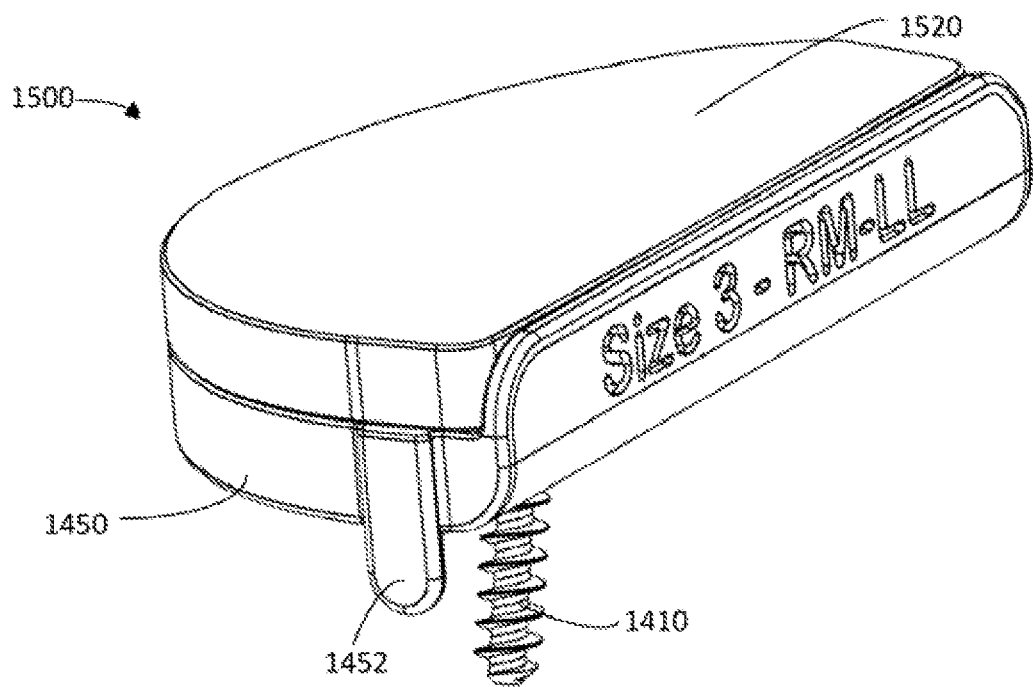
FIG. 81 is another perspective view of the surgical jig of FIG. 79.
Figure 82:
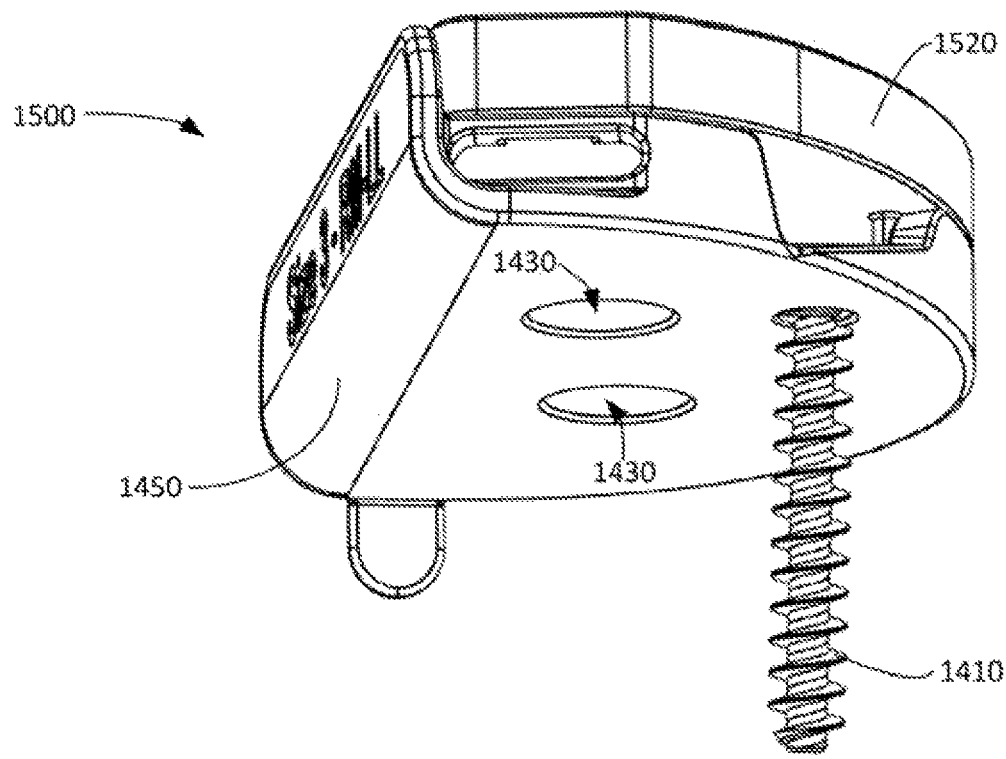
FIG. 82 is another perspective view of the surgical jig of FIG. 79.
Figure 83:
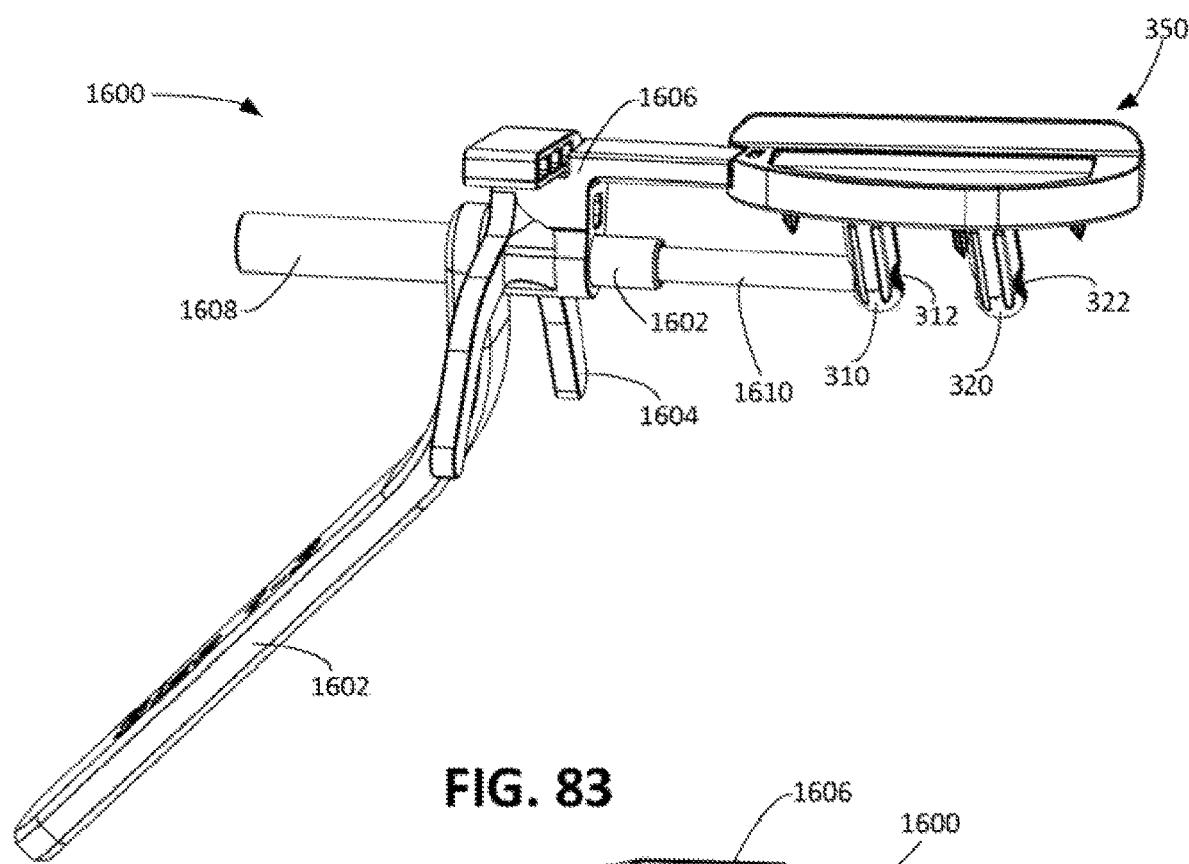
FIG. 83 is a perspective view of another surgical jig, according to an example embodiment.
Figure 84:
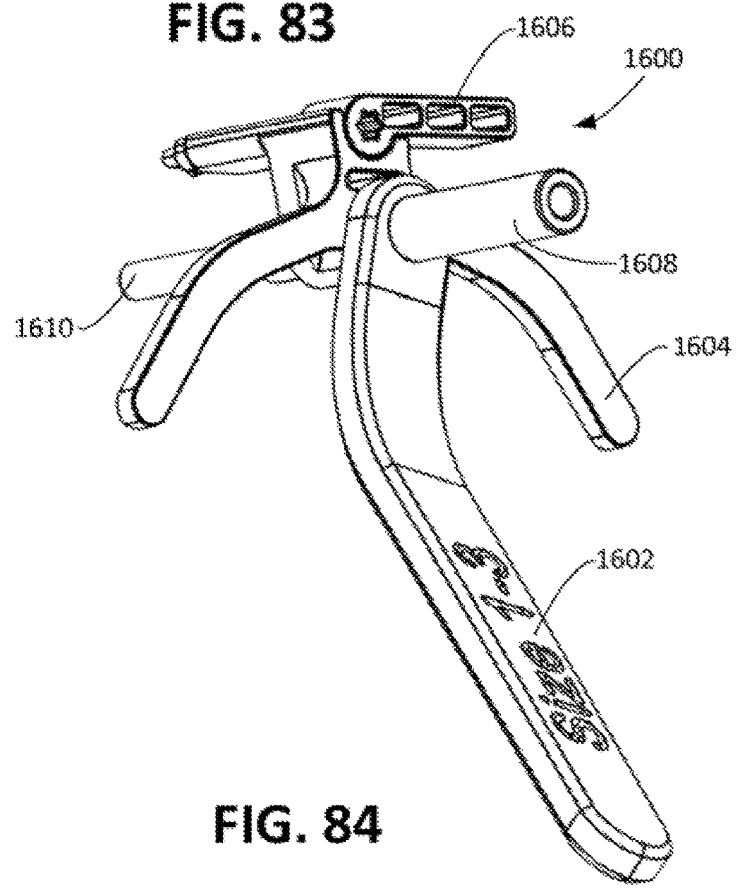
FIG. 84 is another perspective view of the surgical jig of FIG. 83.

As shown, the surgical jig 1300 further includes a first window 1314 (e.g., a slot) and a second window 1316 (e.g., a slot) configured to allow a surgeon to view a portion of the bone portion through the windows 1314, 1316 while the surgical jig 1300 is secured to the bone portion. As is best shown in FIG. 76, a portion of the first drill aperture 1310 intersects a portion of the first window and a portion the second drill aperture 1312 intersects a portion of the second window 1316.

Referring now to FIGS. 79-82, a surgical jig 1450 is shown, according to various embodiments. The surgical jig 1450 may be configured to prepare a portion of bone for implantation of a component of a surgical implant. For example, the surgical jig 1450 may be configured to prepare a portion of a tibia as a part of a UKA (e.g., a mobile bearing UKA, a fixed bearing UKA, etc.). According to various embodiments, the surgical jig 1450 is configured to be use with a first tray 1420 that represents the thickness of an insert used in a mobile bearing UKA (e.g., as shown by the assembly 1400 of FIG. 79) and a second tray 1520 that represents the thickness of a fixed articular portion used in a fixed bearing UKA (e.g., as shown by the assembly 1500 of FIGS. 81 and 81).

As shown, the surgical jig 1450 includes an arm 1452. According to various embodiments, the arm 1452 is configured to engage the bone portion to reduce movement of the surgical jig 1450 relative to the bone portion. As shown, the surgical jig 1450 is configured to receive a bone screw 1410 configured to couple the surgical jig 1450 to a bone portion. After the surgical jig 1450 is secured, a drill bit may be inserted into either, or both, drill apertures 1430 to create an opening in the bone portion.

Referring now to FIGS. 83-86, a surgical jig 1600 is shown according to an example embodiment. As shown, the surgical jig 1600 is configured to couple with a tray 350 and drill an opening (e.g., a third aperture) into a bone portion such that a fastener can be inserted into the opening and through the first post 310 and the second post 320.

Figure 85:
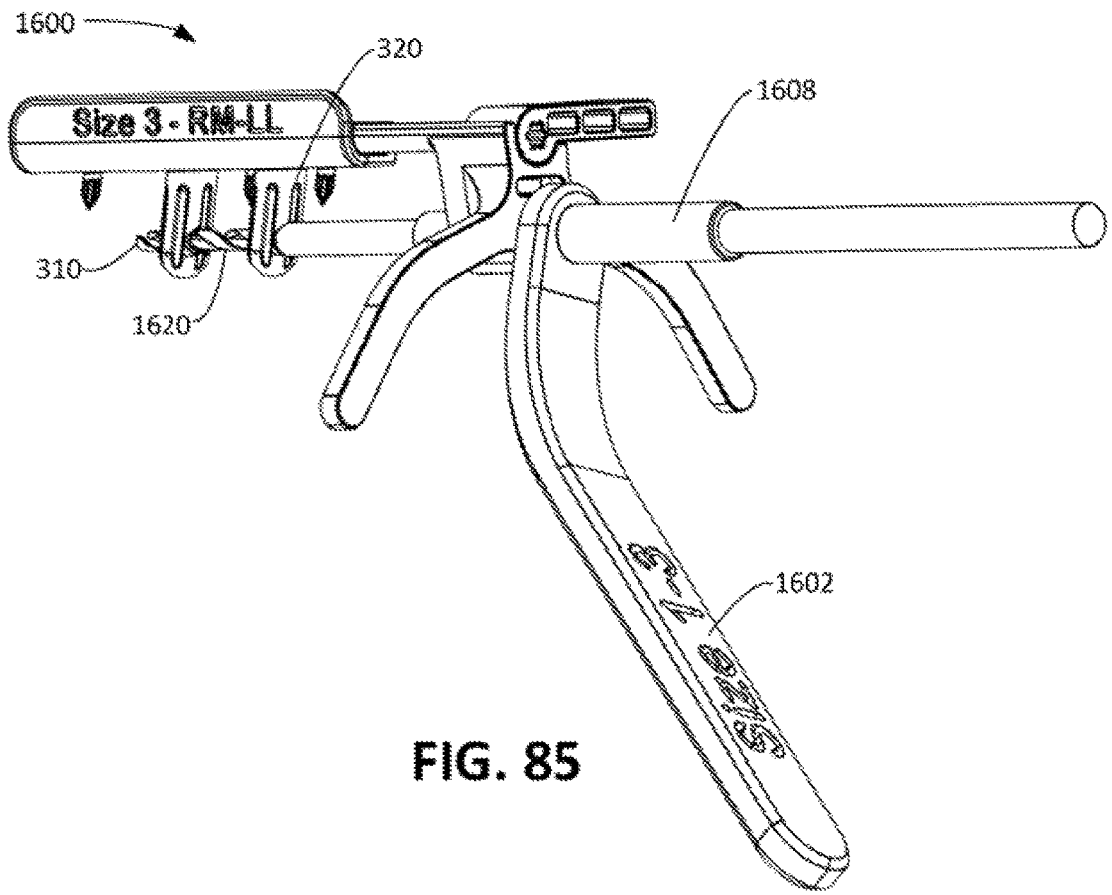
FIG. 85 is another perspective view of the surgical jig of FIG. 83.
Figure 86:
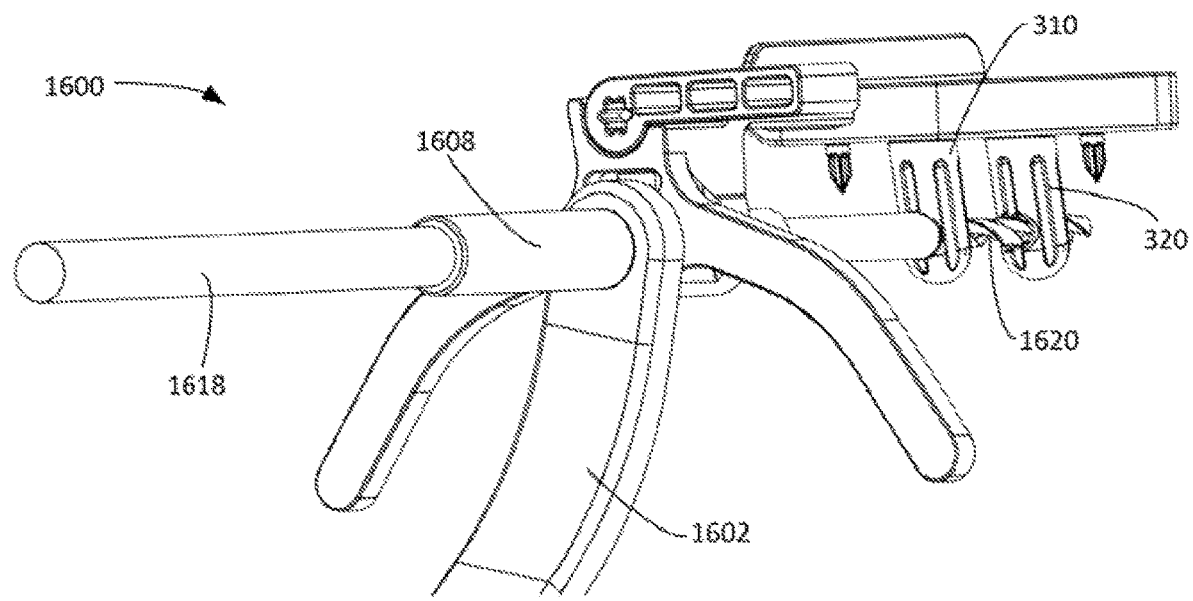
FIG. 86 is another perspective view of the surgical jig of FIG. 83.

As shown, the surgical jig 1600 includes a coupling mechanism 1606 configured to couple to the tray 350. The surgical jig further includes an adjustment bar 1604 configured to adjust an orientation of the tray 350 coupled to the coupling mechanism 1606. The surgical jig further includes a first component 1602 that coupled to a first tube. According to various embodiments, the first tube is integrally formed with the first component 1602. As shown, the first tube receives the a second component comprising a first portion 1608 and a second portion 1610 extending out of an end of the first tube. As shown, the first portion 1608 defines a larger diameter than the first tube such that the first portion 1608 is prevented from passing through the first tube. According to various embodiments, the first portion 1608 and the second portion 1610 are integrally formed. According to other embodiments, the first portion 1608 and the second portion 1610 are separate pieces that are coupled together. For example, the first portion 1608 and the second portion 1610 may include threads that are configured to couple the first portion 1608 and the second portion 1610. According to various embodiments, the first portion 1608 and the second portion 1610 may be solid or may be hollow such that they define an inner opening. According to various embodiments, the second portion 1610 includes a set of threads configured to couple with a set of threads within the opening 312 in the first post 310 (e.g., the third set of threads 313 discussed above). As shown in FIGS. 85 and 86, the second portion 1610 is configured to receive a drill such that an end of the drill extends out of the second portion 1610 and through the first post 310 and the second post 320.

Figure 87:
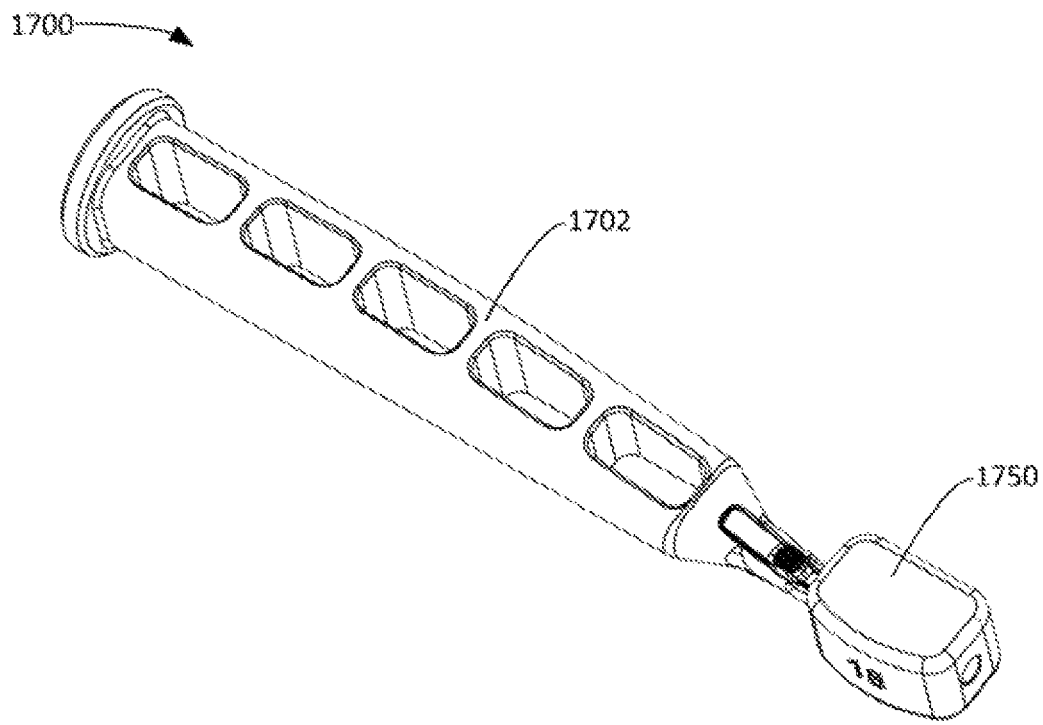
FIG. 87 is a perspective view of a gap gauge, according to an example embodiment.
Figure 88:
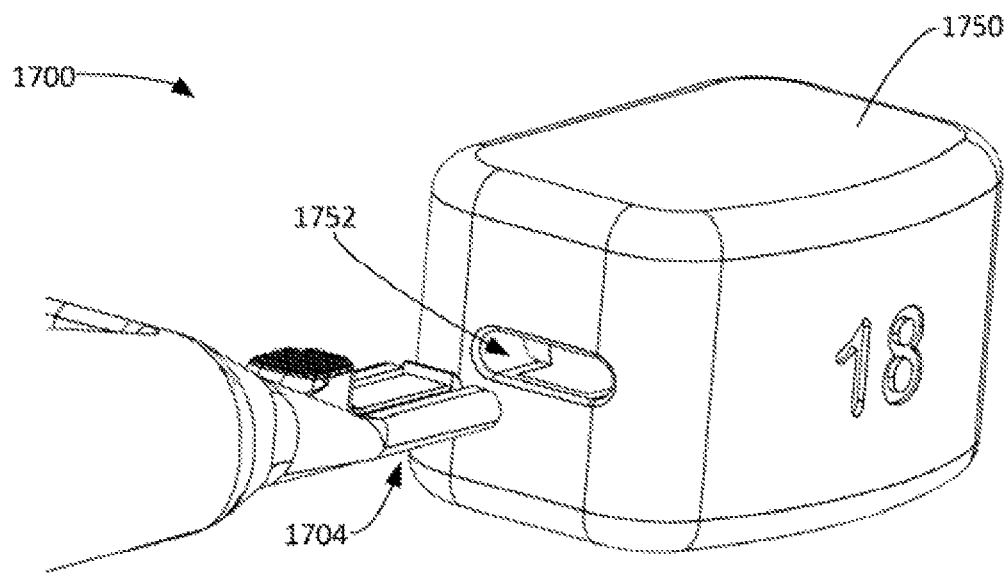
FIG. 88 is a partial perspective view of the gap gauge of FIG. 87.
Figure 89:
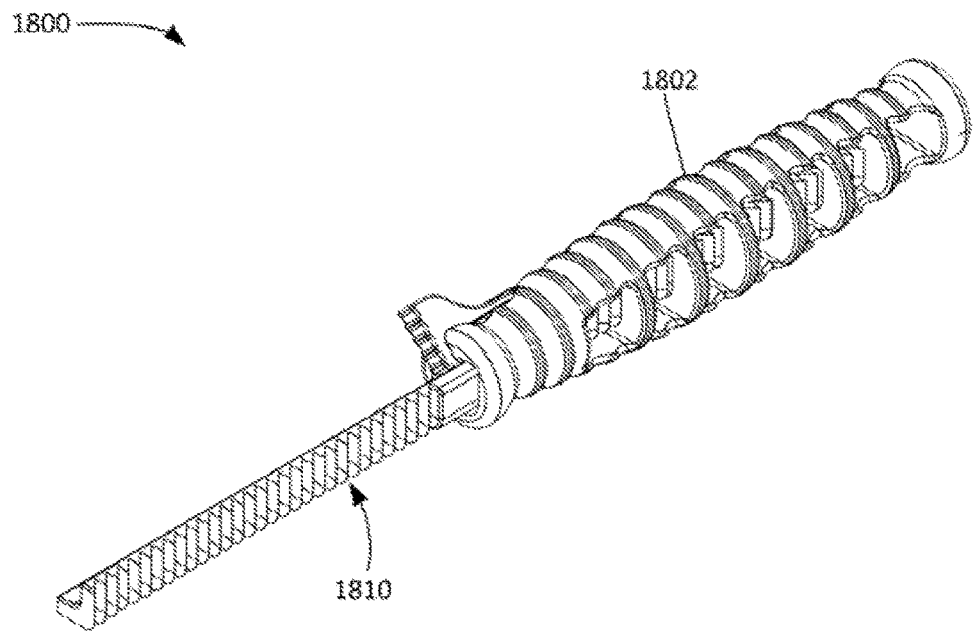
FIG. 89 is a perspective view of a rasp assembly, according to an example embodiment.
Figure 90:
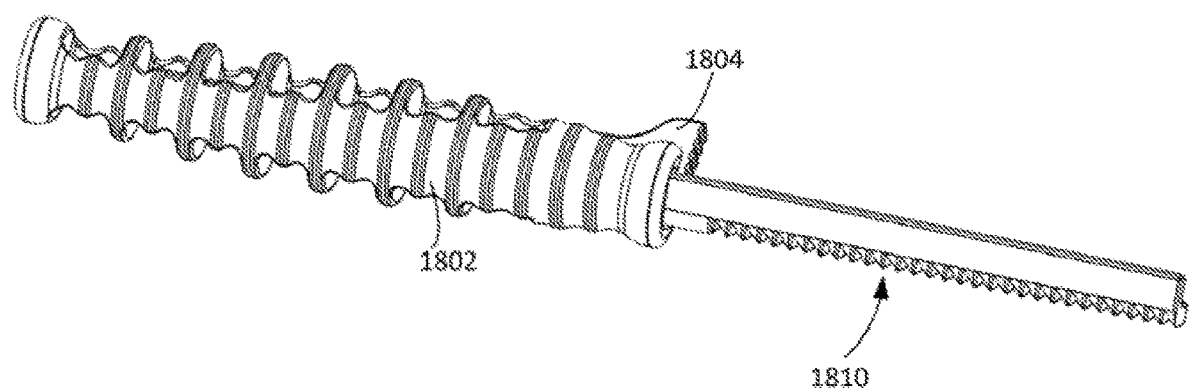
FIG. 90 is another perspective view of the rasp assembly of FIG. 89.
Figure 91:
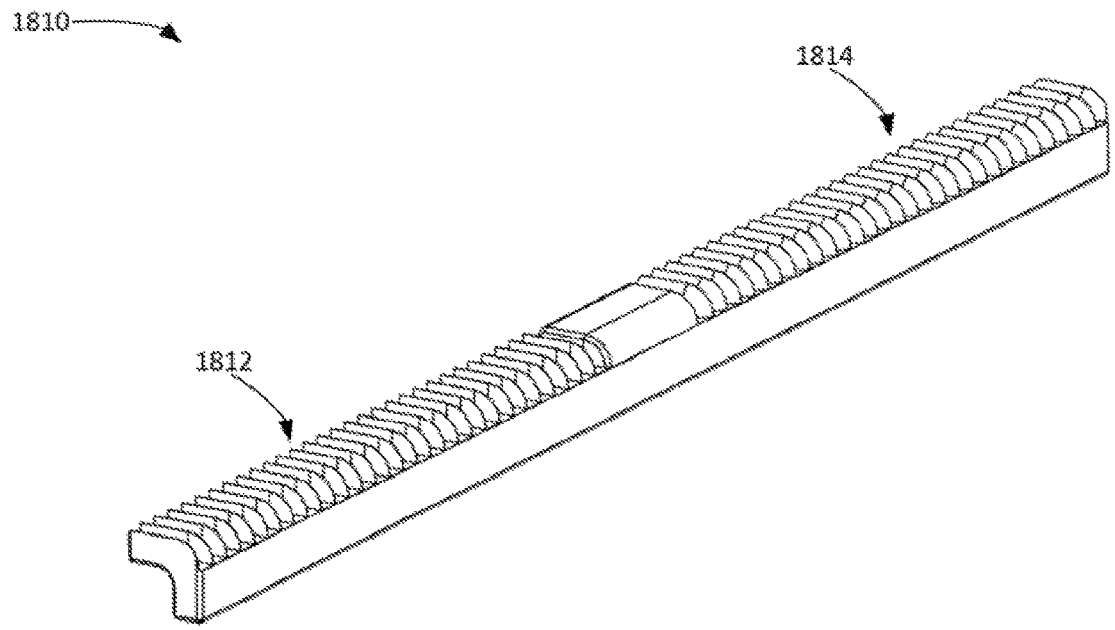
FIG. 91 is a perspective view of a rasp of the rasp assembly of FIG. 89, according to an example embodiment.
Figure 92:
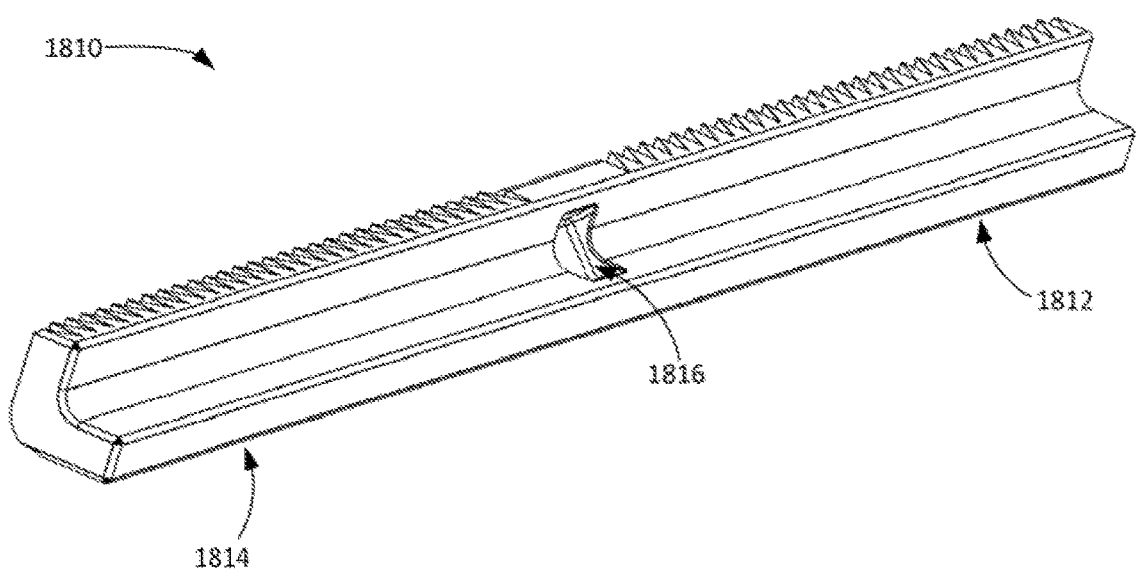
FIG. 92 is a perspective view of a rasp of the rasp assembly of FIG. 89, according to an example embodiment.

Referring now to FIGS. 87 and 88, a gap gauge 1700 is shown according to an example embodiment. The gap gauge 1700 includes a body portion 1702 including a tip 1704 that is configured to be inserted into a slot 1752 in a sizer 1750 such that the body portion 1702 is selectively coupled to the sizer 1750. According to various embodiments, tip 1704 is configured to couple with a number of different size sizers 1750 such that the surgeon may place the sizers 1750 in a desired location.

Referring now to FIGS. 89-92, a rasp assembly 1800 is shown, according to an example embodiment. The rasp assembly 1800 is configured to file down a bone portion as desired. As shown, the rasp assembly 1800 includes a body 1802 and a cutting portion 1810 removably coupled to the body (e.g., by a locking arm 1804 received within an aperture 1816 in the cutting portion). The cutting portion 1810 can be removed from the body portion 1802 and rotated such that both the first set of teeth 1812 and the second set of teeth 1814 may be used as desired.

Figure 94:
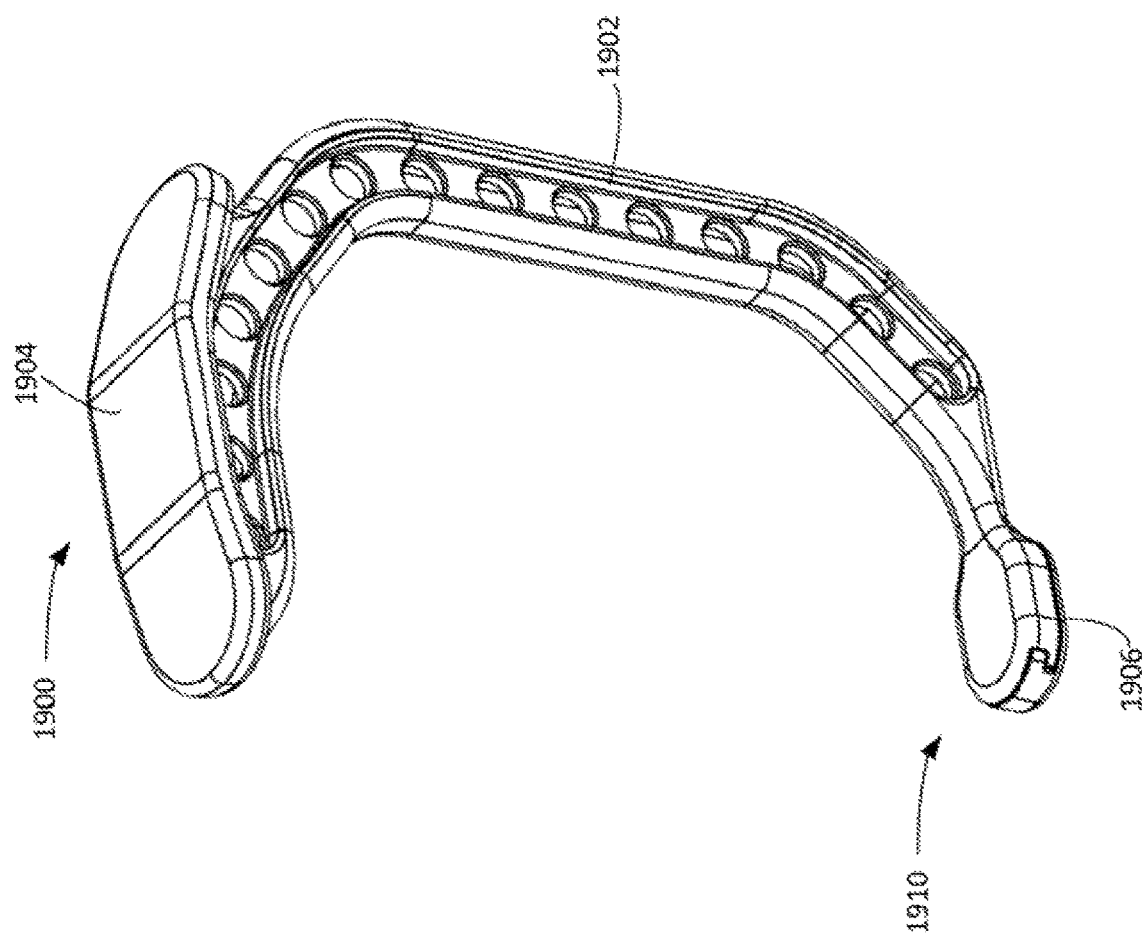
FIG. 94 is another perspective view of the impactor device of FIG. 93.
Figure 93:
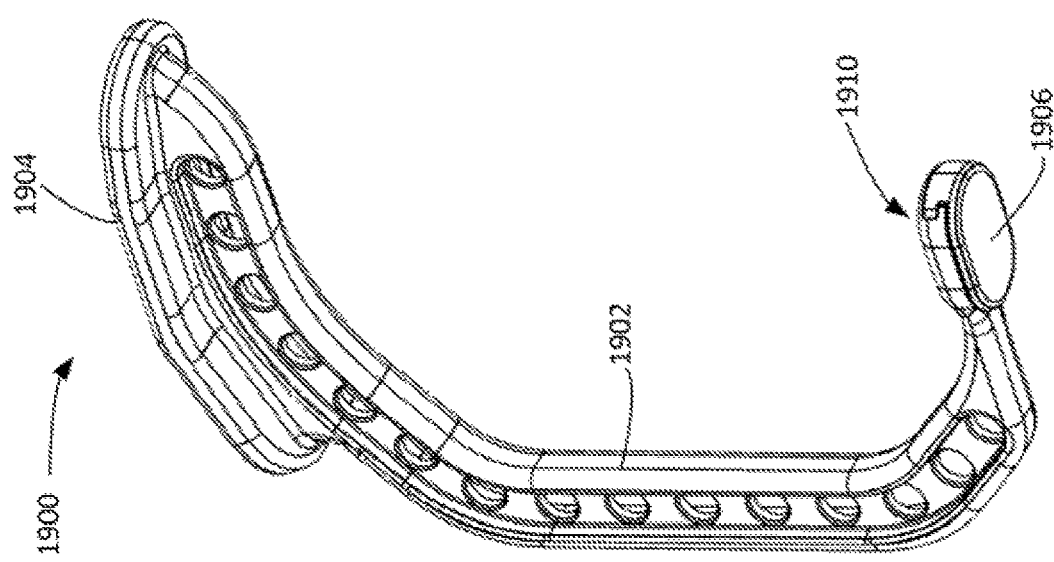
FIG. 93 is a perspective view of an impactor device, according to an example embodiment.

Referring now to FIGS. 93 and 94, an impactor device 1900 is shown, according to an example embodiment. The impactor device 1900 includes a mallet region 1904 configured to receive an impact force and transfer the impact force to an attachment portion 1910 via the body 1902. As shown, the body 1902 is generally "C" shaped to accommodate for a patient's body (e.g., the patient's leg). As shown, the attachment portion 1910 includes an attachment mechanism 1906 configured to couple the impactor device 1900 to a component of a surgical implant.

Figure 95:
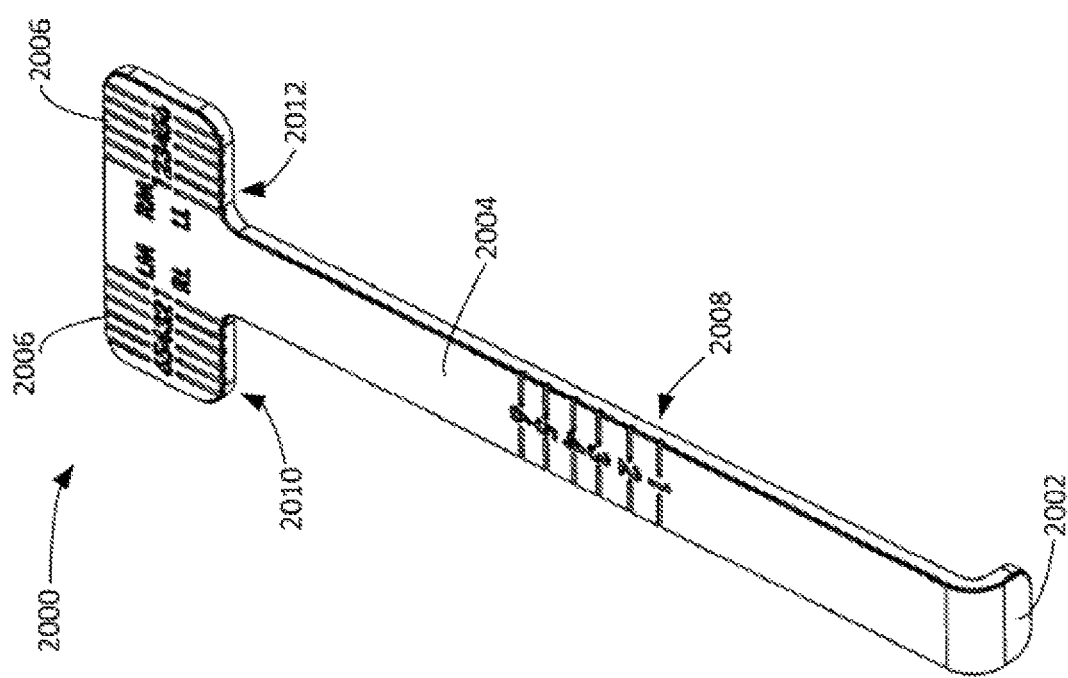
FIG. 95 is a perspective view of a T-ruler, according to an example embodiment.

Referring now to FIG. 95, a T-ruler 2000 is shown, according to an example embodiment. The T-ruler 2000 includes a tab 2002 configured to engage a bone portion. The T-ruler 2000 further includes a body 2004 extending away from the tab 2002 and a plurality of visual indicators 2008 on the body. The T-ruler 2000 includes a first leg 2010 and a second leg 2012, each having a plurality of visual indicators 2006.

Figure 96:
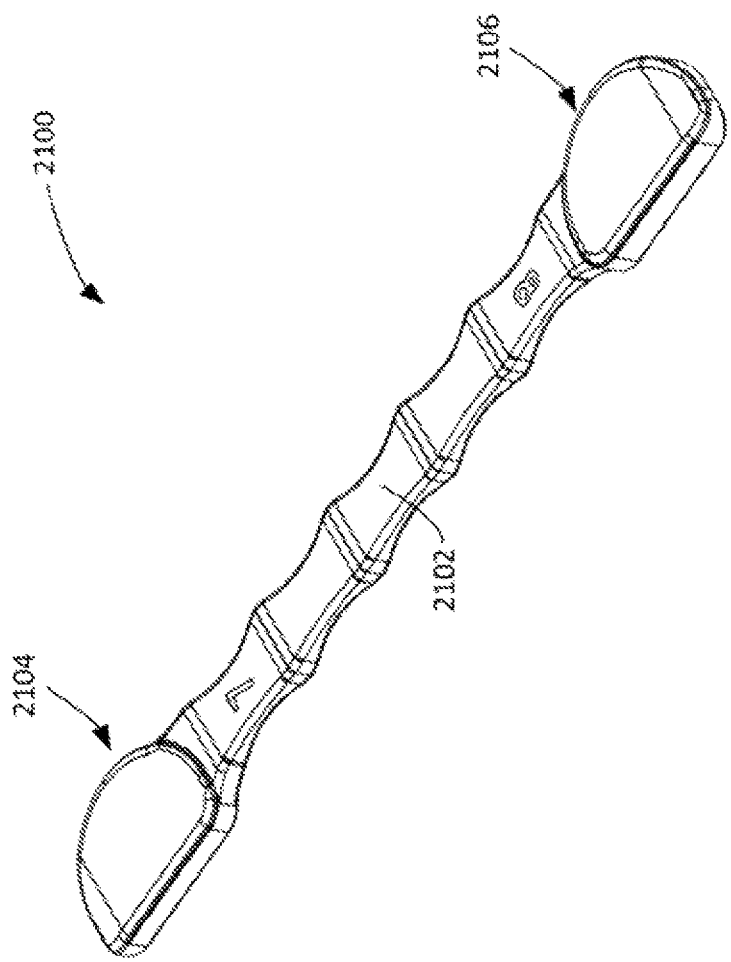
FIG. 96 is a perspective view of a gap stick, according to an example embodiment.

Referring now to FIG. 96, a gap stick 2100 is shown, according to an example embodiment. The gap stick 2100 includes a first gauge 2104 coupled to a second gauge 2106 via a body portion 2102. According to various embodiments, the first gauge 2104 and the second gauge 2106 are a different size, as indicated by visual indicators on the body portion 2102.

Figure 97:
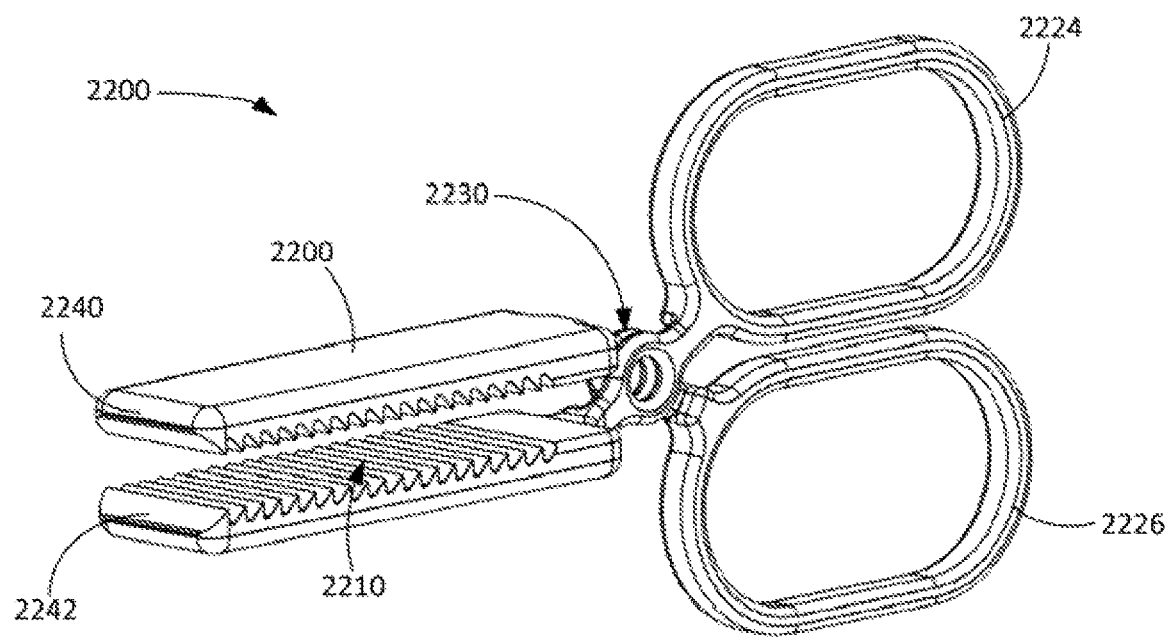
FIG. 97 is a perspective view of a grasping device, according to an example embodiment.
Figure 98:
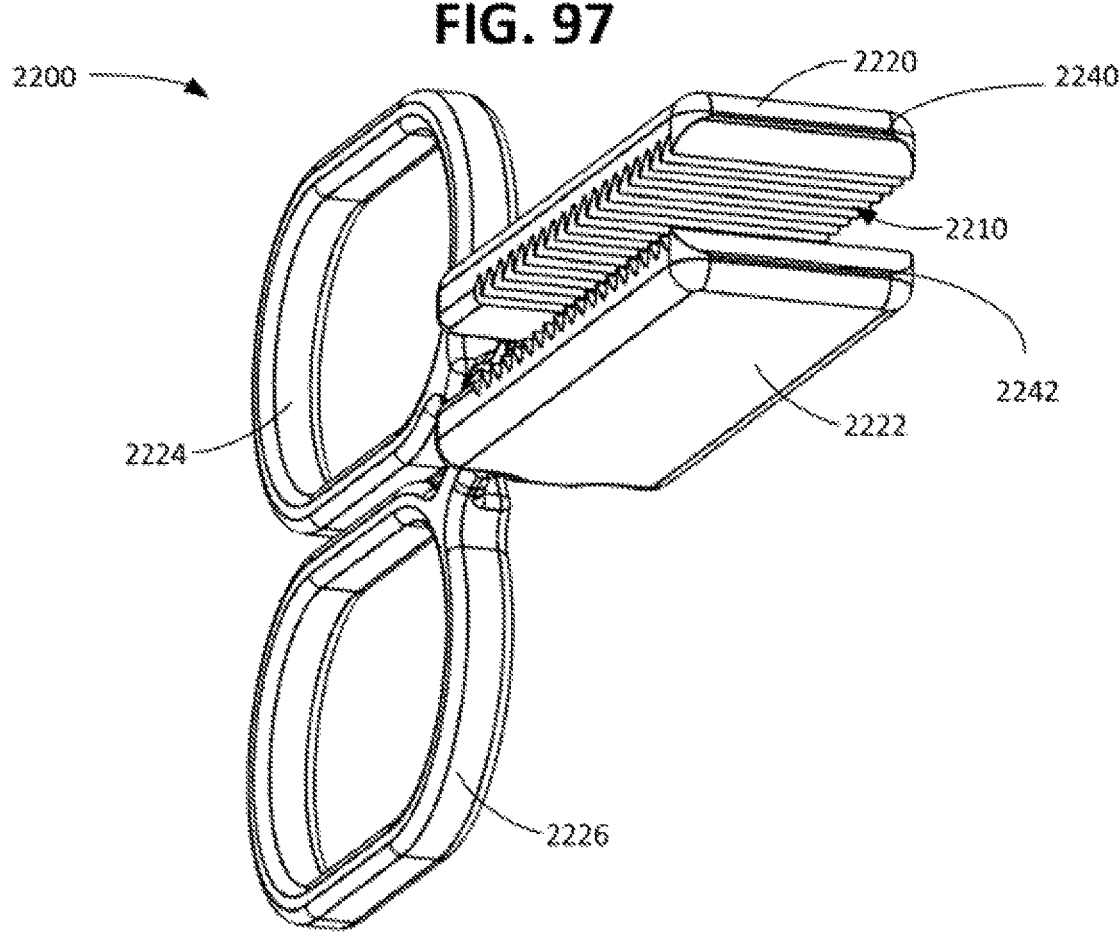
FIG. 98 is another perspective view of the grasping device of FIG. 97.

Referring now to FIGS. 97 and 98, a grasping device 2200 is shown, according to an example embodiment. The grasping device 220 is configured to grab a desired object (e.g., a loose piece of bone) and remove the object from a patient. As shown, the grasping device 2200 includes a first handle portion 2224 rotatable coupled to a second handle portion 2226 via a hinge 2230 and a first arm 2220 rotatable coupled to a second arm 2222 via the hinge 2230. According to various embodiments the hinge 2230 is configures to keep a grasping surface of the first arm 2220 and the second arm 2222 parallel as the first handle 2224 and the second handle 2226 are rotated relative to one another. For example, the hinge 2230 may include a double hinge.

As shown, the first arm 2220 and the second arm 2222 include a plurality of teeth 2210. The plurality of teeth 2210 are angled to reduce the likelihood of the object slipping away from the first handle portion 2224 and the second handle portion 2226 while the grasping device us being used to grab an object. Further, the first arm 2220 defines a first tip 2240 and the second arm 2222 defines a second tip 2242. According to various embodiments, the tips 2240, 2242 may define a flat edge at the end of the respective arm. According to other embodiments, the tips 2240, 2242 may define a rounded edge at the end of the respective arm.

Figure 99:
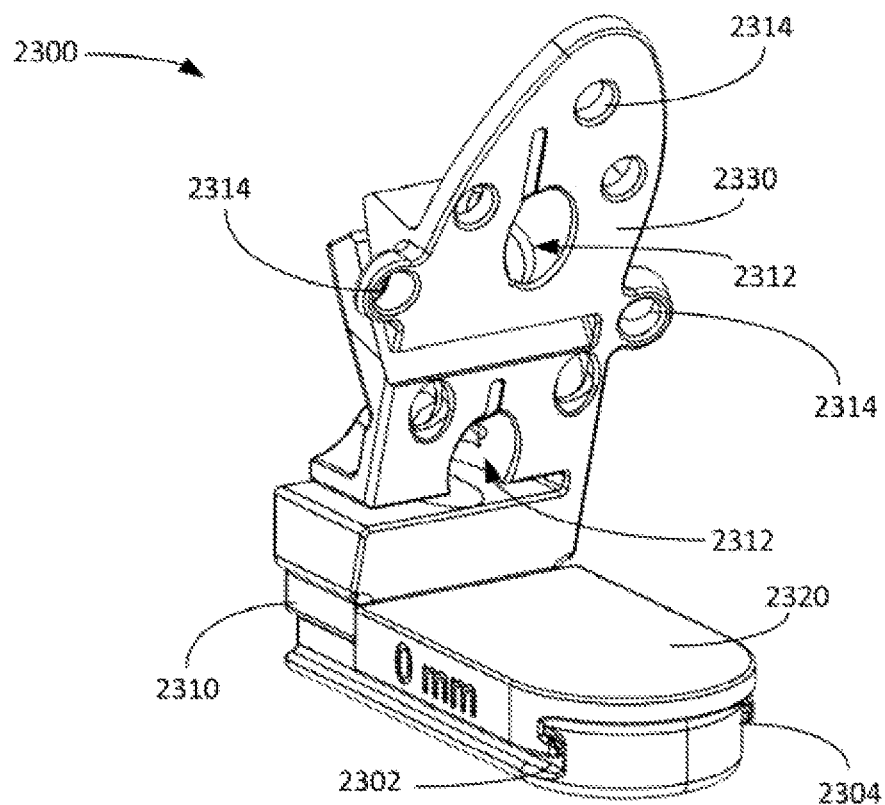
FIG. 99 is a perspective view of another surgical jig, according to an example embodiment.
Figure 100:
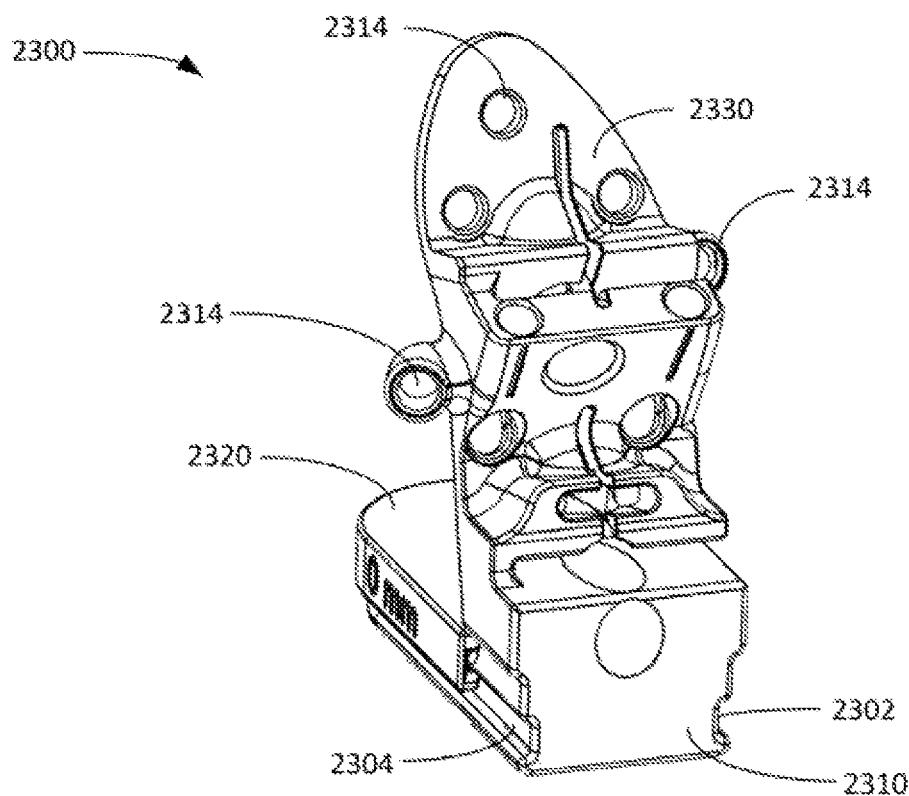
FIG. 100 is another perspective view of the surgical jig of FIG. 99.
Figure 101:
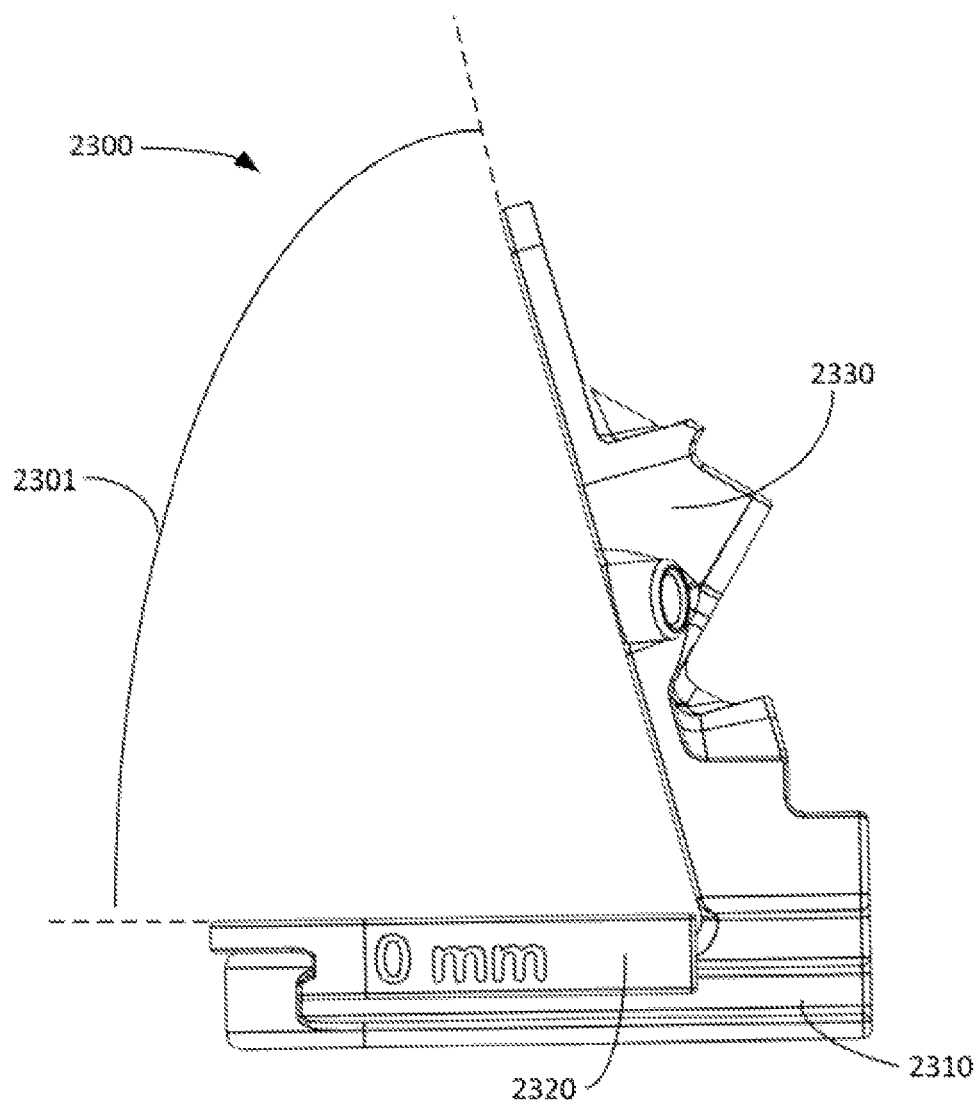
FIG. 101 is a side view of the surgical jig of FIG. 99.

Referring now to FIGS. 99-101, another surgical jig 2300 is shown, according to an example embodiment. The surgical jig 2300 may be configured to prepare a portion of bone for implantation of a component of a surgical implant. For example, the surgical jig 2300 may be configured to prepare a portion of a femur as a part of a UKA. The surgical jig 2300 may be similar to one or more surgical jigs described herein (e.g., the surgical jig 1200).

As shown, the surgical jig 2300 includes a baseplate 2310 extending in a first direction. The baseplate 2310 includes a first guide 2302 on a first lateral side and a second guide 2304 on a second lateral side. As shown, the first guide 2302 and the second guide 2304 are configured to receive a portion of a first spacer 2320 to couple the first spacer 2320 to a lower surface and an upper surface of the baseplate 2310.

According to various embodiments, the baseplate 2310 is configured to be used in conjunction with a number of different sized spacers. According to various embodiments, the surgeon may select a certain size spacer based on the type of surgery (e.g., fixed bearing UKA vs mobile bearing UKA), the size of the patient, and/or the space available in the surgical location.

As shown, the surgical jig 2300 further includes a cutting block 2330 coupled to the baseplate 2310. According to various embodiments, the cutting block 2330 is integrally formed with the baseplate 2310. As best shown in FIG. 101, the cutting block 2330 forms an angle 2301 with the baseplate 2310. According to various embodiments, the angle 2310 is between 90 and 45 degrees. According to various embodiments, the cutting block 2330 includes a plurality of screw apertures 2314 and a plurality of drill apertures 2312. According to various embodiments the screw apertures 2314 are configured to receive a screw and the drill apertures 2312 are configured to receive a drill bit.

Figure 102:
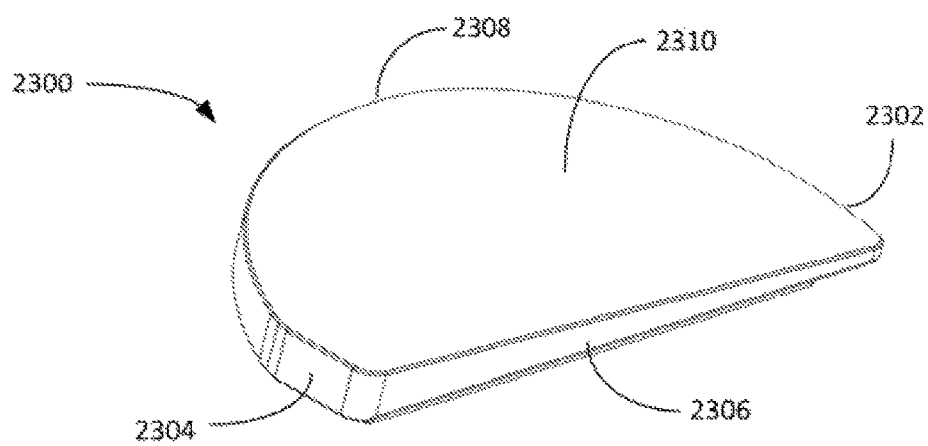
FIG. 102 is a perspective view of a fixed articular component, according to an example embodiment.
Figure 103:
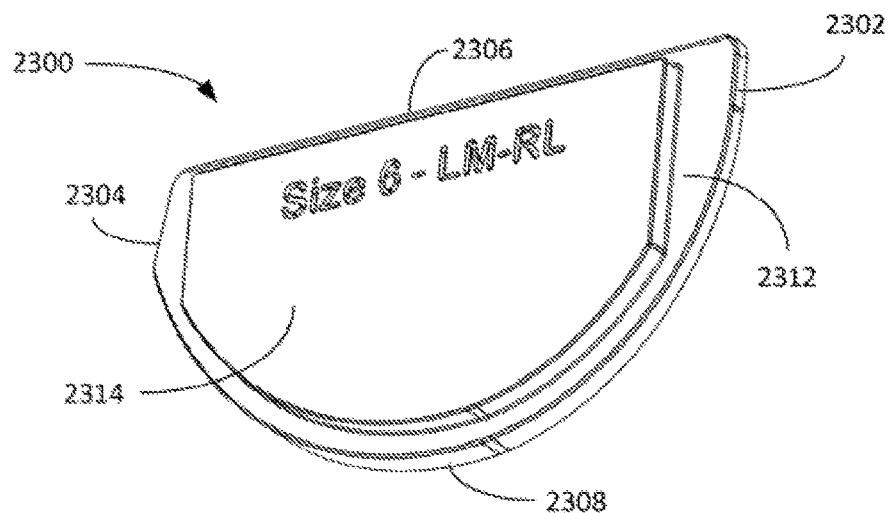
FIG. 103 is another perspective view of the fixed articular component of FIG. 102, according to an example embodiment.
Figure 104:
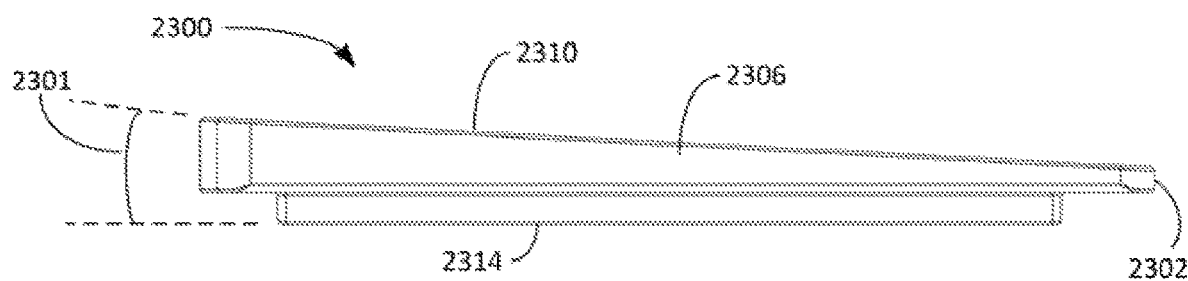
FIG. 104 is a side view of the fixed articular component of FIG. 102, according to an example embodiment.

Referring now to FIGS. 102-104, a fixed articular component 2300 is shown, according to an example embodiment. The fixed articular component 2300 may share one or more characteristics with any of the articular components described herein (e.g., the fixed articular component 400). For example, the fixed articular component 2300 may be configured to couple with a baseplate or a tray (e.g., the tray 350). Further, the fixed articular component 2300 may be configured to interface with a femoral component (e.g., the femoral component 500) to enable relative movement between the femoral component and the fixed articular component 2300 and/or relative movement between the femoral component and the tray/baseplate.

As shown, the fixed articular component 2300 includes a first end 2302, a second end 2304 opposite the first end, a first edge 2306, and a second edge 2308 opposite the first edge 2306. As shown, the first edge 2306 is generally linear while the second edge 2308 is generally curved. The fixed articular component further includes an upper surface 1210 opposite a lower surface 2312. As shown, the fixed articular component 2300 includes a projection 2314 extending from the lower surface 2312. According to various embodiments, the projection 2314 is configured to be received within a cavity of the tray (e.g., the cavity 366) to couple the fixed articular component 2300 to the tray.

As best shown in FIG. 104, the upper surface 2310 is generally flat. Further, the upper surface 2310 is angled away from the first end 2302 such that the upper surface 2310 and a bottom surface of the projection 2314 form an angle 2301. According to various embodiments, the angle 2301 is between 0 and 30 degrees.

According to various embodiments, the fixed articular component 2300 is made of polyethylene. According to other embodiments, the fixed articular component 2300 may be made of ceramic, polished ceramic, polished ceramic coated metal, or polyethylene or any combination thereof.

Figure 105:
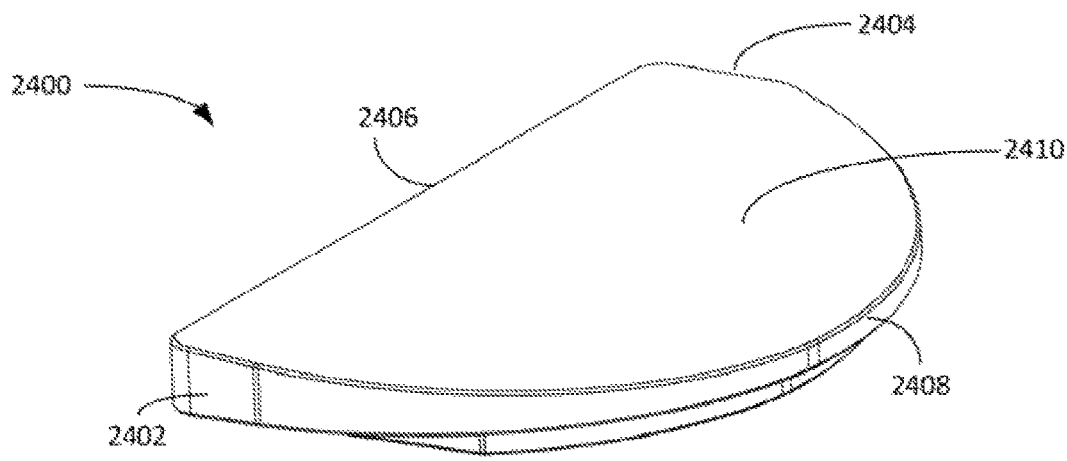
FIG. 105 is a perspective view of a fixed articular component, according to an example embodiment.
Figure 106:
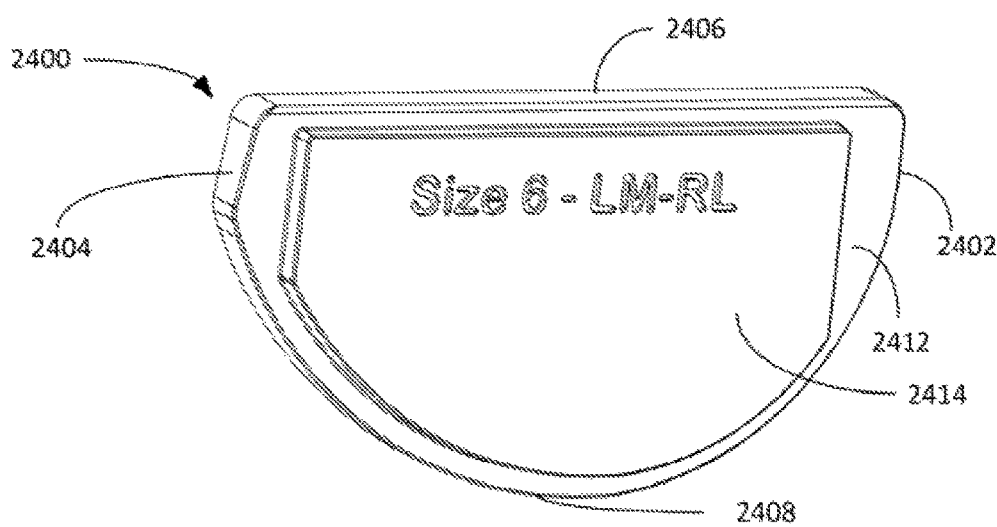
FIG. 106 is another perspective view of the fixed articular component of FIG. 105, according to an example embodiment.
Figure 107:
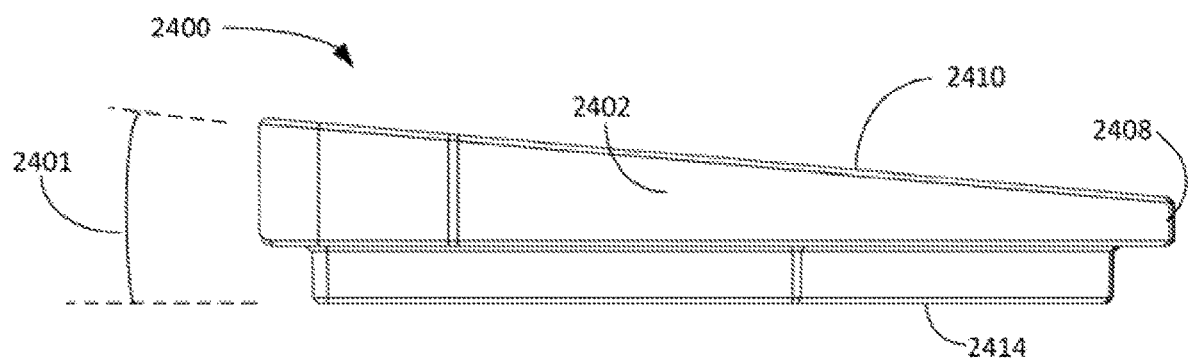
FIG. 107 is a front view of the fixed articular component of FIG. 105, according to an example embodiment.

Referring now to FIGS. 105-107, a fixed articular component 2400 is shown, according to an example embodiment. The fixed articular component 2400 may share one or more characteristics with any of the articular components described herein (e.g., the fixed articular component 400). For example, the fixed articular component 2400 may be configured to couple with a baseplate or a tray (e.g., the tray 350). Further, the fixed articular component 2400 may be configured to interface with a femoral component (e.g., the femoral component 500) to enable relative movement between the femoral component and the fixed articular component 2400 and/or relative movement between the femoral component and the tray/baseplate.

As shown, the fixed articular component 2400 includes a first end 2402, a second end 2404 opposite the first end, a first edge 2406, and a second edge 2408 opposite the first edge 2406. As shown, the first edge 2406 is generally linear while the second edge 2408 is generally curved. The fixed articular component further includes an upper surface 1210 opposite a lower surface 2412. As shown, the fixed articular component 2400 includes a projection 2414 extending from the lower surface 2412. According to various embodiments, the projection 2414 is configured to be received within a cavity of the tray (e.g., the cavity 366) to couple the fixed articular component 2400 to the tray.

As best shown in FIG. 107, the upper surface 2410 is generally flat. Further, the upper surface 2410 is angled away from the second edge 2408 such that the upper surface 2410 and a bottom surface of the projection 2414 form an angle 2401. According to various embodiments, the angle 2401 is between 0 and 30 degrees.

According to various embodiments, the fixed articular component 2400 is made of polyethylene. According to other embodiments, the fixed articular component 2400 may be made of ceramic, polished ceramic, polished ceramic coated metal, or polyethylene or any combination thereof.

Figure 108:
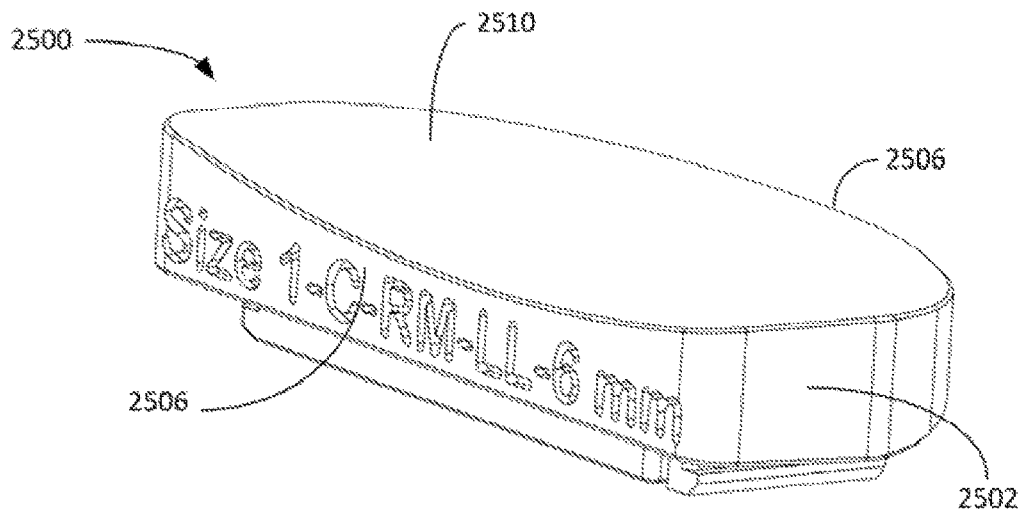
FIG. 108 is a perspective view of a fixed articular component, according to an example embodiment.
Figure 109:
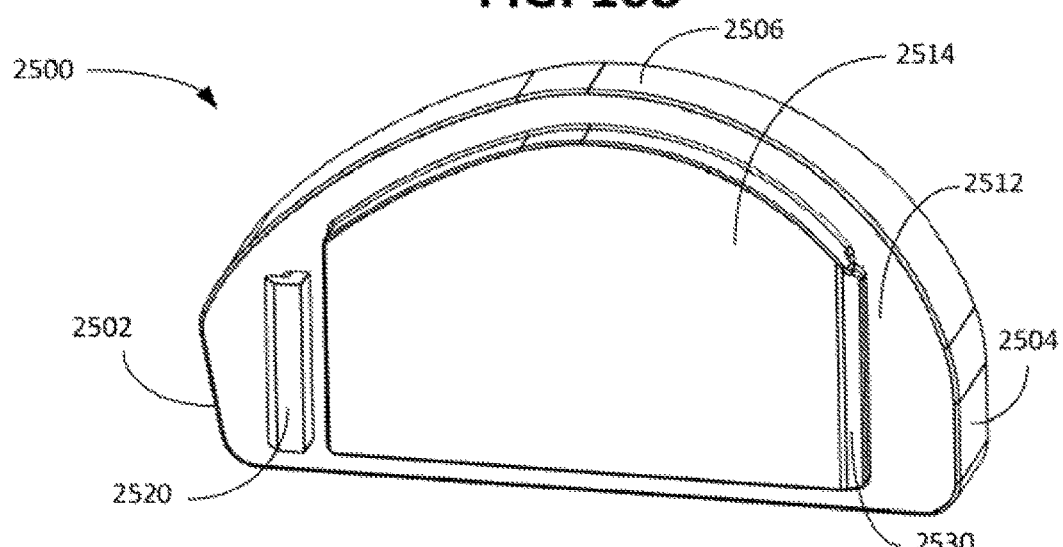
FIG. 109 is another perspective view of the fixed articular component of FIG. 108, according to an example embodiment.
Figure 110:
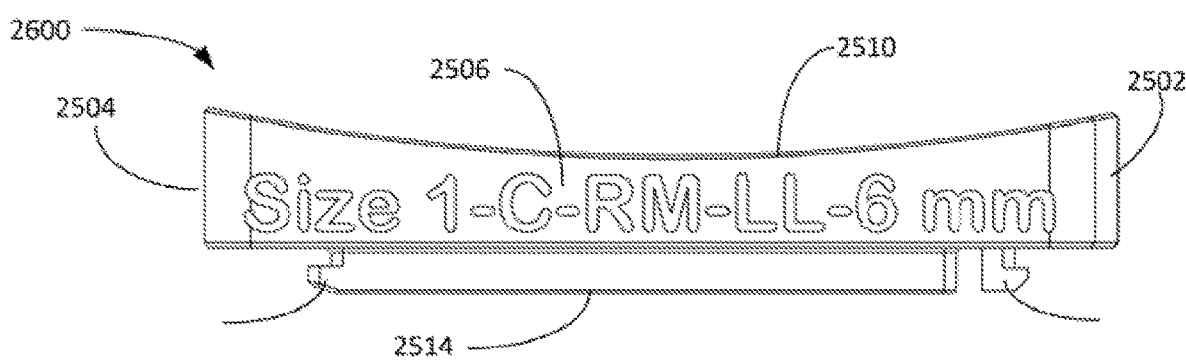
FIG. 110 is a side view of the fixed articular component of FIG. 108, according to an example embodiment.

Referring now to FIGS. 108-110, a fixed articular component 2500 is shown, according to an example embodiment. The fixed articular component 2500 may share one or more characteristics with any of the articular components described herein (e.g., the fixed articular component 400). For example, the fixed articular component 2500 may be configured to couple with a baseplate or a tray (e.g., the tray 350). Further, the fixed articular component 2500 may be configured to interface with a femoral component (e.g., the femoral component 500) to enable relative movement between the femoral component and the fixed articular component 2500 and/or relative movement between the femoral component and the tray/baseplate.

As shown, the fixed articular component 2500 includes a first end 2502, a second end 2504 opposite the first end, a first edge 2506, and a second edge 2508 opposite the first edge 2506. As shown, the first edge 2506 is generally linear while the second edge 2508 is generally curved. The fixed articular component further includes an upper surface 1210 opposite a lower surface 2512. As shown, the fixed articular component 2500 includes a projection 2514 extending from the lower surface 2512. According to various embodiments, the projection 2514 is configured to be received within a cavity of the tray (e.g., the cavity 366) to couple the fixed articular component 2500 to the tray.

As shown, the fixed articular component 2500 includes a first tab 2520 and a second tab 2530 extending away from the lower surface 2512. According to various embodiments, a portion of the first tab 2520 is configured to be received within a slot (e.g., the slot 362) in the tray to securely couple the fixed articular component 2500 to the tray. According to various embodiments, the second tab 2530 may interface with an edge of the cavity (e.g., the cavity 366) such that the second tab 2530 is compressed against the edge of the cavity, which may further secure the fixed articular component to the tray.

As best shown in FIG. 110, the upper surface 2510 is concave. For example, a low point of the upper surface 2510 is located between the first end 2502 and the second end 2504.

According to various embodiments, the fixed articular component 2500 is made of polyethylene. According to other embodiments, the fixed articular component 2500 may be made of ceramic, polished ceramic, polished ceramic coated metal, or polyethylene or any combination thereof.

Figure 111:
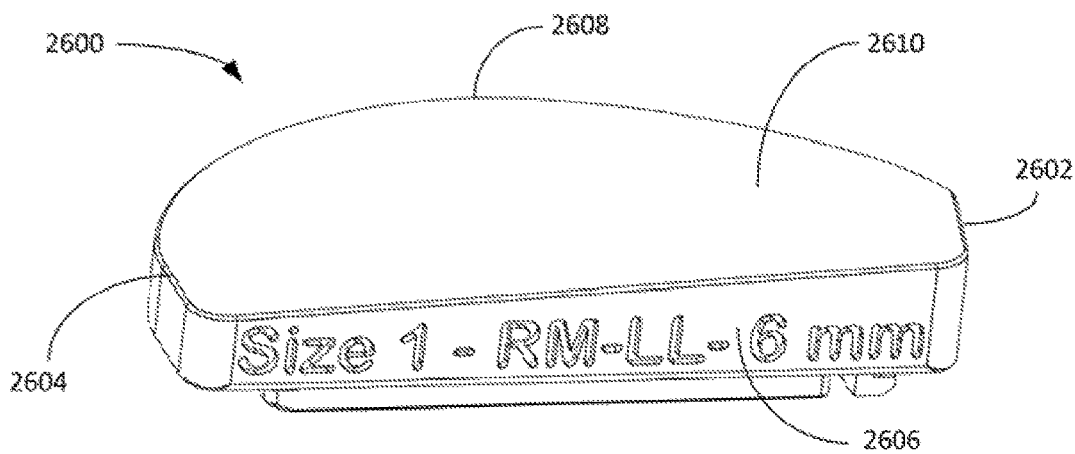
FIG. 111 is a perspective view of a fixed articular component, according to an example embodiment.
Figure 112:
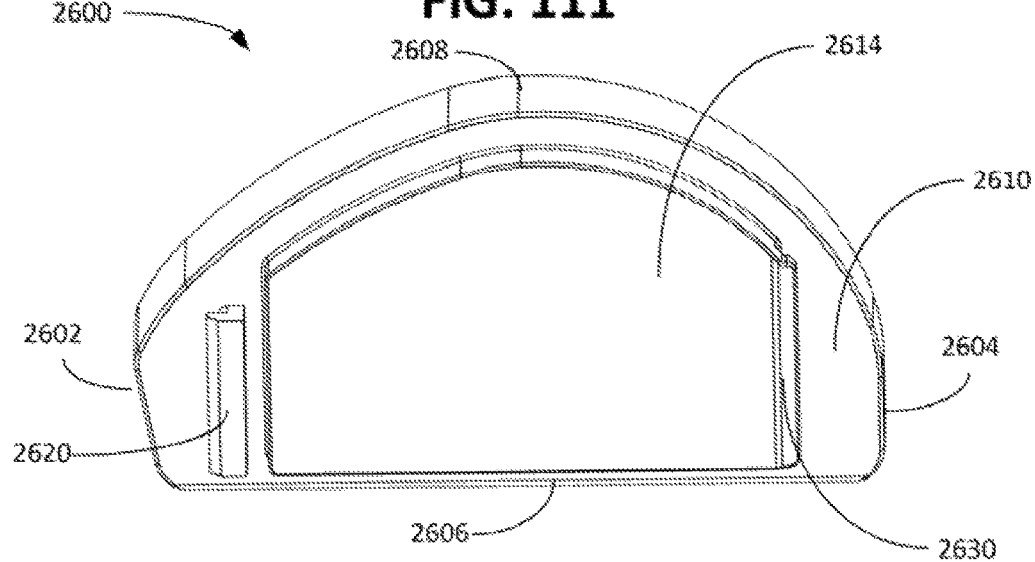
FIG. 112 is another perspective view of the fixed articular component of FIG. 111, according to an example embodiment.
Figure 113:
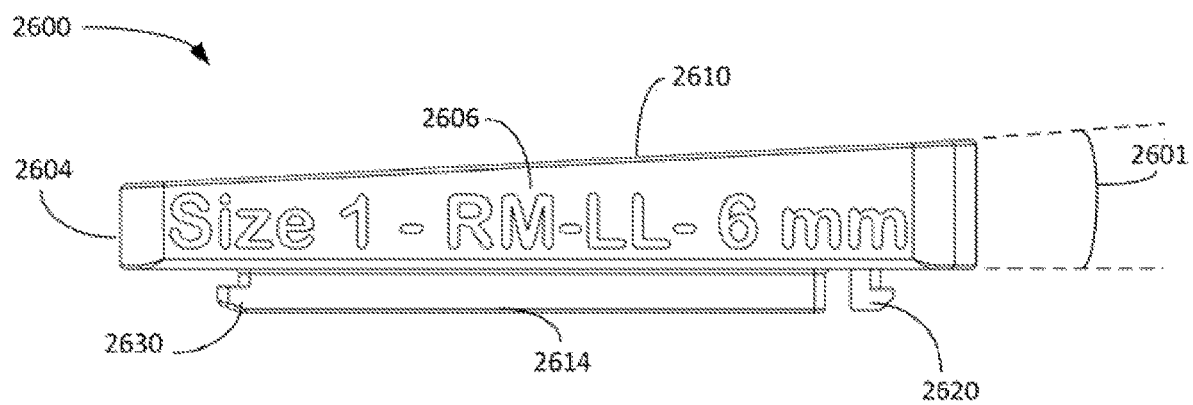
FIG. 113 is a side view of the fixed articular component of FIG. 111, according to an example embodiment.

Referring now to FIGS. 111-113, a fixed articular component 2600 is shown, according to an example embodiment. The fixed articular component 2600 may share one or more characteristics with any of the articular components described herein (e.g., the fixed articular component 400). For example, the fixed articular component 2600 may be configured to couple with a baseplate or a tray (e.g., the tray 350). Further, the fixed articular component 2600 may be configured to interface with a femoral component (e.g., the femoral component 500) to enable relative movement between the femoral component and the fixed articular component 2600 and/or relative movement between the femoral component and the tray/baseplate.

As shown, the fixed articular component 2600 includes a first end 2602, a second end 2604 opposite the first end, a first edge 2606, and a second edge 2608 opposite the first edge 2606. As shown, the first edge 2606 is generally linear while the second edge 2608 is generally curved. The fixed articular component further includes an upper surface 1210 opposite a lower surface 2612. As shown, the fixed articular component 2600 includes a projection 2614 extending from the lower surface 2612. According to various embodiments, the projection 2614 is configured to be received within a cavity of the tray (e.g., the cavity 366) to couple the fixed articular component 2600 to the tray.

As shown, the fixed articular component 2600 includes a first tab 2620 and a second tab 2630 extending away from the lower surface 2612. According to various embodiments, a portion of the first tab 2620 is configured to be received within a slot (e.g., the slot 362) in the tray to securely couple the fixed articular component 2600 to the tray. According to various embodiments, the second tab 2630 may interface with an edge of the cavity (e.g., the cavity 366) such that the second tab 2630 is compressed against the edge of the cavity, which may further secure the fixed articular component to the tray.

As best shown in FIG. 113, the upper surface 2610 is generally flat. Further, the upper surface 2610 is angled away from the second end 2604 such that the upper surface 2610 and a bottom surface of the projection 2614 form an angle 2601. According to various embodiments, the angle 2601 is between 0 and 30 degrees.

According to various embodiments, the fixed articular component 2600 is made of polyethylene. According to other embodiments, the fixed articular component 2600 may be made of ceramic, polished ceramic, polished ceramic coated metal, or polyethylene or any combination thereof.

Figure 114:
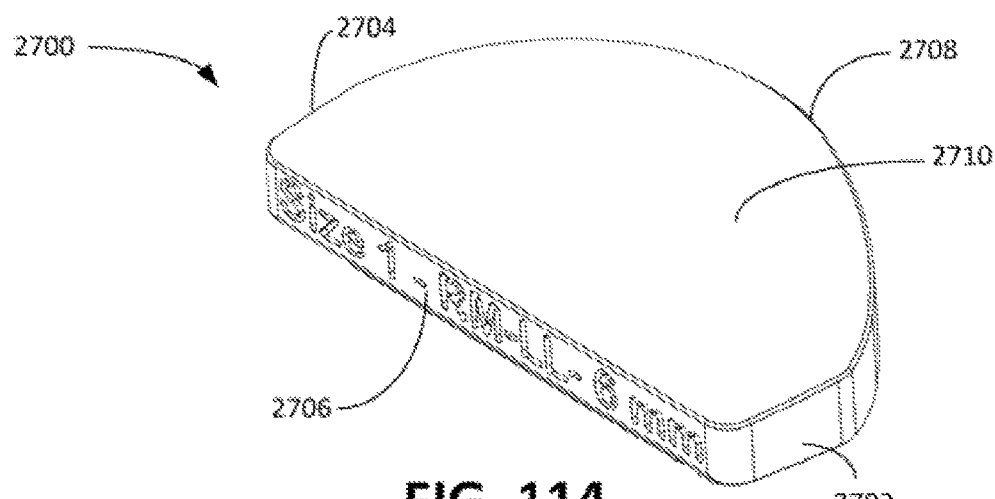
FIG. 114 is a perspective view of a fixed articular component, according to an example embodiment.
Figure 115:
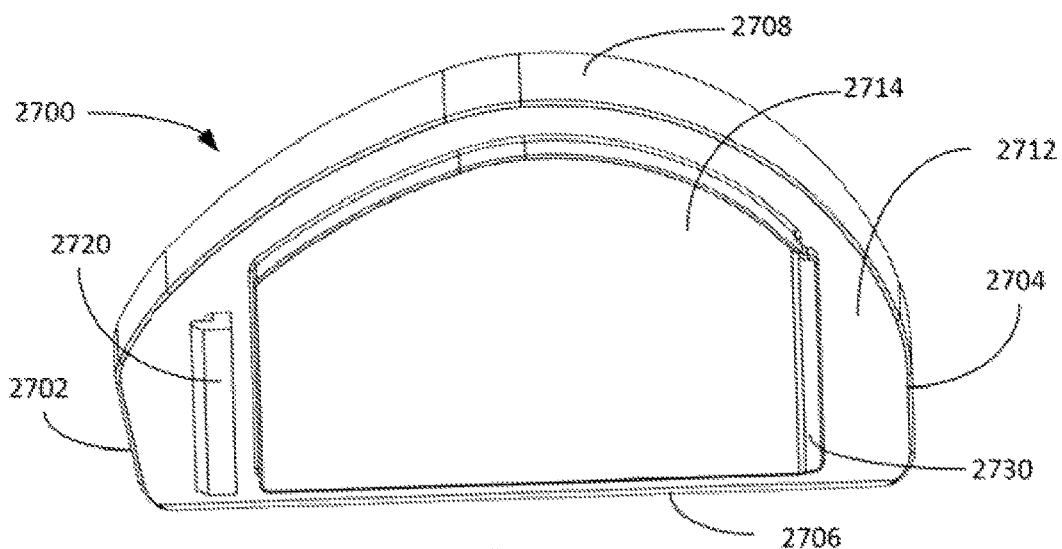
FIG. 115 is another perspective view of the fixed articular component of FIG. 114, according to an example embodiment.
Figure 116:
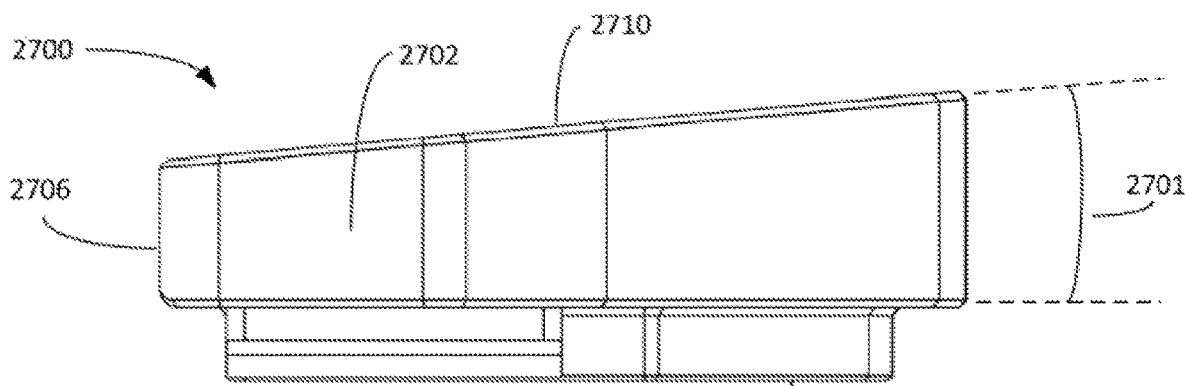
FIG. 116 is a front view of the fixed articular component of FIG. 114, according to an example embodiment.

Referring now to FIGS. 114-116, a fixed articular component 2700 is shown, according to an example embodiment. The fixed articular component 2700 may share one or more characteristics with any of the articular components described herein (e.g., the fixed articular component 400). For example, the fixed articular component 2700 may be configured to couple with a baseplate or a tray (e.g., the tray 350). Further, the fixed articular component 2700 may be configured to interface with a femoral component (e.g., the femoral component 500) to enable relative movement between the femoral component and the fixed articular component 2700 and/or relative movement between the femoral component and the tray/baseplate.

As shown, the fixed articular component 2700 includes a first end 2702, a second end 2704 opposite the first end, a first edge 2706, and a second edge 2708 opposite the first edge 2706. As shown, the first edge 2706 is generally linear while the second edge 2708 is generally curved. The fixed articular component further includes an upper surface 1210 opposite a lower surface 2712. As shown, the fixed articular component 2700 includes a projection 2714 extending from the lower surface 2712. According to various embodiments, the projection 2714 is configured to be received within a cavity of the tray (e.g., the cavity 366) to couple the fixed articular component 2700 to the tray.

As shown, the fixed articular component 2700 includes a first tab 2720 and a second tab 2730 extending away from the lower surface 2712. According to various embodiments, a portion of the first tab 2720 is configured to be received within a slot (e.g., the slot 362) in the tray to securely couple the fixed articular component 2700 to the tray. According to various embodiments, the second tab 2730 may interface with an edge of the cavity (e.g., the cavity 366) such that the second tab 2730 is compressed against the edge of the cavity, which may further secure the fixed articular component to the tray.

As best shown in FIG. 116, the upper surface 2710 is generally flat. Further, the upper surface 2710 is angled away from the first edge 2706 such that the upper surface 2710 and a bottom surface of the projection 2714 form an angle 2701. According to various embodiments, the angle 2701 is between 0 and 30 degrees.

According to various embodiments, the fixed articular component 2700 is made of polyethylene. According to other embodiments, the fixed articular component 2700 may be made of ceramic, polished ceramic, polished ceramic coated metal, or polyethylene or any combination thereof.

Figure 117:
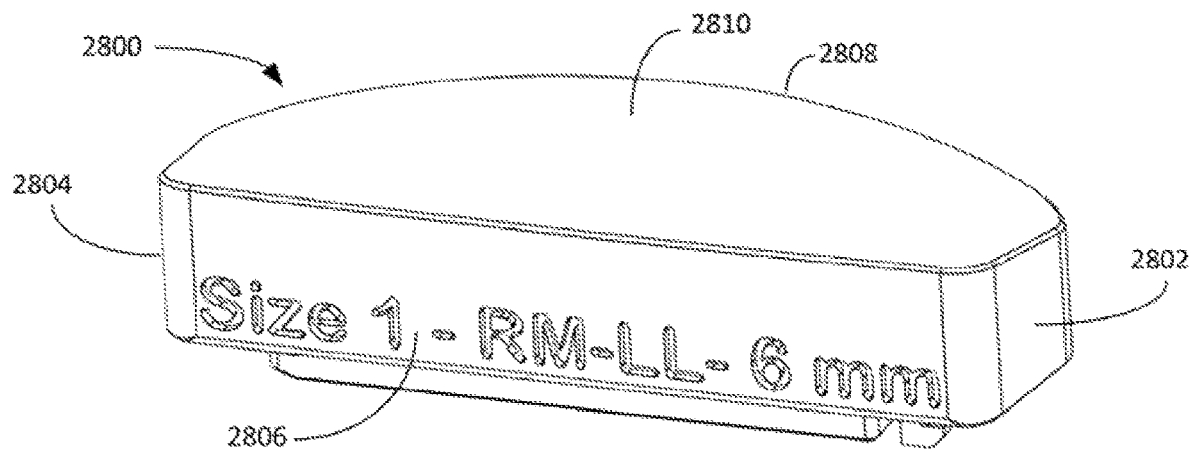
FIG. 117 is a perspective view of a fixed articular component, according to an example embodiment.
Figure 118:
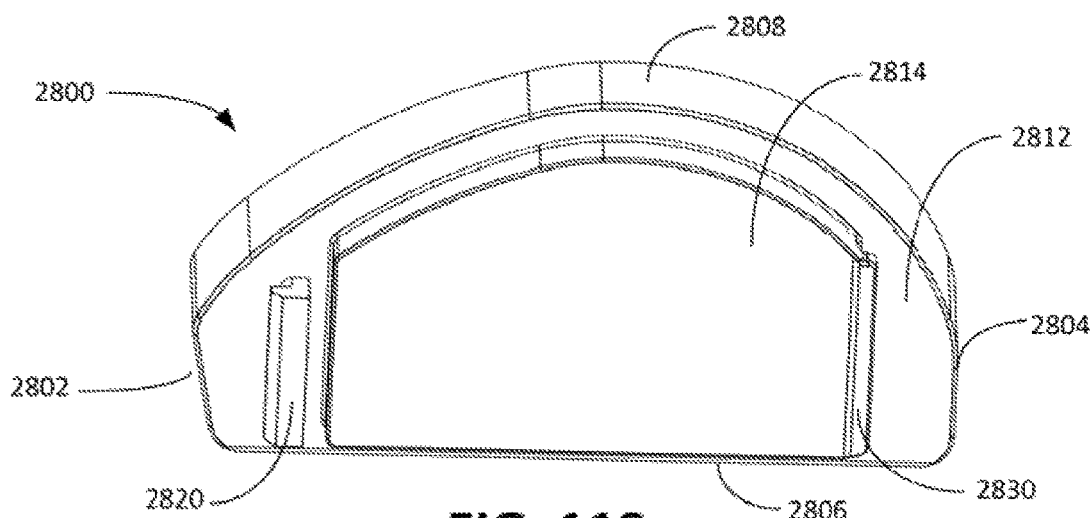
FIG. 118 is another perspective view of the fixed articular component of FIG. 117, according to an example embodiment.
Figure 119:
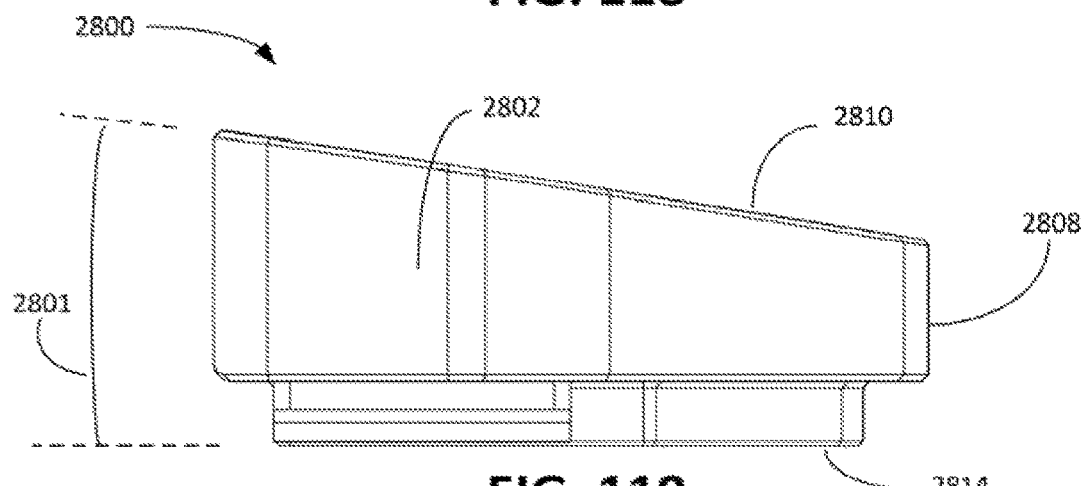

Referring now to FIGS. 117-119, a fixed articular component 2800 is shown, according to an example embodiment. The fixed articular component 2800 may share one or more characteristics with any of the articular components described herein (e.g., the fixed articular component 400). For example, the fixed articular component 2800 may be configured to couple with a baseplate or a tray (e.g., the tray 350). Further, the fixed articular component 2800 may be configured to interface with a femoral component (e.g., the femoral component 500) to enable relative movement between the femoral component and the fixed articular component 2800 and/or relative movement between the femoral component and the tray/baseplate.

As shown, the fixed articular component 2800 includes a first end 2802, a second end 2804 opposite the first end, a first edge 2806, and a second edge 2808 opposite the first edge 2806. As shown, the first edge 2806 is generally linear while the second edge 2808 is generally curved. The fixed articular component further includes an upper surface 1210 opposite a lower surface 2812. As shown, the fixed articular component 2800 includes a projection 2814 extending from the lower surface 2812. According to various embodiments, the projection 2814 is configured to be received within a cavity of the tray (e.g., the cavity 366) to couple the fixed articular component 2800 to the tray.

As shown, the fixed articular component 2800 includes a first tab 2820 and a second tab 2830 extending away from the lower surface 2812. According to various embodiments, a portion of the first tab 2820 is configured to be received within a slot (e.g., the slot 362) in the tray to securely couple the fixed articular component 2800 to the tray. According to various embodiments, the second tab 2830 may interface with an edge of the cavity (e.g., the cavity 366) such that the second tab 2830 is compressed against the edge of the cavity, which may further secure the fixed articular component to the tray.

As best shown in FIG. 119, the upper surface 2810 is generally flat. Further, the upper surface 2810 is angled away from the second edge 2808 such that the upper surface 2810 and a bottom surface of the projection 2814 form an angle 2801. According to various embodiments, the angle 2801 is between 0 and 30 degrees.

According to various embodiments, the fixed articular component 2800 is made of polyethylene. According to other embodiments, the fixed articular component 2800 may be made of ceramic, polished ceramic, polished ceramic coated metal, or polyethylene or any combination thereof.

Figure 120:
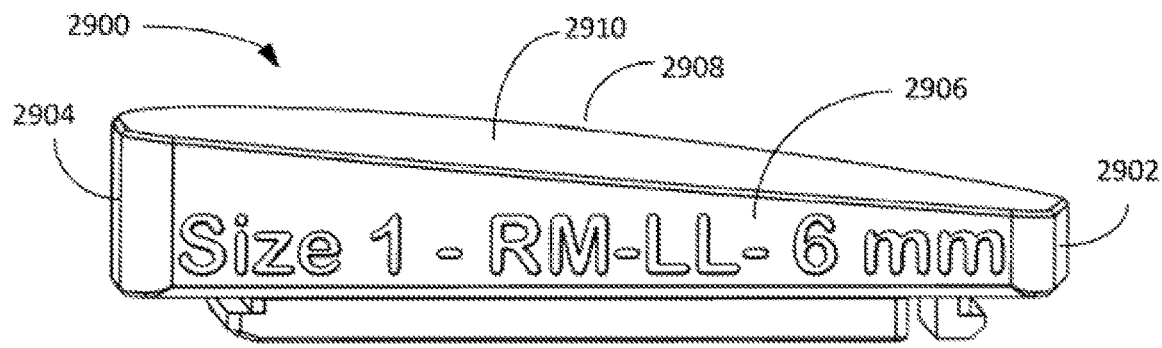
Figure 121:
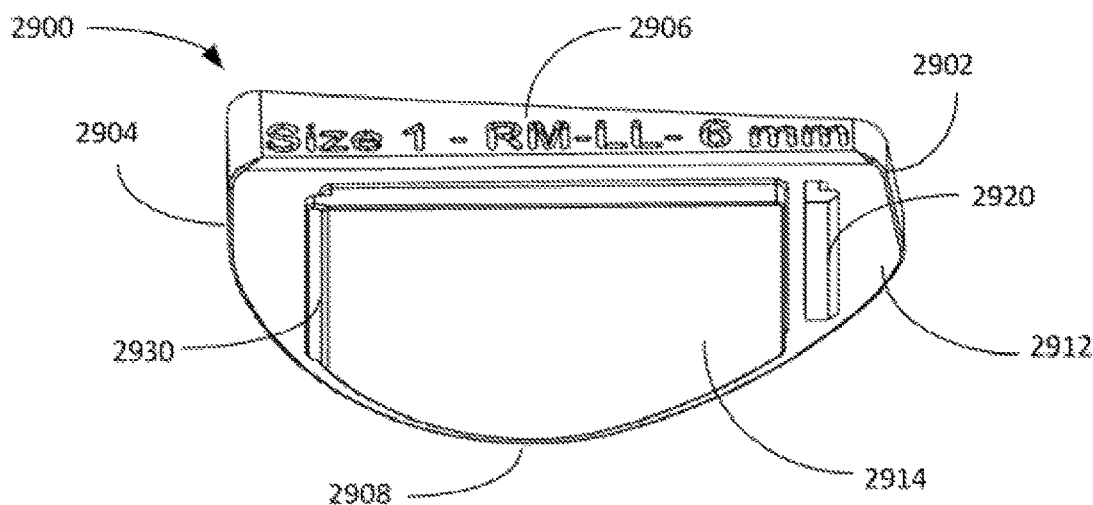
Figure 122:
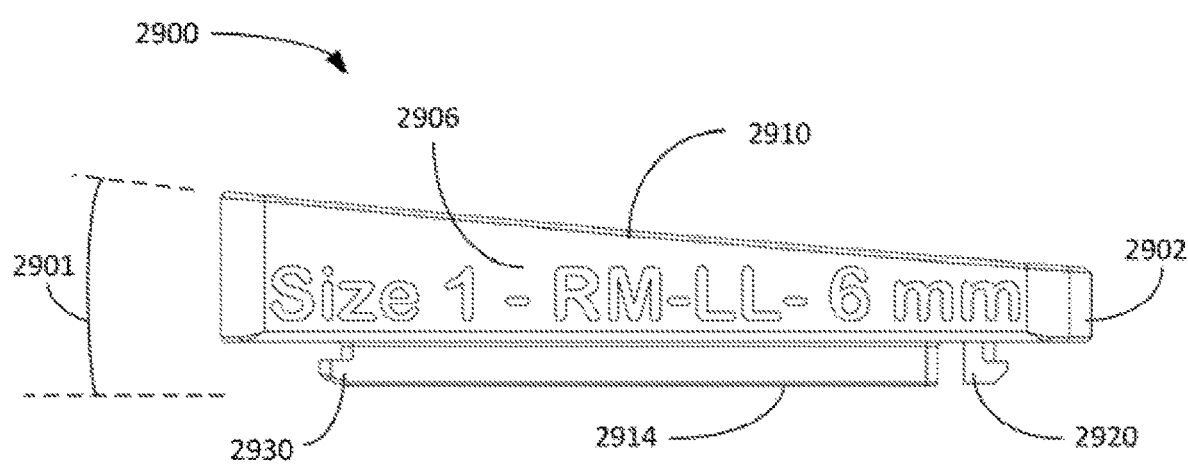

Referring now to FIGS. 120-122, a fixed articular component 2900 is shown, according to an example embodiment. The fixed articular component 2900 may share one or more characteristics with any of the articular components described herein (e.g., the fixed articular component 400). For example, the fixed articular component 2900 may be configured to couple with a baseplate or a tray (e.g., the tray 350). Further, the fixed articular component 2900 may be configured to interface with a femoral component (e.g., the femoral component 500) to enable relative movement between the femoral component and the fixed articular component 2900 and/or relative movement between the femoral component and the tray/baseplate.

As shown, the fixed articular component 2900 includes a first end 2902, a second end 2904 opposite the first end, a first edge 2906, and a second edge 2908 opposite the first edge 2906. As shown, the first edge 2906 is generally linear while the second edge 2908 is generally curved. The fixed articular component further includes an upper surface 1210 opposite a lower surface 2912. As shown, the fixed articular component 2900 includes a projection 2914 extending from the lower surface 2912. According to various embodiments, the projection 2914 is configured to be received within a cavity of the tray (e.g., the cavity 366) to couple the fixed articular component 2900 to the tray.

As shown, the fixed articular component 2900 includes a first tab 2920 and a second tab 2930 extending away from the lower surface 2912. According to various embodiments, a portion of the first tab 2920 is configured to be received within a slot (e.g., the slot 362) in the tray to securely couple the fixed articular component 2900 to the tray. According to various embodiments, the second tab 2930 may interface with an edge of the cavity (e.g., the cavity 366) such that the second tab 2930 is compressed against the edge of the cavity, which may further secure the fixed articular component to the tray.

As best shown in FIG. 122, the upper surface 2910 is generally flat. Further, the upper surface 2910 is angled away from the first end 2902 such that the upper surface 2910 and a bottom surface of the projection 2914 form an angle 2901. According to various embodiments, the angle 2901 is between 0 and 30 degrees.

According to various embodiments, the fixed articular component 2900 is made of polyethylene. According to other embodiments, the fixed articular component 2900 may be made of ceramic, polished ceramic, polished ceramic coated metal, or polyethylene or any combination thereof.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. The devices, systems and methods described herein may be embodied in other specific forms without departing from the characteristics thereof. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A cementless surgical implant, comprising:
a tray extending from a first anterior end to a second posterior end, the tray including an upper surface, a lower surface opposite the upper surface, a first lateral edge extending in an anterior-posterior direction between the first anterior end and the second posterior end, and a second semi-circular medial edge opposite the first lateral edge and extending between the first anterior end and the second posterior end, a first plane extending in a medial-lateral direction through respective midpoints of the first lateral edge and the second semi-circular medial edge;
a first post extending from a first anterior region of the lower surface of the tray along a first longitudinal axis and configured to be inserted into a bone portion, the first anterior region of the lower surface positioned away from the second semi-circular medial edge, the first post including a first opening extending in the anterior-posterior direction through the first post along a second axis and configured to receive a fastener, the first opening including a first set of threads, the first post including a third set of threads proximate the first opening;
a second post extending from a second posterior region of the lower surface of the tray along a second longitudinal axis and configured to be inserted into the bone portion, the second posterior region of the lower surface positioned away from the second semi-circular medial edge, the second post including a second opening extending in the anterior-posterior direction through the second post along the second axis and configured to receive the fastener, the second axis extending through the first opening and the second opening and intersecting the first plane of the tray, the second opening including a second set of threads and wherein a first diameter of the first set of threads is greater than a second diameter of the second set of threads; and
the fastener removably coupled to the first post and the second post, the fastener extending from a first fastener end to a second fastener end through the first opening and the second opening, the fastener including a first threaded portion and a second threaded portion, the first threaded portion configured to engage the first set of threads, the second threaded portion configured to engage the second set of threads, the fastener including a plurality of engagement features proximate the first fastener end, wherein the plurality of engagement features is configured to engage the first post.

2. The cementless surgical implant of claim 1, wherein the third set of threads is configured to engage a component of a surgical jig to couple the first post to the surgical jig.

3. The cementless surgical implant of claim 1, wherein the fastener extends in a direction that intersects the first plane, the first plane extending parallel to the first longitudinal axis, wherein the fastener forms an angle with the first lateral edge, the angle being between 0 and 90 degrees while the fastener is inserted into the first opening and the second opening.

4. The cementless surgical implant of claim 1, wherein the first post includes a plurality of ridges extending along the first post in a direction parallel to the first longitudinal axis.

5. The cementless surgical implant of claim 1, wherein the first post and the second post are angled towards the first lateral edge.

6. The cementless surgical implant of claim 1, further comprising a spike extending from the lower surface, the spike including a tip configured to be inserted into the bone portion.

7. The cementless surgical implant of claim 1, further comprising:
a fixed articular portion configured to couple with the tray proximate the upper surface, the fixed articular portion including an upper articular surface; and
a femoral component configured to be coupled to a femur bone, the femoral component including a curved surface configured to engage the upper articular surface to enable relative movement between the tray and the femoral component.

8. The cementless surgical implant of claim 1, further comprising:
an insert configured to couple to the tray proximate the upper surface;
a mobile articular portion configured to engage an upper surface of the insert such that the mobile articular portion is configured to translate relative to the tray, the mobile articular portion including an upper mobile articular surface; and a femoral component configured to be coupled to a femur bone, the femoral component including a curved surface configured to engage the upper mobile articular surface to enable relative movement between the tray and the femoral component and relative movement between the mobile articular portion and the femoral component.

9. The cementless surgical implant of claim 1, wherein the plurality of engagement features includes a plurality of serrations.

10. The cementless surgical implant of claim 1, wherein the first post is a first cylindrical post and the second post is a second cylindrical post.

11. The cementless surgical implant of claim 1, wherein the first post extends from a first anterior half of the lower surface and the second post extends from a second posterior half of the lower surface, wherein the first post is spaced apart from the second post.

12. The cementless surgical implant of claim 1, wherein the second longitudinal axis is parallel to the first longitudinal axis.

13. The cementless surgical implant of claim 12, wherein the second longitudinal axis and the first longitudinal axis are perpendicular to the second axis.

14. The cementless surgical implant of claim 1, wherein each of the lower surface of the tray, the first post, and the second post includes an osteoinductive portion that promotes ingrowth of bone.

15. The cementless surgical implant of claim 1, wherein the tray is filleted along an inferior edge to reduce stress on a cut bone surface.

16. The cementless surgical implant of claim 15, further comprising a keel having a curved outer surface extending to the lower surface of the tray, the keel extending along the first lateral edge of the tray between the first end and the second end of the tray; and wherein the curved outer surface of the keel is along the inferior edge.

17. The cementless surgical implant of claim 16, wherein the keel includes an inner surface that is substantially perpendicular to the upper surface of the tray.

18. The cementless surgical implant of claim 1, wherein a length of the fastener is greater than a distance between a first anterior end of the first opening and a second posterior end of the second opening.

* * * * *